July 2, 1935.　　　R. S. CONDON　　　2,006,790
MACHINE FOR PRODUCING GEARS
Filed Dec. 30, 1931　　18 Sheets-Sheet 1

INVENTOR
Robert S. Condon
BY /Schlesinger/
his ATTORNEY

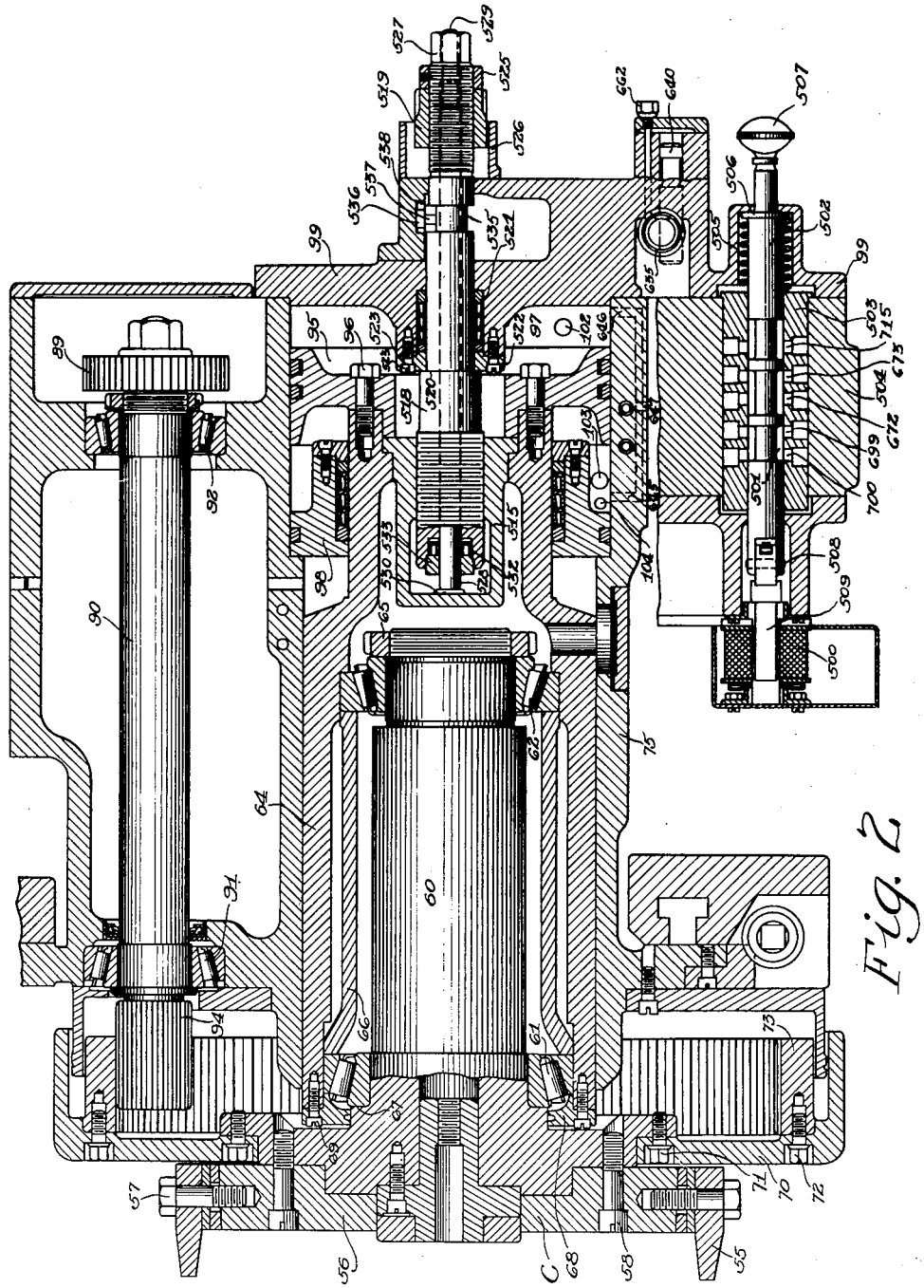

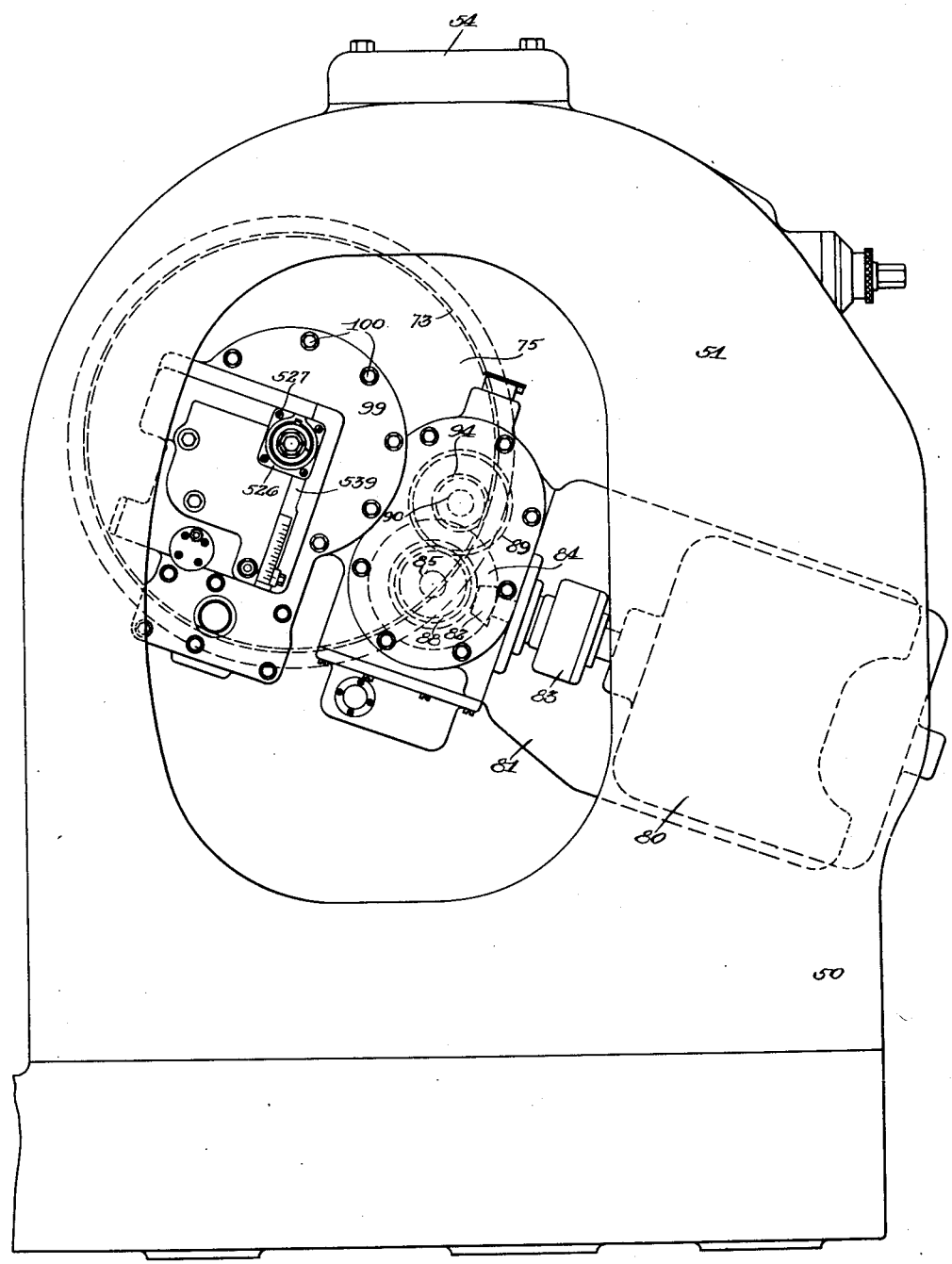

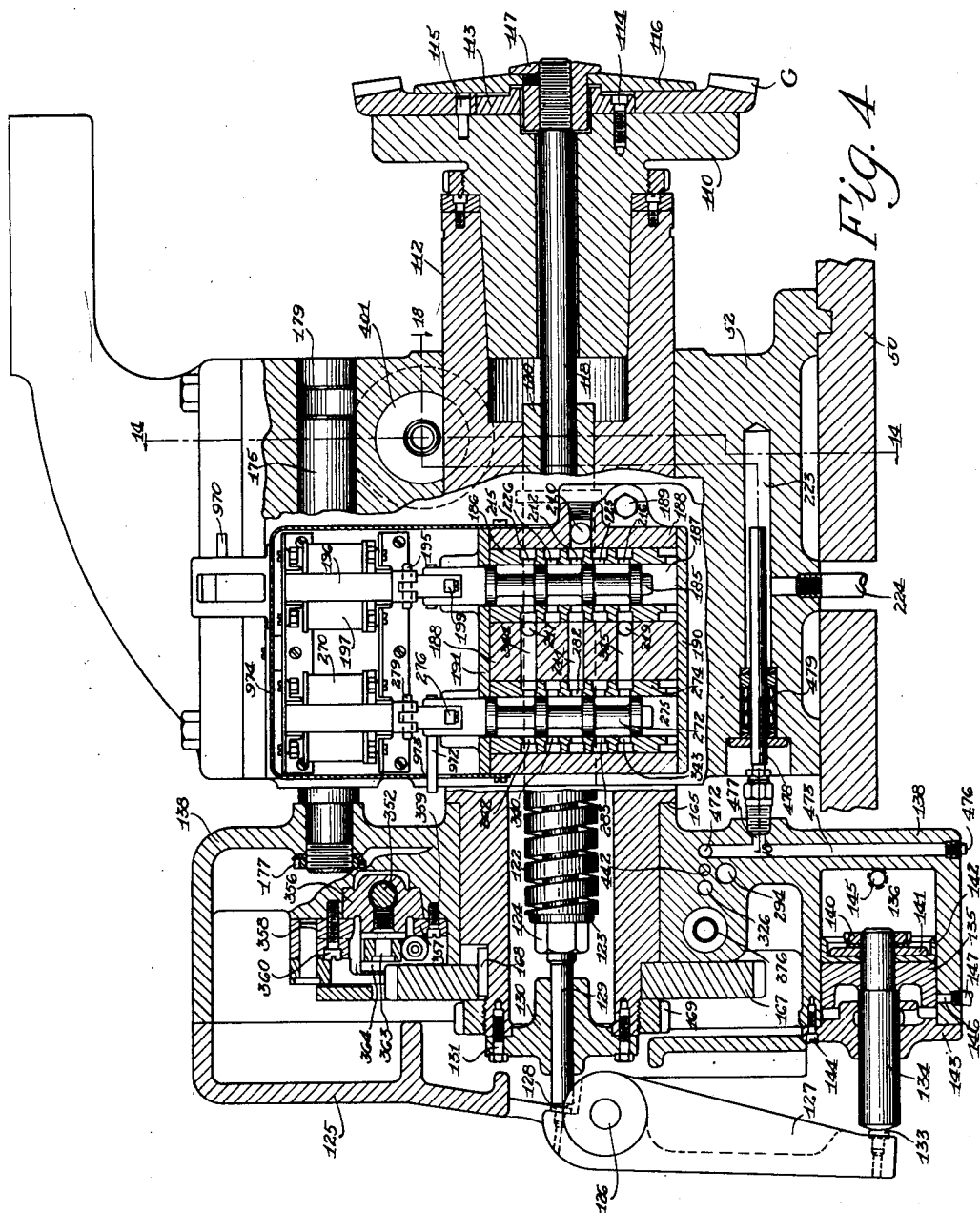

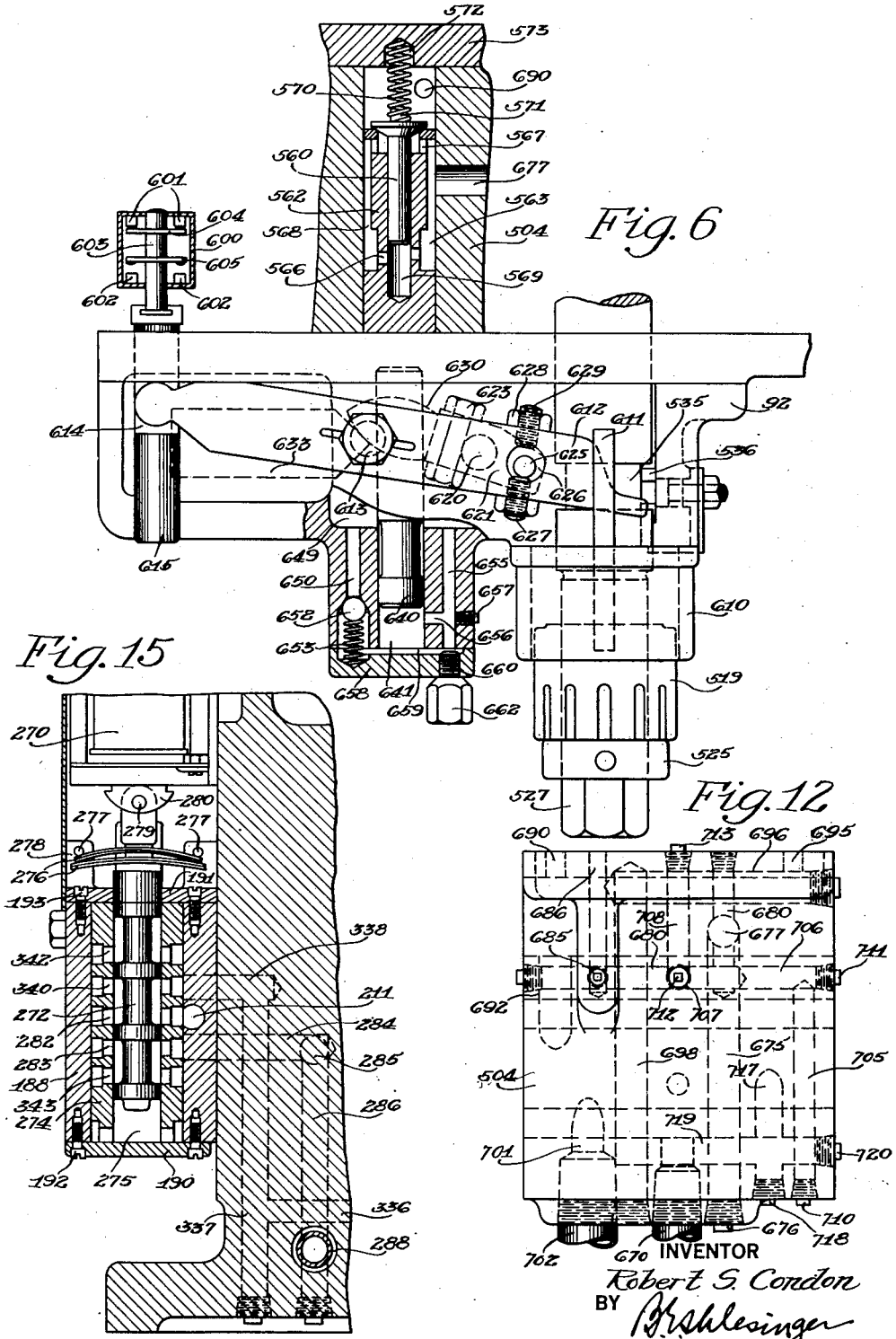

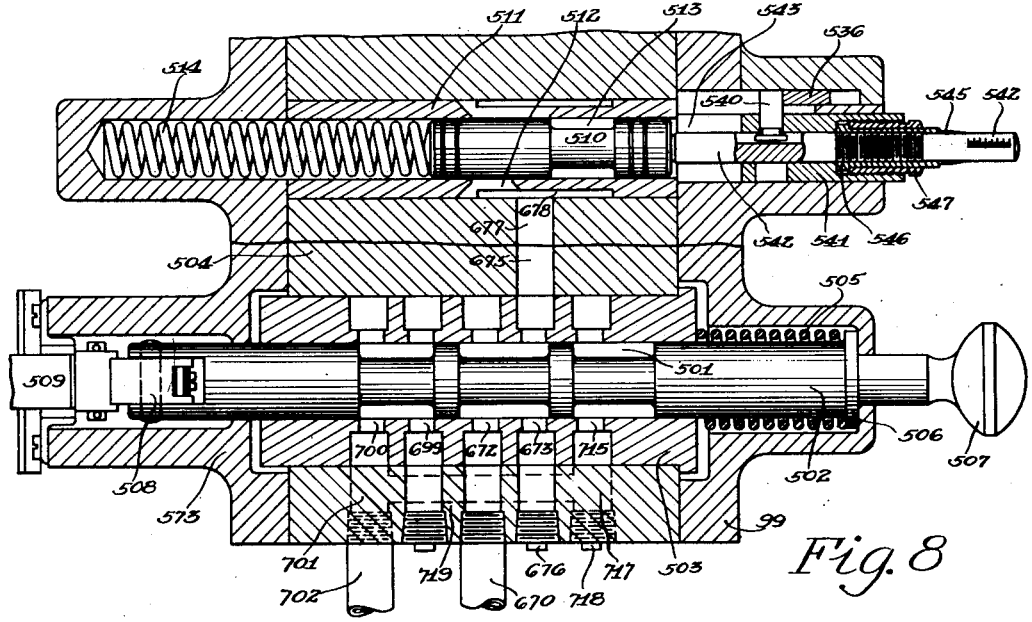

July 2, 1935. R. S. CONDON 2,006,790
MACHINE FOR PRODUCING GEARS
Filed Dec. 30, 1931 18 Sheets-Sheet 10

INVENTOR
Robert S. Condon
BY
his ATTORNEY

July 2, 1935.  R. S. CONDON  2,006,790
MACHINE FOR PRODUCING GEARS
Filed Dec. 30, 1931  18 Sheets-Sheet 14

INVENTOR
Robert S. Condon
BY
his ATTORNEY

INVENTOR
Robert S. Condon
BY
HIS ATTORNEY

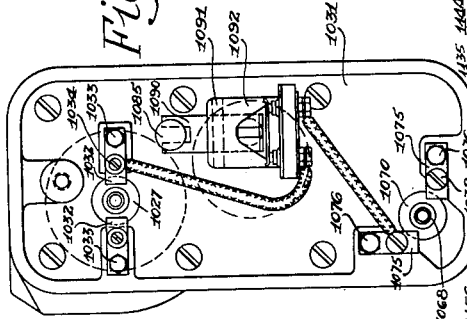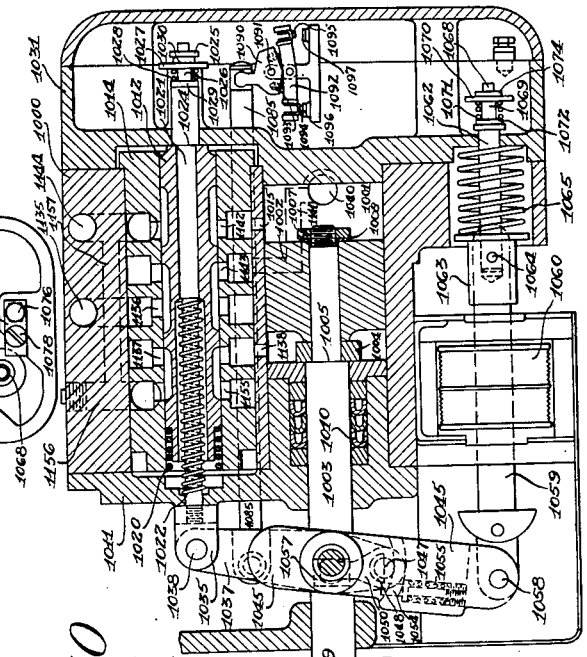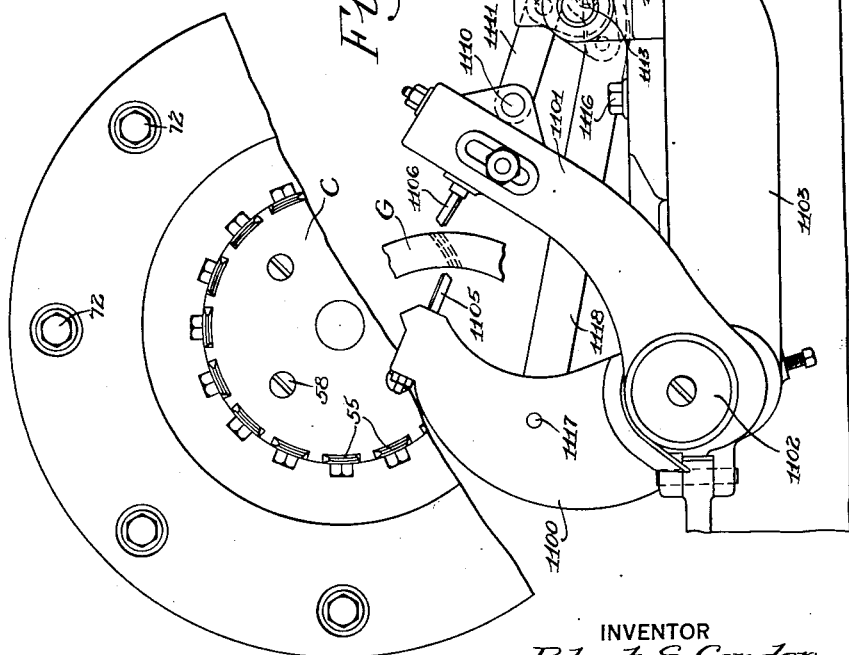

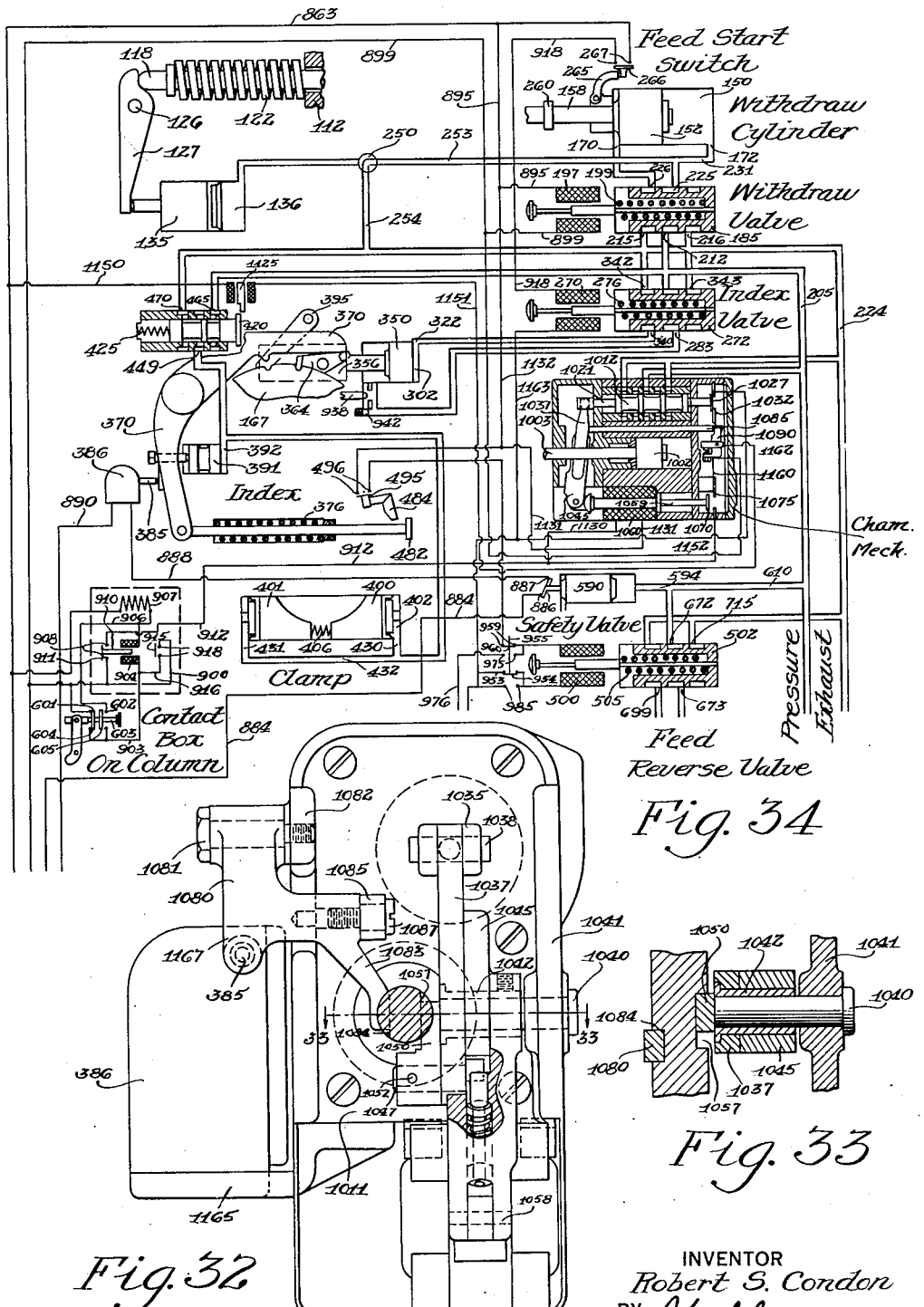

Patented July 2, 1935

2,006,790

UNITED STATES PATENT OFFICE 2,006,790

MACHINE FOR PRODUCING GEARS

Robert S. Condon, Rochester, N. Y., assignor to Gleason Works, Rochester, N. Y., a corporation of New York Application December 30, 1931, Serial No. 583,895

28 Claims. (Cl. 90—4)

The present invention relates to machines for producing gears and more particularly to gear cutting machines of the intermittent indexing type. In a still more specific aspect, the present invention relates to machines for roughing or form-cutting longitudinally curved tooth bevel and hypoid gears.

The present invention constitutes an improvement over the invention of application Serial No. 519,327, filed March 2, 1931. Its primary purpose is simplification.

In the machine of both the prior application mentioned and of the present application, the cutter has an alternate movement of feed and withdrawal with reference to the blank. On its feed movement, the cutter cuts a tooth space of proper depth in the blank while during the time the cutter is withdrawn, the blank is indexed so that on the next feed stroke another tooth space will be cut.

In the machine of the prior application, both the feed and index mechanisms are hydraulically operated and moreover hydraulically interlocked so that the feed cannot commence until the index is completed and the indexing cannot be commenced until the cutter has been fully withdrawn from engagement with the blank. To obtain this hydraulic interlock, it is necessary to connect the work and cutter heads by hydraulic leads. This has proved practical but unsatisfactory since the two heads are adjustable and movable relative to one another.

In the machine of the present invention, the feed and index mechanisms are still hydraulically actuated, but the hydraulic interlock is eliminated and an electrical interlock employed instead. As before, the indexing operation cannot be started until the cutter has been fully withdrawn from the work and the feed cannot commence until the index has been completed, but, with the present invention, this inter-connection is through an electrical hook-up requiring but one or two more electrical lines and but one more solenoid than are needed in a machine constructed according to my prior invention and the hydraulic leads between the work and cutter head are entirely eliminated.

A further feature of the present invention is the improved interlock provided between the index and feed mechanisms. Of course, in a machine of the intermittent indexing type, the work spindle is locked against indexing-rotation during cutting. In a machine constructed according to the prior application mentioned, the time of shifting of the reverse valve, which governs the direction of movement of the cutter, is controlled by the movement of the piston which actuates the index mechanism. The parts are arranged, of course, so that in its movement, this piston will cause the work spindle to be locked up as soon as indexing has taken place and before the reverse valve is shifted to cause the cutter to commence its feed movement, but there is no direct connection between the lock-up lever and the reverse valve. In a machine built according to the present invention, however, the parts are so constructed and arranged that the lock-lever is itself employed to trip the reverse valve and the reverse valve cannot be shifted until the lock-lever has actually moved into locking engagement with the work spindle. Hence, a safer and more positive means is provided for interlocking the index and feed mechanisms.

A further feature of the invention is the improved form of index mechanism. The gearing for rotating the spindle during indexing has been eliminated and the whole operation of indexing has been simplified and made more positive by using the notched index plate itself as a ratchet wheel during indexing and by controlling the movement of the lock-lever and the ratcheting mechanism from two different pistons so connected that the lock-up cannot take place until the work spindle has been rotated through the full angle required for indexing.

Still another feature of the improved machine built according to the present invention is the provision of means for causing the cutter to dwell in the tooth slot at the end of its feed stroke before backing away from the work. This dwell enables the cutter to clean up the bottom of the tooth slot and, when non-generated gears are being finish cut, is of especial value as the cutter stroke may be adjusted so that sufficient dwell occurs, after full depth position has been reached, to allow the cutter to take final finishing cuts on the tooth profiles and produce smooth tooth surfaces.

A further feature of the invention is the provision of a continuously driven chip-conveyor which will automatically remove chips from the machine while allowing the cutting oil to drain off them and return to its sump. In the preferred embodiment of the invention, this conveyor is operated by a ratchet and pawl mechanism driven by a self-reversing hydraulic unit which in itself is novel.

The present machine, like the machine of the prior application referred to, may be provided with a chamfering attachment so as to permit cutting and chamfering a gear in a single set-up of the machine. A further purpose of the present invention is to provide improved mechanism for actuating the chamfering attachment, mechanism which can be electrically interlocked with the indexing and feed mechanisms.

The principal features of the present invention have already been described. Other objects of the invention will be apparent hereinafter from the specification and from the recital of the appended claims.

In the drawings:

Figure 2 is a sectional view through the cutter head of this machine, showing parts of the cutter drive and of the mechanism for reciprocating the same to effect the alternate feed and withdrawal motions;

Figure 3 is a rear elevation of the cutter end of the machine;

Figure 4 is a view of the work head of the machine, parts being broken away to show the chucking and indexing mechanisms and to show the valves controlling the movement of the work spindle to and from operative position and the indexing of the work spindle, respectively;

Figure 28:
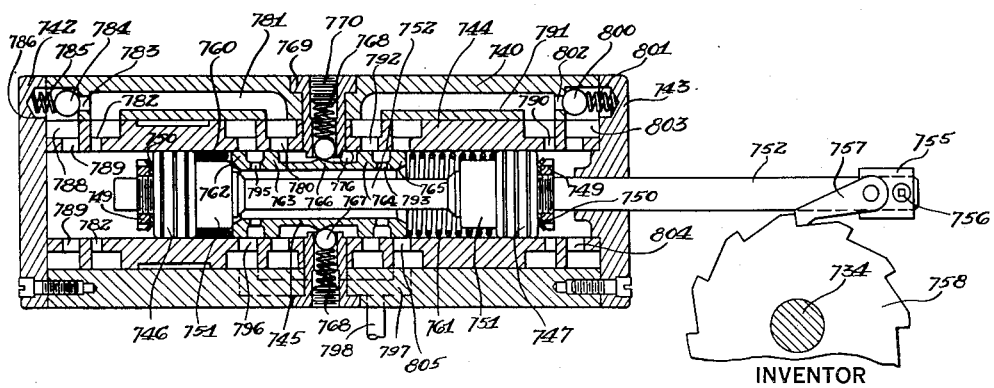
Figures 5, 25:
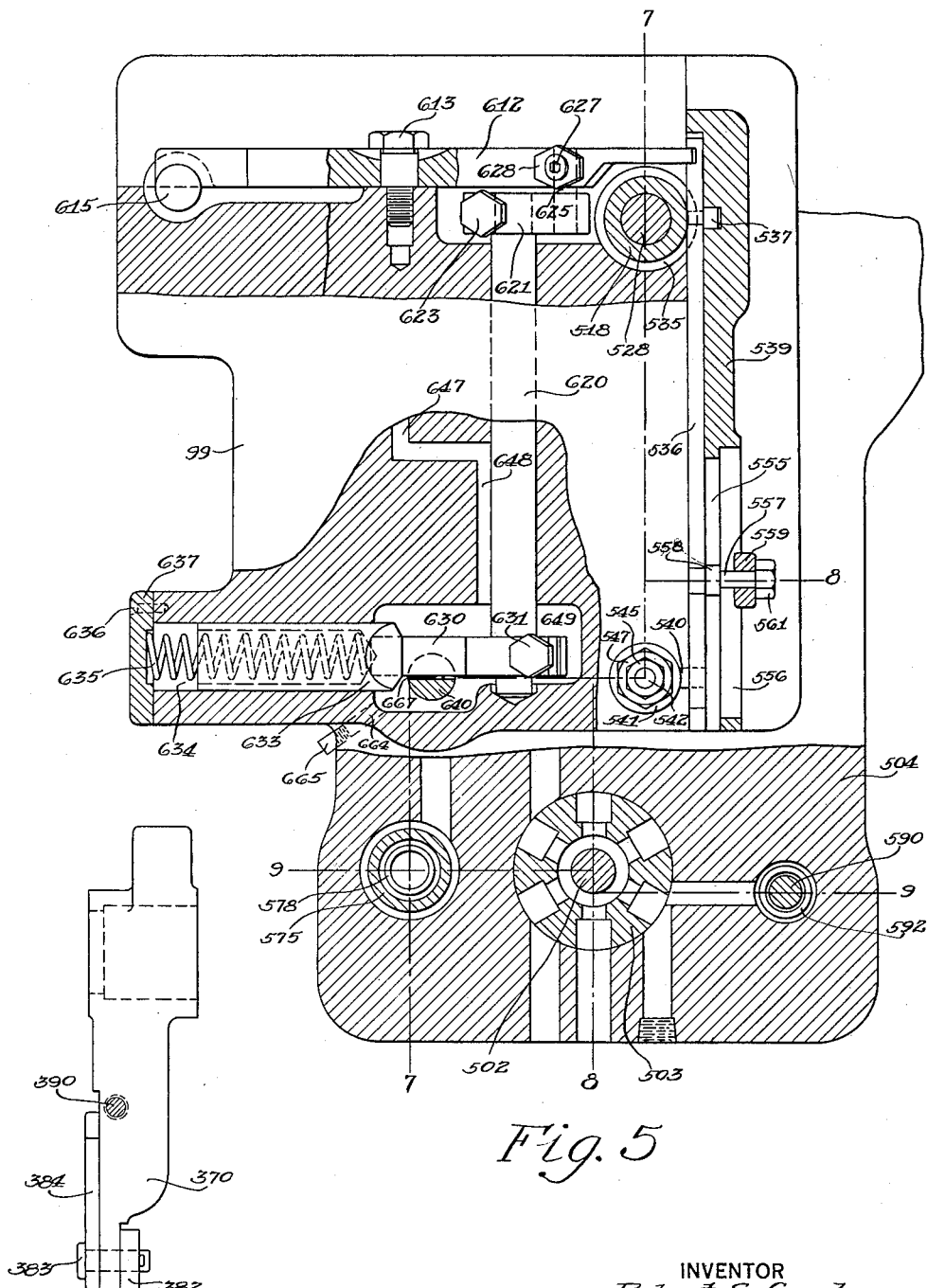
Figure 7:
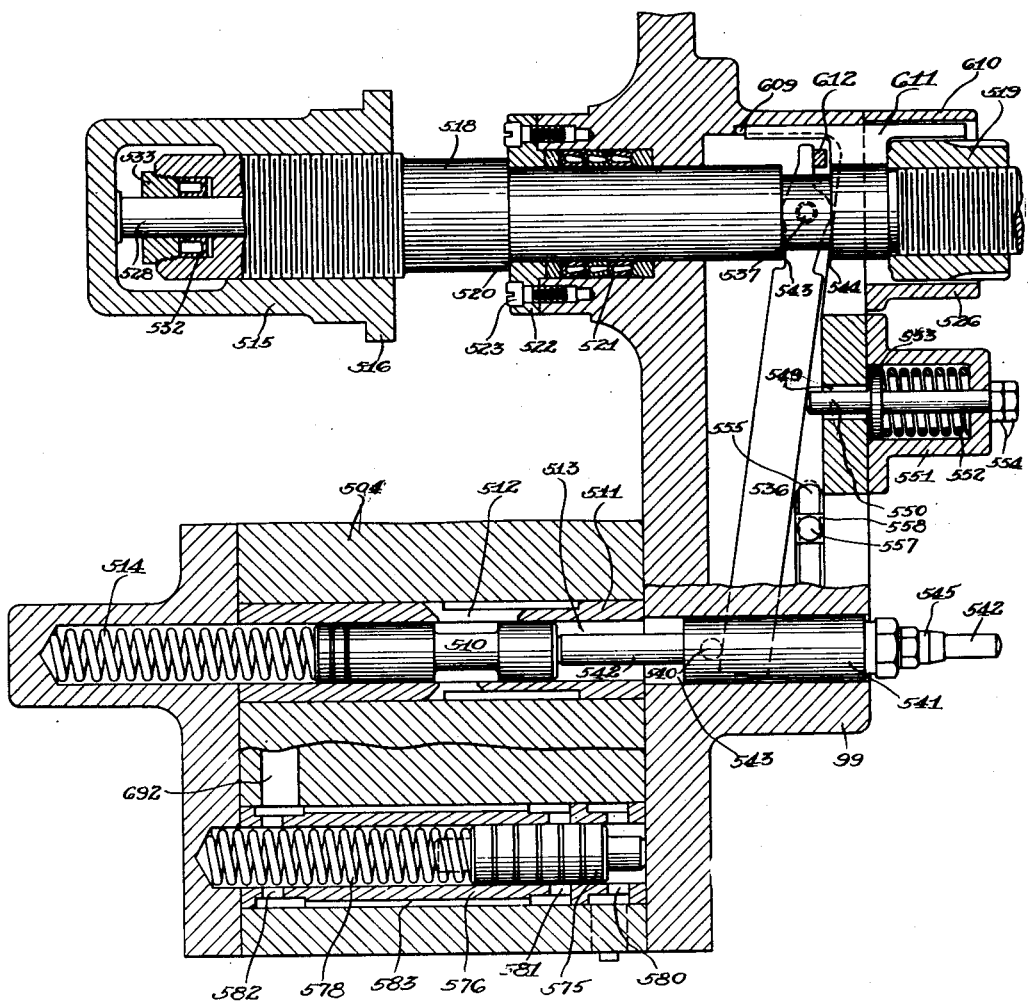
Figure 11:
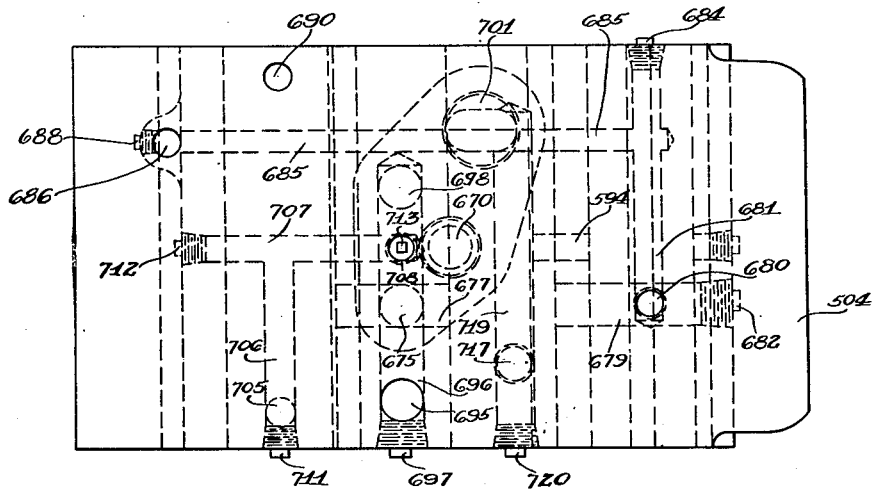
Figure 10:
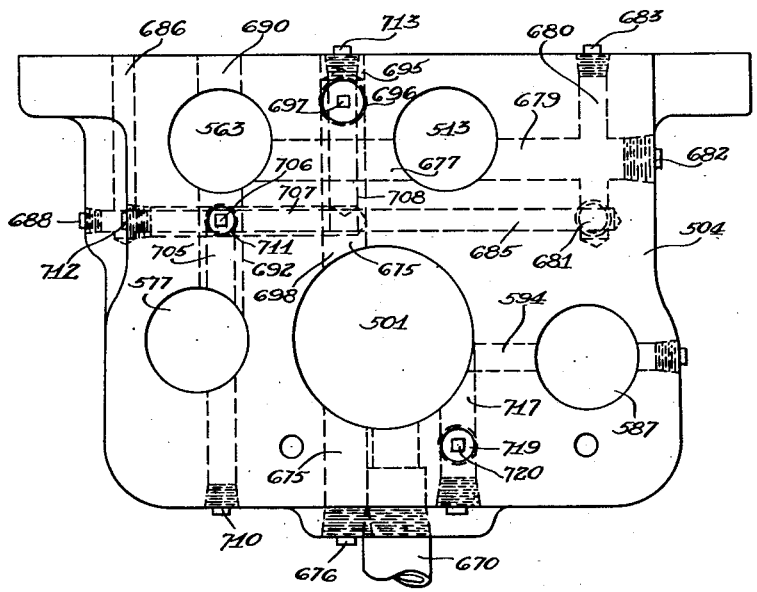
Figures 13, 17:
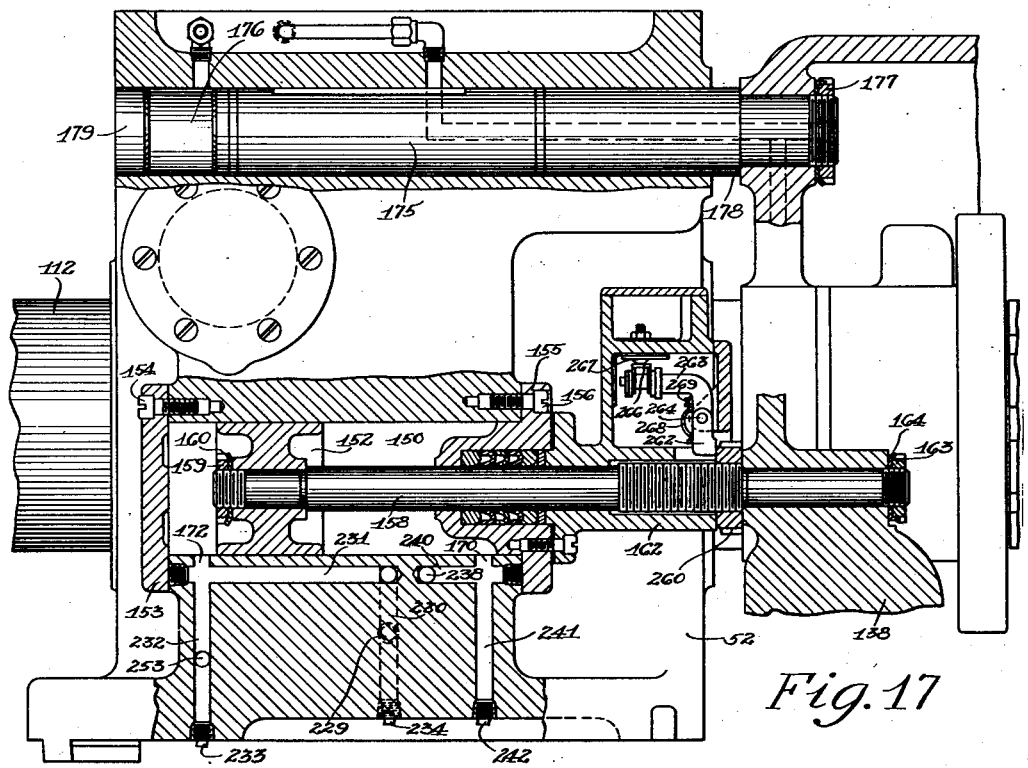
Figure 14:
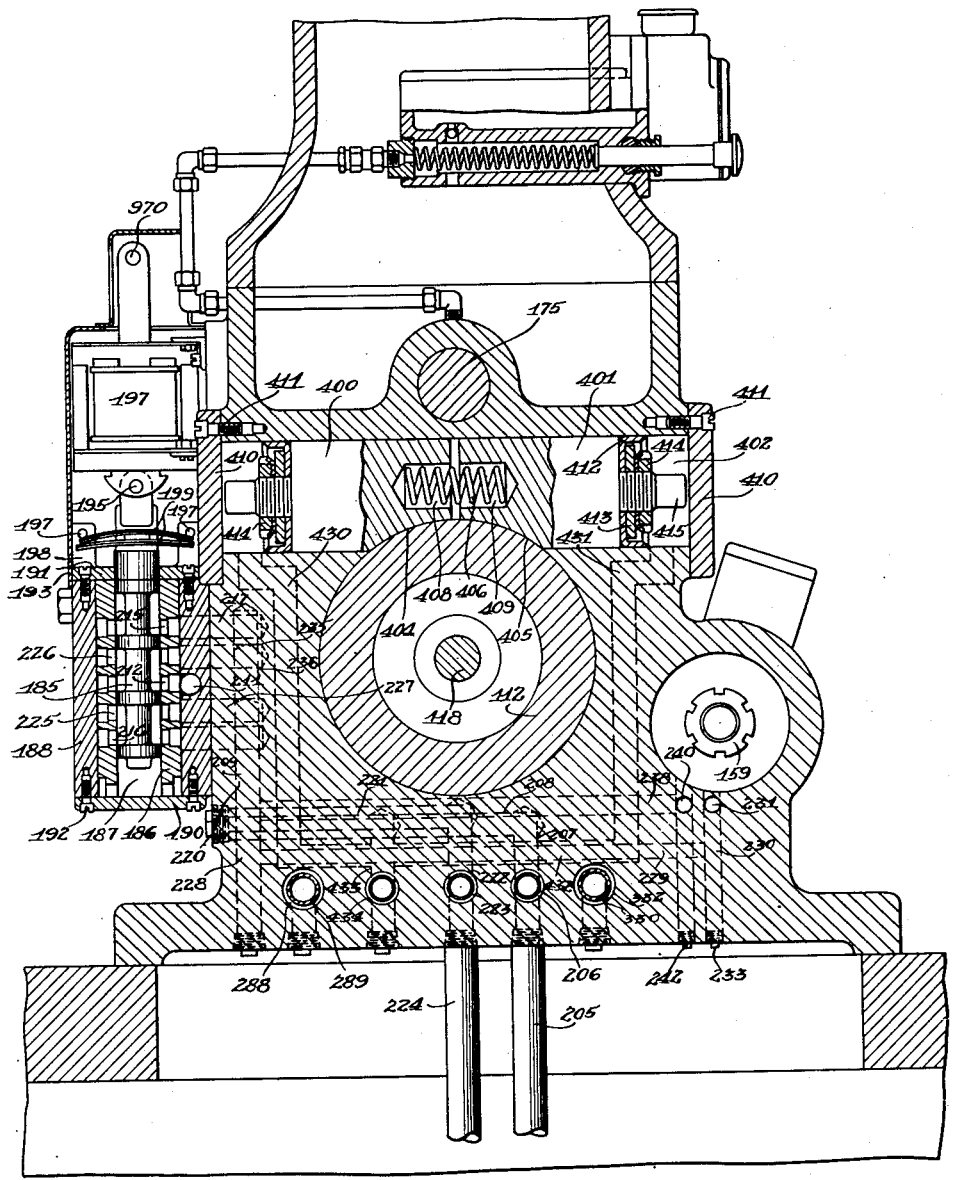
Figure 26:
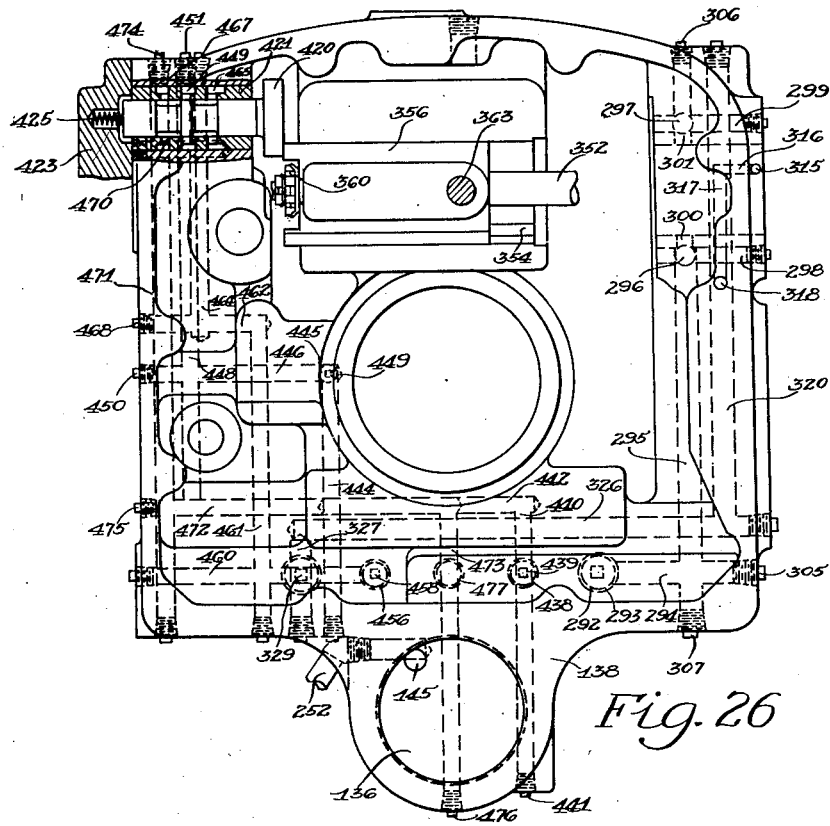
Figure 16:
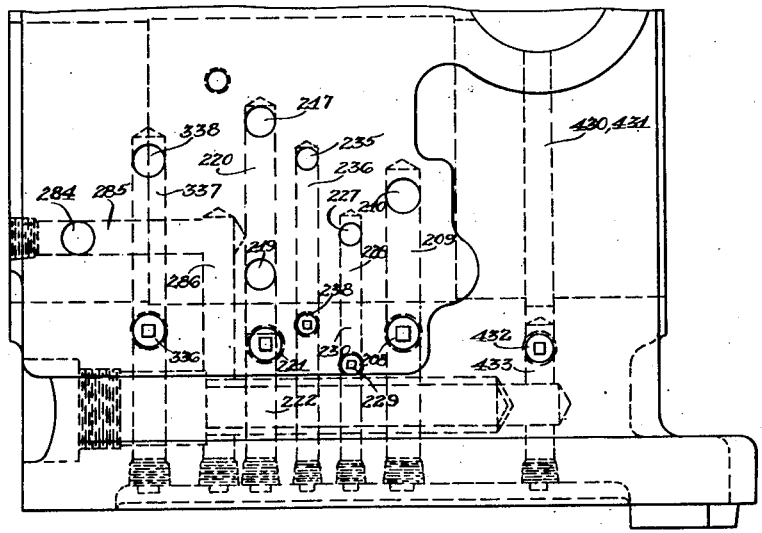
Figure 18:
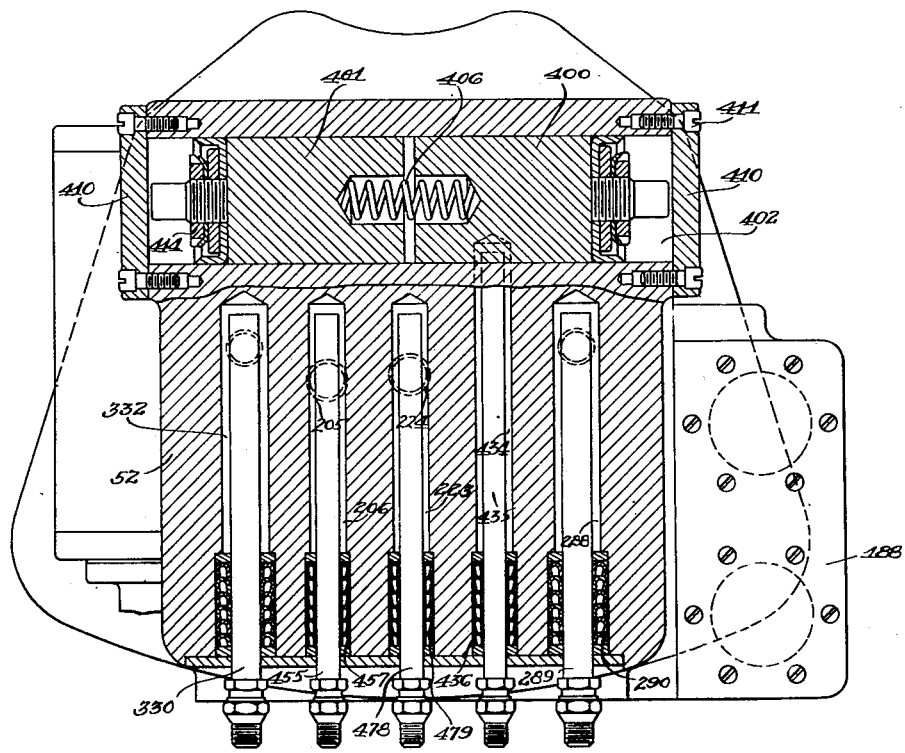
Figure 21:
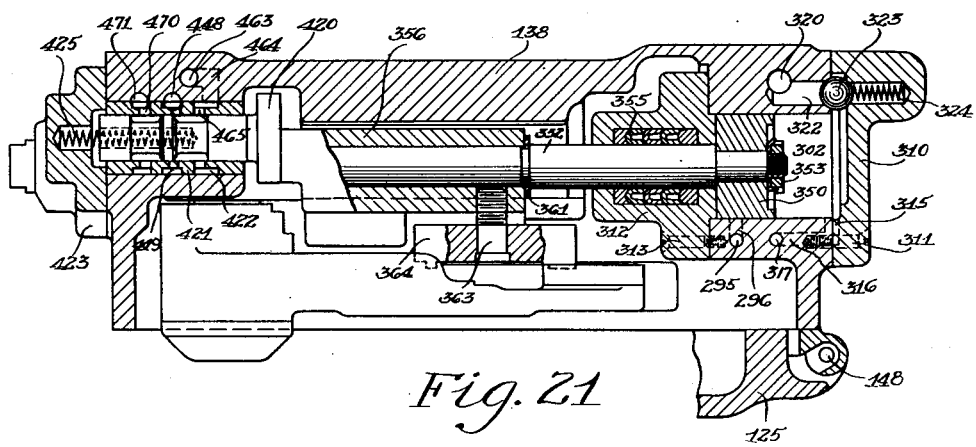
Figure 19:
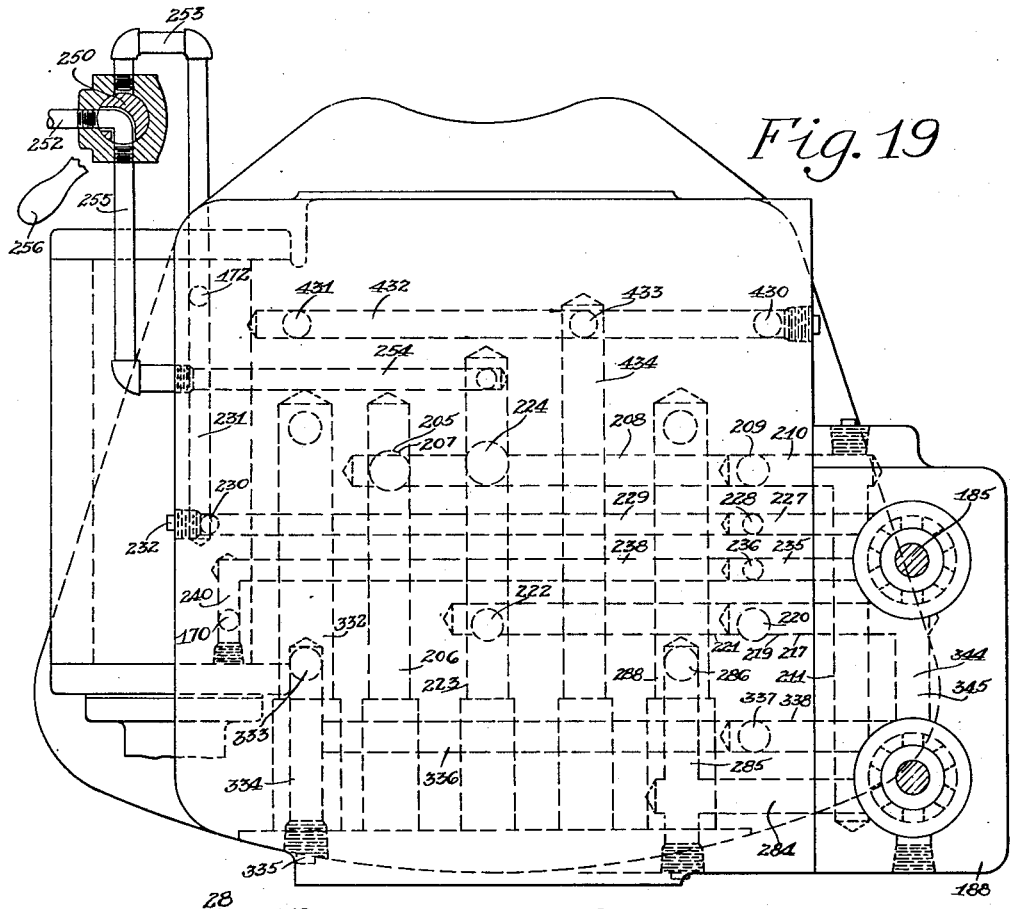
Figure 27:
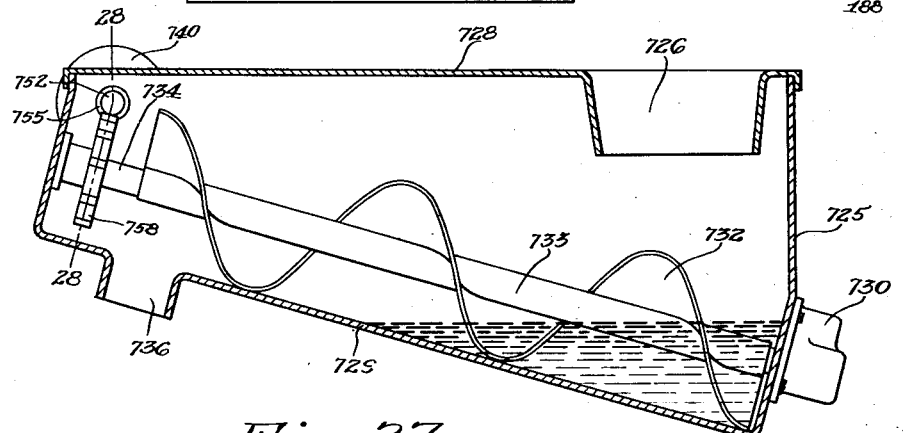
Figure 20:
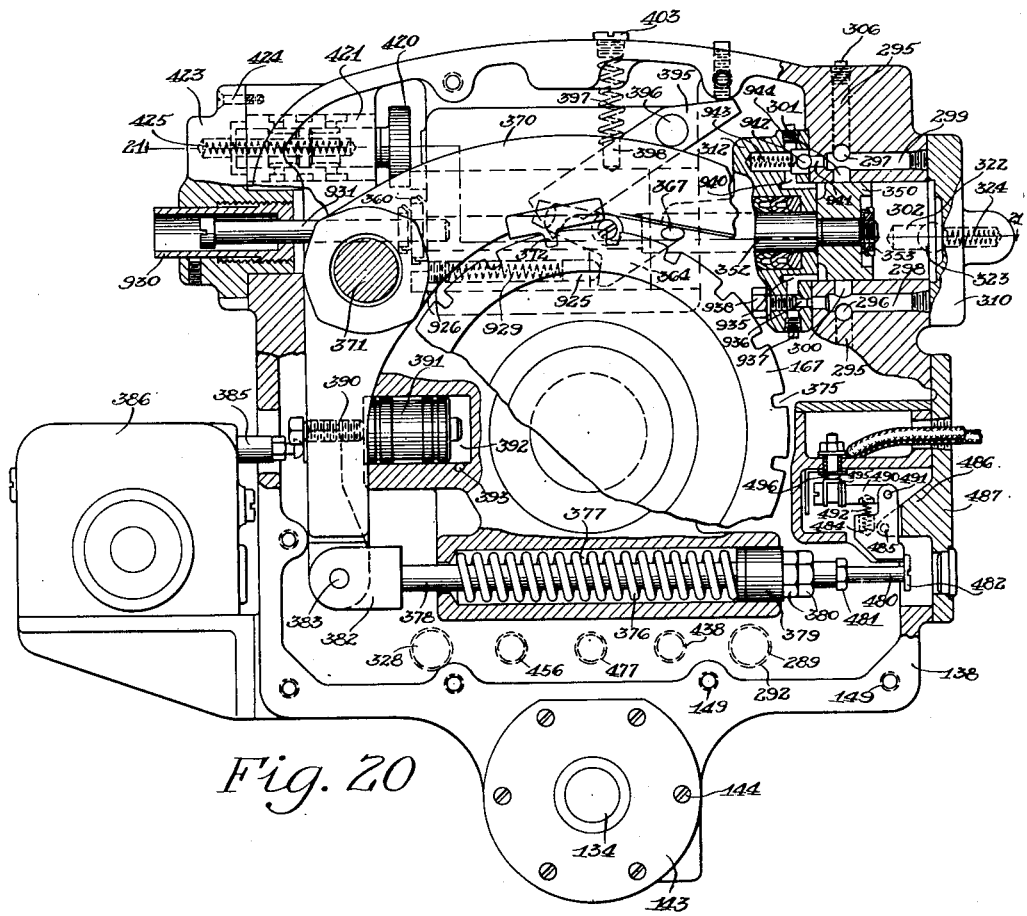
Figure 22:
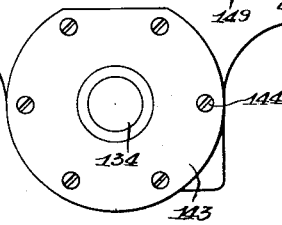
Figure 23:
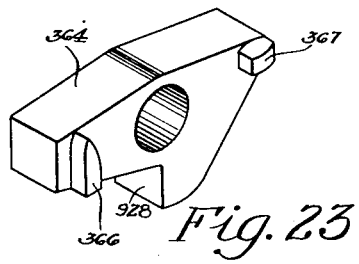
Figure 24:
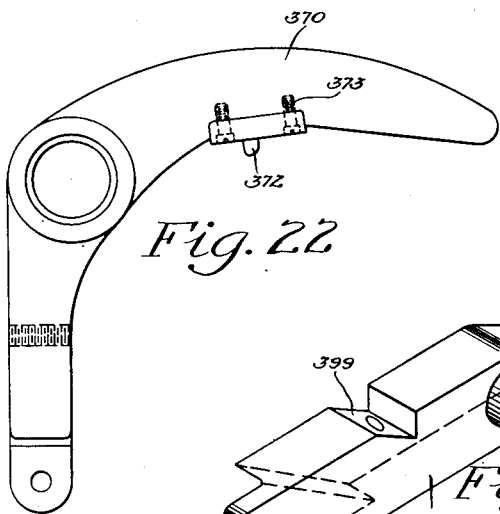
Figure 29:
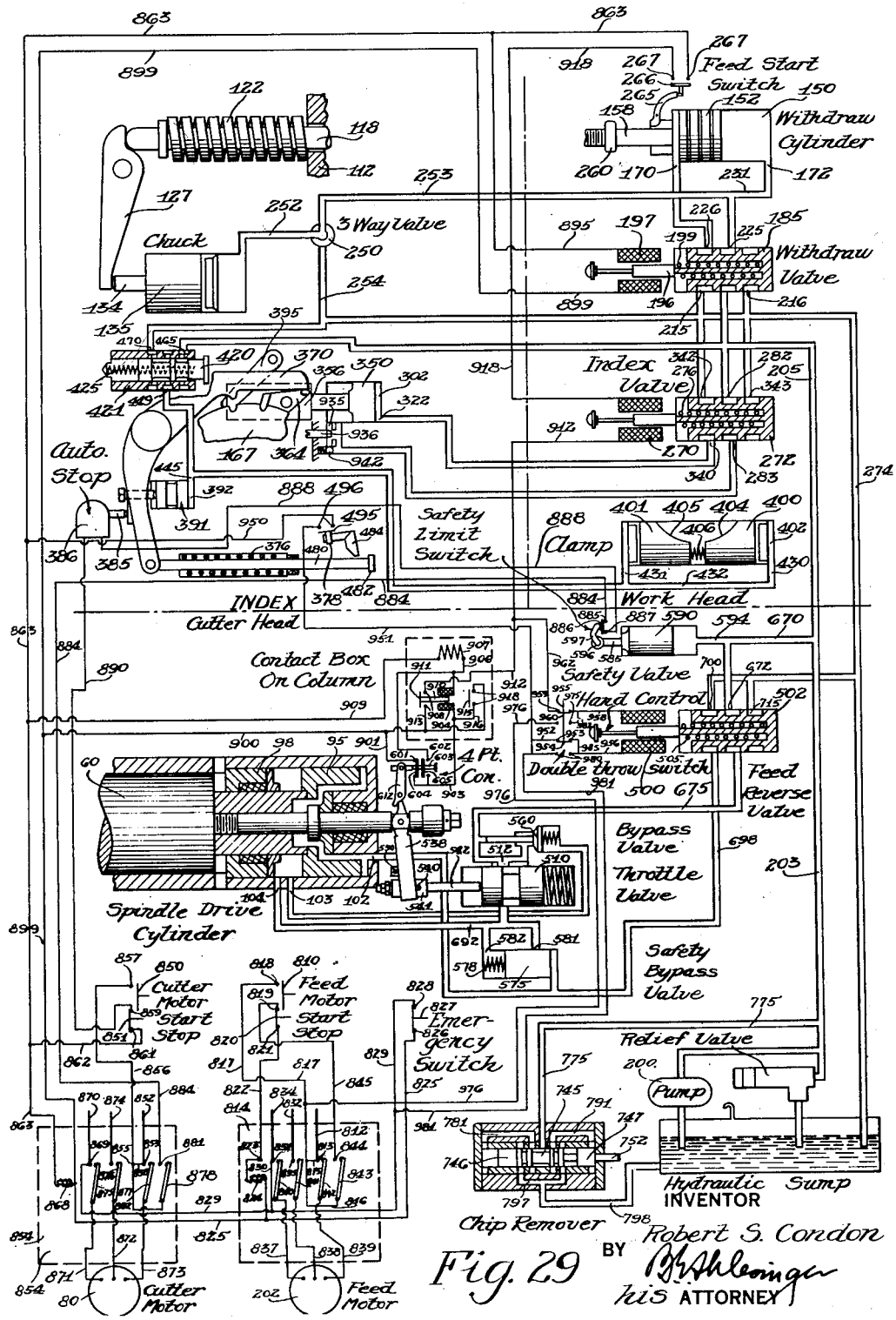

Figure 5 is an enlarged fragmentary view of the rear end of the cutter head, showing the location of the throttle, safety, reverse, and safety by-pass valves, parts being broken away, also, to show the parts of the mechanisms for operating the throttle valve and the four-point electrical controller and of the dash-pot mechanism which causes a dwell to occur in the cutter movement at the end of the feed stroke;

Figure 6 is a fragmentary plan view of this portion of the cutter head, parts being broken away to show the dash-pot arrangement that allows the dwell at the end of the feed stroke of the cutter and to show the by-pass valve;

Figure 7 is a section on the line 7—7 of Figure 5;

Figure 8 is a section on the line 8—8 of Figure 5;

Figure 9 is a section on the line 9—9 of Figure 5;

Figure 10 is a rear elevation of the valve block which houses the several valves controlling the feed and withdrawal movements of the cutter;

Figure 11 is a plan view of this block;

Figure 12 is a view of one side of this block, that is, a view looking at what would be the left side of the block as viewed in Figures 10 and 11;

Figure 13 is a fragmentary view, showing details of the cutter drive;

Figure 14 is a sectional view through the work head of the machine, the section being taken approximately on the line 14—14 of Figure 4, the hydraulic leads to the work spindle clamps and to the withdraw valve being indicated particularly;

Figure 15 is a fragmentary sectional view through the work head taken in a plane parallel to that of Figure 14 and showing the index control valve and the hydraulic leads thereto;

Figure 16 is a fragmentary side elevation of the work head looking at the same side as Figure 4 but with the valve block removed to show the various hydraulic leads;

Figure 17 is a fragmentary view looking at the work head from the opposite side from the view of Figure 4, parts being broken away to show the fluid pressure operated mechanism for moving the work spindle to and from operative position;

Figure 18 is a horizontal sectional view through the work head taken approximately on the line 18—18 of Figure 4, looking in the direction of the arrows and showing also in plan a portion of the supporting base or frame of the machine;

Figure 19 is a plan view of the work head, showing in dotted lines the various hydraulic leads;

Figure 20 is a rear view of the work head, parts being broken away to show the index mechanism;

Figure 21 is a fragmentary sectional view taken on the line 21—21 of Figure 20 showing further details of the mechanism for effecting the indexing operation;

Figure 22 is a view of the index lock lever;

Figure 23 is a perspective view of the pawl which engages the index plate to transmit the indexing rotation thereto;

Figure 24 is a perspective view of the stop-dog which prevents reverse rotation of the index plate;

Figure 25 is an end view of the index lock-lever;

Figure 26 is a rear view of the housing for the index mechanism with the parts of the index mechanism properly removed, and showing particularly the various hydraulic leads drilled into this housing;

Figure 27 is a section through the chip-pan of the machine, showing the conveyor for carrying chips out of the machine;

Figure 28 is a view on an enlarged scale taken approximately on the line 28—28 of Figure 27 and showing the mechanism for operating the conveyor;

Figure 29 is a diagrammatic view of the electrical and hydraulic circuits of the machine and illustrating the method of operation of the machine;

Figure 30 is a view showing one form of chamfering attachment which may be employed with the machine, the mechanism for actuating the attachment being shown in section and the view being taken looking toward the cutter end of the machine, both the cutter and blank being shown fragmentarily;

Figure 31 is a view looking at the rear end of the control box of the chamfering attachment, the several electrical switches being shown;

Figure 32 is a view looking at the front end of the control box and actuating mechanism;

Figure 33 is a section on the line 33—33 of Fig. 32; and

Figure 34 is a diagrammatic view, supplemental to Figure 29, illustrating the operation of the machine when provided with the burring or chamfering attachment.

The machine shown in the drawings is a preferred form of the invention as embodied in a machine for roughing spiral bevel and hypoid gears or for finish-cutting such gears in a non-generating operation. In this machine, the tool used is a rotary face-mill gear cutter of standard construction. The tool and the blank to be cut are mounted on separate heads, adjustable relative to one another to bring the tool and blank into operative relation. The adjustments of the tool and work head have not been illustrated in the drawings of the present application as they form no part of the present invention. Preferably they will be of the same character as disclosed in prior application No. 519,327 mentioned and reference may be had to that application for a more detailed description thereof.

The cutter is driven from a motor mounted on the tool head. The alternate feed and withdrawal movements of the cutter referred to above are effected by reciprocation of a sleeve in which the cutter spindle is journaled. There is a piston secured to this sleeve and fluid-pressure is applied alternately to opposite ends of this piston to reciprocate the sleeve.

The gear blank to be cut is secured to a spindle that is rotatably and slidably mounted in the work head. The rotary movement of the spindle is for the purpose of indexing the blank after each tooth space has been cut, while the sliding movement is for the purpose of moving the blank to and from operative position at the beginning and at the end of the cutting operation, respectively.

The feed and withdrawal movements of the cutter and the rate of these movements are controlled from the movement of the sleeve in which the cutter is journaled. In this respect, the present machine operates in the same way as the machine of my prior application. It differs, however, in the form of control. The reverse valve, which controls the direction of application of fluid pressure to the piston which is secured to the sleeve, is normally urged in one direction by a spring and is moved in the opposite direction against the resistance of the spring by a solenoid. When the solenoid is energized, the valve is shifted to cause the cutter to be moved into depth and when the cutter has reached full depth position, an electrical contactor is tripped short-circuiting the line to the solenoid and the valve is shifted back to normal position under actuation of the spring to cause the cutter to be withdrawn from engagement with the blank. An adjustable dash-pot, operating in conjunction with the trip for the electrical contactor, controls the making and breaking of the circuit, so as to allow the cutter to dwell momentarily in the tooth slot at full depth position, cleaning up the tooth space and smoothing up its side surfaces.

The speed of movement of the sleeve is controlled by a throttle valve. A lever, which is connected to the sleeve, shifts this valve continuously as the cutter feeds into depth, reducing the rate of feed as the cutter sinks deeper and deeper into the blank.

The index mechanism is of the notched-plate type and is hydraulically operated. During cutting, the work spindle is locked by the index-lock-lever, which is in locking engagement with a notch of the index plate, and by a pair of clamps which operate directly on the work spindle. Both the clamps and the index lock-lever are held in locking position by hydraulic pressure while they are released by springs.

The movements of the index mechanism and of the clamps are controlled primarily from a valve which, like the reverse valve, is normally urged in one direction by a spring and moved in the opposite direction against the resistance of the spring by a solenoid. During the feed movement of the cutter, this solenoid is energized and the clamps and index lock-lever are on pressure. When the contactor referred to above is tripped, it short-circuits not only the circuit to the solenoid of the reverse valve, but also the circuit to the solenoid of the index valve. The index valve is shifted back to normal position, therefore, by its spring at the same time that the reverse valve is shifted. This causes the piston, which actuates the index mechanism, to be reset simultaneously with the withdrawal of the cutter from the blank. At the same time, the valve, which controls the index lock-lever and the work spindle clamps, is shifted, causing the clamps and the lock-lever to be put on exhaust, thus releasing the work spindle.

At the end of the withdrawal movement of the cutter, the circuit to the solenoid of the index valve is re-made. This shifts the index valve, causing the piston which operates the index mechanism to be moved in the direction to effect indexing. This piston carries a pawl which engages in a notch of the index plate, when the index lock-lever is disengaged therefrom, and as the piston carrying this pawl moves in the proper direction, the pawl drives the index plate to effect the indexing operation. At the end of its movement, this piston shifts the valve controlling the work spindle clamps and the lock-lever. These parts are now put on supply and the work spindle is locked up again.

In its re-locking movement, the index lock-lever trips a switch, remaking the circuit to the solenoid which controls the reverse valve. The cutter is again fed into depth, the cycle commencing anew. The alternate cutting and indexing proceeds until the blank has been finished. Then an automatic stop is tripped, breaking the circuit to the cutter motor and also to a solenoid controlling a valve which governs the motion of the work spindle to and from operative position. This solenoid is de-energized, allowing the valve to be shifted by a spring and fluid pressure is applied to a piston connected to the work spindle in such direction that the work spindle is withdrawn from the operative position.

The operator can then remove the completed gear and chuck a new blank. The chucking mechanism is of the spring-actuated, hydraulically-released type and is controlled by a manually operated three-way valve.

When a new gear has been chucked, the cutter motor is re-started. The re-starting of this motor closes the circuit to the solenoid last referred to. The valve controlled by this solenoid is thus shifted in such direction that the work spindle is returned to operative position. When the work spindle has returned to operative position, it re-makes the circuit to the solenoid of the index piston. The machine then resumes its cycle, performing its functions in their necessary order. The first operations of the machine are the indexing and locking up of the work spindle and as soon as the work spindle has been locked up, the solenoid controlling the feed valve is energized and the cutter commences its feed.

As in my prior machine, a number of safety features are provided. The stopping of the cutter motor at the time of withdrawal of the work spindle from operative position has already been referred to. In addition, a safety is provided which insures that the fluid in the hydraulic system is up to the pressure necessary for operation of the machine before the cutter motor can be restarted and insures that this pressure is maintained while the machine is in operation. This prevents damage to the cutter and poor tooth surface finish on the work. To prevent breakage of the blades during feed, a safety by-pass valve is also provided so that pressure cannot be built up beyond a predetermined limit and therefore the cutter cannot be fed in against a resistance exceeding a predetermined safe limit.

The machine can be provided with a chamfering attachment for chamfering one or both ends of the teeth of a spiral bevel gear. This chamfering attachment is hydraulically operated but electrically controlled and the controls for the chamfering attachment are so coupled in the electrical circuit of the machine that after a tooth space has been cut and the cutter has been withdrawn from engagement with the blank, the tooth will be chamfered. The chamfering operation will take place before the blank is indexed and the chamfering and index mechanisms are so interlocked electrically that indexing cannot take place until the chamfering has been completed. In the drawings, there has been illustrated a mechanism for chamfering both ends of the tooth of a spiral bevel gear simultaneously, but it will be understood that the chamfering mechanism may be of any desired nature, this invention relating only to the means for actuating a chamfering mechanism.

The invention has been described generally. Reference will now be had to the drawings for a more detailed description thereof.

50 designates the base or frame of the machine. The tool mechanism is adjustably mounted upon a column or upright 51 that is formed integral with the frame, while the work spindle is journaled in a head 52 that is adjustably mounted on the frame.

The work head and the tool column are adjustably connected by an overhead tie 54.

C designates the cutter which is of the standard face-mill type, being provided with a plurality of inserted cutting blades 55 that are adjustably secured to the cutter head 56 by bolts 57. The cutter head 56 is secured by bolts 58 to the head of the cutter spindle 60 (Fig. 2) which is journaled in anti-friction bearings 61 and 62 in the sleeve 64. The cutter spindle is held against axial movement relative to the sleeve 64 by the nut 65 which threads on the inner end of the spindle and engages the inner race of the bearing 62. The outer race of the bearings 61 and 62 are held in spaced relation by the spacer or sleeve 66 and in the adjustment of the nut 65, the shoulder 67 of the cutter spindle is drawn against the inner race of the forward bearing 61. A labyrinth seal is provided at 68 to protect the front bearing 61 against entrance of grit or dirt therein. This seal is secured to the sleeve 64 by screws 69 and it serves, also, to hold the outer race of the bearing 61 in position.

Drive to the cutter

There is a drum or guard 70 secured to the cutter spindle 60 by screws 71. To this guard there is secured by screws 72 an internal gear 73.

Figure 1:
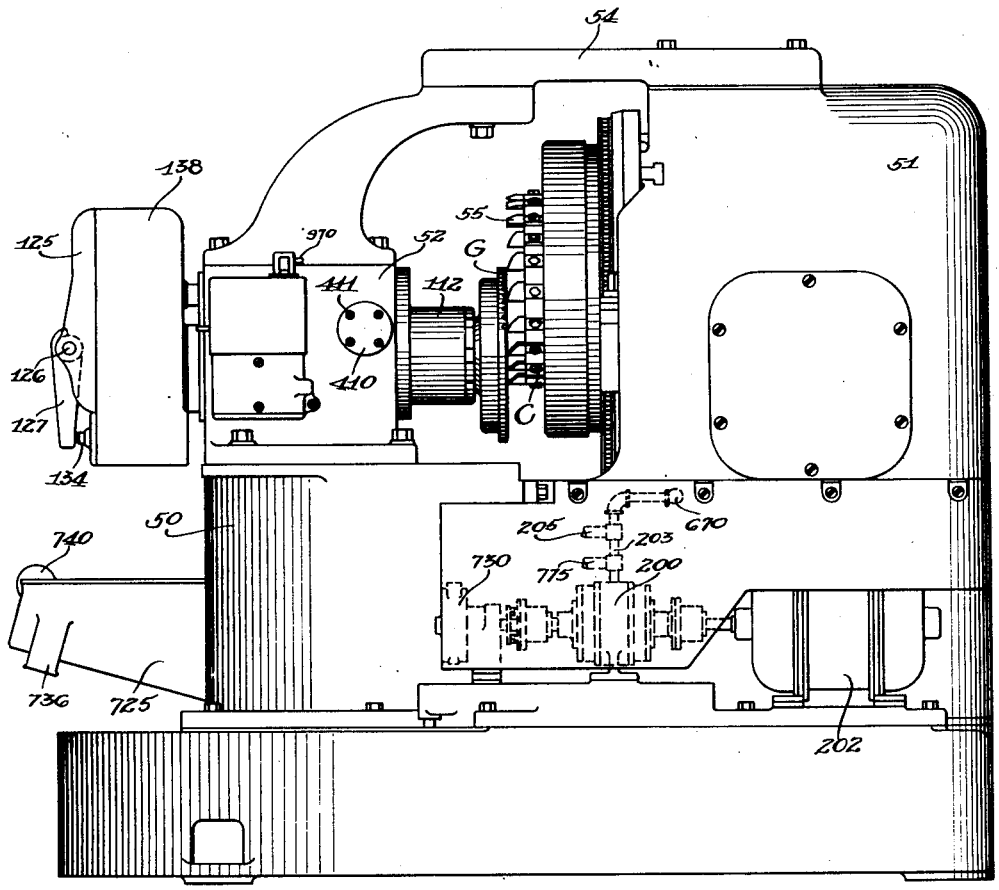
Figure 1 is a side elevation of a spiral bevel and hypoid gear cutting machine built according to a preferred embodiment of this invention.

The sleeve 64 is reciprocable in the tool support 75 and this tool support is angularly and slidably adjustable on the column 51 in a manner similar to the manner of adjustment of the tool support of the machine of prior application #519,327. These adjustments have only been indicated generally in the drawings of the present application as, for instance, in Figures 1 and 2, as they form no part of the present invention.

The cutter is driven from a motor 80 (Figs. 3 and 13) which is mounted upon a base 81 that is secured to the tool support 75. The drive is through a bevel pinion 82 which is connected by the coupling 83 to the armature shaft of the motor. This pinion meshes with and drives a bevel gear 84 which is secured to a shaft 85 that is journaled on anti-friction bearings 86 and 87 in the tool support 75. A spur gear 88 is secured to the outer end of the shaft 85. This gear meshes with a spur gear 89 that is secured to a shaft 90 which is journaled in the tool support 75 in parallelism with the shaft 85, being mounted in anti-friction bearings 91 and 92, (Fig. 2). The shaft 90 carries at its inner end a wide-faced spur pinion 94 that meshes with and drives the internal gear 73.

Cutter feed mechanism

The cutter is alternately fed into depth to cut the tooth spaces of the blank and withdrawn to permit indexing of the blank by reciprocation of the sleeve 64. There is a piston 95 (Fig. 2) secured to the sleeve 64 by screws 96. This piston reciprocates in a cylinder 97 bored in the tool support 75. One end of the cylinder 97 is closed by a stuffing box 98 which may be of any suitable construction, while the other end of the cylinder is closed by a cover-plate 99 which is secured to the tool support 75 by screws 100 (Fig. 3). The motive fluid is admitted to one side of the piston 95 through the ports 102 and to the opposite side of the piston through the ports 103 and 104. By application of the pressure-fluid alternately to opposite sides of the piston, the piston is driven alternately in opposite directions.

Mounting of the work

The gear blank G to be cut is mounted upon an arbor 110 (Fig. 4) that is secured in the work spindle 112. The gear blank G is centered on the arbor by a disc 113 which is secured to the arbor by screws 114. The gear blank is held against rotation relative to the arbor by the pin 115 which passes through one of the bolt openings in the blank. The gear is secured to the arbor by the clamp-plate 116 which is held in clamping position by the head 117 of the draw-bar 118. The draw-bar passes through the arbor and through a sleeve 120 which is secured in the spindle against axial movement. The draw-bar is constantly urged into clamping position by the coil-spring 122, which is interposed between the sleeve-piece 120 and the washer 123, which is secured against axial movement by the nut 124 which is adjustably threaded on the draw-bar 118. By adjusting this nut, the tension of the spring 122 may be adjusted.

The chuck is released by application of fluid pressure. Pivotally mounted on the index guard 125, as at 126, is a lever 127. One end of this lever carries a hardened piece 128 which is adapted to engage the outer end of a rod 129. The rod 129 is slidably mounted in a guide member 130 that is secured by screws 131 to the outer end of the work spindle 112. The rod 129 is so mounted as to be in alignment with the draw-bar 118 and to engage the inner end thereof.

The other end of the lever 127 carries a hardened piece 133. This is adapted to be engaged by the piston rod 134 of a piston 135 that reciprocates in a cylinder 136 formed in the index housing 138. The piston 135 is secured against a shoulder on the piston-rod 134 by the nut 140 which also serves to secure in place the washers 141 and 142. The outer end of the cylinder 136 is closed by the cap 143 and the piston rod 134 slides through an opening in this cap. The motive fluid may be admitted to or exhausted from the cylinder 136 through the port 145. The port 146 simply leads into a leak-return 147 that returns any oil, which may leak past the piston 135, to the sump. The index-guard 125 is secured to the index housing 138 by the hinge-pin 148 (Fig. 21) and by screws (not shown) which thread into the holes 149 of the index housing (Fig. 20).

When the pressure fluid is admitted to the cylinder 136 through the port 145, the piston-rod 134 is forced outwardly of the cylinder 136, swinging the lever 127 about its pivot 126 and forcing the rod 129 inwardly in the work spindle through its engagement with the contact-piece 128 carried by the lever 127. This forces the draw-bar 118 forward in the work spindle and in the arbor 110 against the resistance of the spring 122 to release the gear blank. The clamping plate 116 and the head 117 of the draw-bar may be made like those of the prior application mentioned so that by turning the plate 116 to align an opening therein with the head 117, the plate may be slipped over the head to allow a gear to be removed from or placed on the arbor.

To chuck a gear, after it has been positioned on the arbor, the motive fluid is simply exhausted from the cylinder 136.

*Mechanism for moving the work spindle to and from operative position*

Removal of a completed blank and chucking of a new blank is done when the work spindle is in loading position, that is, withdrawn from operative relation with the cutter. The mechanism for moving the work spindle to and from operative position will now be described.

The work head 52 is bored at 150 (Fig. 17) to provide a cylinder in which the piston 152 reciprocates. One end of this cylinder is closed by the cover-plate 153 which is held in position by the screws 154 while the other end of the cylinder is closed by a packing-box 155 which is secured in position by the screws 156. The piston 152 is secured against a shoulder of a piston-rod 158 by a nut 159 and washer 160. The piston rod passes through the stuffing-box 155, through an aligned opening in a switch-box 162 and through an aligned opening in the index housing 138 and the index housing is rigidly secured to the piston rod 158, being held against a shoulder formed on the rod 158 by the nut 163 and washer 164.

The index housing 138 is secured to the work spindle 112, against axial movement relative thereto, being held between a shoulder 165 formed on the work spindle (Fig. 4) and the index-plate 167. The index-plate 167 is keyed to the work spindle 112 by the key 168 and it is secured against axial movement relative to the spindle by the nut 169.

It will be seen, therefore, that when the piston 152 is moved in the cylinder 150 (Fig. 17) the work spindle will be moved with it to move the work spindle from loading to operating position or vice versa, depending upon the direction of movement of the piston. The motive fluid is admitted to opposite ends of the piston 152 through the ports 170 and 172.

To guide the index-housing 138 in its movement and to take the load of this housing off of the work spindle, the bar 175 is provided (Figs. 4 and 17). This bar slides in a hole 176 drilled in the work head. It is secured to the index housing 138 by the nut 177, the shoulder 178 on the bar being drawn up against the housing by this nut. The bar 175 moves with the work spindle and it is of sufficient length to support the weight of the index mechanism and of the work spindle and to allow the work spindle to move freely in the work head. The forward end of the hole 176 is closed by a plug 179.

*Mechanism controlling the work spindle movement*

The movements of the piston 152 are controlled by a valve 185 (Figs. 4 and 14). This valve is reciprocable in a sleeve 186 which is secured in the bore 187 of the valve block 188. This block is secured by bolts 189 to the side of the work head. The lower end of the bore 187 is closed by the cover-plate 190 of the valve block while the upper end of this bore is closed by the cover-plate 191. The two cover-plates are secured in position by screws 192 and 193, respectively.

The stem of the valve 185 passes upwardly through the cover-plate 191. It is secured by the pin 195 to the core 196 of the solenoid 197. The valve is normally pressed downwardly by the leaf-springs 199 which pass through an opening in the valve stem and are held between the lower wall of this opening and the pins 197 provided in the ears 198 of the cover plate 191.

The pressure fluid which serves to operate the machine is pumped from a sump in the base of the machine by a pump 200 (Figs. 1 and 29) which is driven by the motor 202. The fluid flows from the pump through a line 203 which branches, one branch going to the cutter end of the machine and the other branch to the work head end. This latter branch includes the pipe 205 (Figs. 14, 18 and 19).

This pipe 205 leads into a horizontal bore 206 drilled in the work head. There is a vertical duct 207 leading from the bore 206. This leads into a horizontal duct 208 which communicates with a vertical duct 209 (Figs. 14, 16 and 18). This leads into a horizontal duct 210 which communicates with the duct 211. The duct 211 is drilled through the valve-block 188. It communicates with the radial ports 212 cut in the valve-sleeve 186 of the withdraw valve 185.

The motive-fluid is exhausted from the chamber 187 of the withdraw valve through either the radially arranged ports 215 or 216 in the sleeve 186. The ports 215 communicate with a line 217, extending horizontally from the valve-block 188. The ports 216 communicate with a line 219 which extends parallel to the line 217. The two lines 217 and 219 lead into a vertical line 220 (Figs. 16 and 19). The line 220 leads into a horizontal line 221 which communicates with the vertical duct 222. The duct 222 leads into a duct 223 which parallels the duct 206. The pipe 224 leads from the duct 223 back to the sump. The outer end of the duct 221 is closed by a plug as is the lower end of the duct 222.

There are other radially-arranged ports 225 and 226 in the sleeve 186. The ports 225 communicate with a duct 227 which leads into a vertical duct 228. This leads into a horizontal duct 229, that leads into a vertical duct 230 (Figs. 17 and 19) which, in turn, leads into a duct 231 which communicates with the port 172 of the withdraw-cylinder 150. The duct 232 is simply drilled in the workhead casting to provide the port 172 and it is closed at its lower end by the plug 233. The lower end of the duct 230 is closed by the plug 234, while the cover-plate 153 of the cylinder 150 closes the end of the duct 230.

The ports 226 communicate with a horizontal duct 235 which leads into the vertical duct 236 (Figs. 14, 17 and 19). The duct 236 leads into a duct 238 which extends across the work head and leads into the horizontal duct 240. The duct 240 communicates with the port 170 of the with-draw-cylinder 150. The end of the duct 240 is closed by the cover-plate 155 of this cylinder, while the port 170 is formed by the drilled hole 241 whose lower end is closed by the plug 242.

When the valve 185 is in its lowermost position, which is the case when the work spindle is in inoperative or loading position, the pressure fluid will flow from the pipe 205 (Fig. 14) through the bore 206 (Figs. 14 and 19), the ducts 207, 208, 209, 210, and 211 and the ports 212 into the valve chamber 187. Thence it will flow through the ports 225, the ducts 227, 228, 229, 230 and 231 and the port 172 (Fig. 17) into the cylinder 150, forcing the piston 152 rearwardly in this cylinder to withdraw the work spindle from operative position. At this time, the motive fluid exhausts from the other end of the cylinder 150 through the port 170, the ducts 240, 238, 236, and 235, the ports 226 and 215, the ducts 217, 220, 221, 222, 223, and the pipe 224 back to the sump.

When the valve 185 is raised to the position shown in Figs. 4 and 14 when the solenoid 197 is energized, the pressure fluid will flow from the pipe 205 (Figs. 14 and 19) through the bore 206, the ducts 207, 208, 209, 210 and 211, the ports 212 and 226, the ducts 235, 236, 238 and 240, and the port 170 into the cylinder 150 to return the work spindle to operative position. At this time the motive fluid exhausts from the other end of the cylinder 150 through the port 172, the ducts 231, 230, 229, 228, and 227, the ports 225 and 216, the ducts 219, 220, 221, 222, 223, and the pipe 224 back to the sump.

Operation of chucking mechanism

When the work spindle is at the loading position, the chuck can be released to permit removal of the completed gear from the spindle and chucking of a new blank.

Pressure is supplied to the port 145 (Fig. 4) to release the chucking mechanism by rotating the three-way valve 250 (Figs. 19 and 29) to place the line 252 which leads to the port 145 on supply from the duct 253 which leads into the duct 231 (Fig. 17). At this time, the duct 231 is on supply as above described.

The pressure fluid flowing into the cylinder 136 through the port 145 moves the piston 135 rearwardly in this cylinder, swinging the lever 127 about its pivot 126 to force the draw-bar 118 forward in the work spindle 112 against the resistance of the spring 122.

When the completed gear has been removed from the work spindle and a new blank placed in position thereon, the new blank can be chucked by rotating the three-way valve 250 back to the position shown in Fig. 19. The port 145 is thus placed on exhaust, the pressure fluid exhausting from the cylinder 136 through the port 145, the pipe 252, the three-way valve 250, the pipe 255 and the duct 254 to the bore 223 (Fig. 19) which is drained by the exhaust pipe 224 as above described. When this is done, the spring 122 (Fig. 4) operates to return the draw-bar 118 to chucking position.

Switch for starting the machine operations and how it is controlled by the movement of the work spindle When the gear blank to be cut has been chucked, the operator starts the cutter motor. Through an electrical circuit which will be described more particularly hereinafter, the starting of the cutter motor causes the solenoid 197 (Figs. 4 and 14) to be energized, and the valve 185 is drawn upwardly to the position shown in Figures 4 and 14. As above described, this will place the port 170 (Fig. 17) on supply and the piston 152 will be moved forward in its cylinder, carrying the index-housing 138 forward and with it the work spindle 112 into operative position.

There is a nut 260 (Fig. 17) adjustably threaded on the piston rod 158. As the piston 152 moves forward in the cylinder 150, this nut strikes the tail-piece 262 of a switch-arm 263. The switch arm 263 is pivotally mounted on a pin 264 in the switch box 162 and tail-piece 262 is mounted upon the same pin 264. The two are resiliently connected together by a leaf-spring 268 which contacts the back of the tail-piece 262 and is secured by the screw 269 to the switch arm 263. The switch arm 263 carries a contact bar 266 which is adapted to make contact with the terminals 267. The switch-arm 263 is normally held open by gravity but when the nut 260 contacts the tail-piece 262, the switch arm is swung upwardly about its pivot 264 to make contact with the terminals 267 because the movement of the tail-piece 262 is transmitted to the switch arm 263 through the leaf-spring 268.

The terminals 267 are electrically connected to the solenoid 270 (Figs. 4 and 15) which control the index valve 272 so that when contact is made between the bar 266 and the terminals 267 the solenoid 270 is energized.

Index valve and index mechanism

The index valve 272 slides in the sleeve 274 which is mounted in the bore 275 of the valve-block 188 that is secured to the work head 52 as above described. The two bores 275 and 187 are parallel and the index valve and the with-draw-valve which slide in these bores, respectively, are arranged, also, parallel to one another.

The pressure fluid flows into the chamber 275 of the index valve from the duct 211 (Fig. 19) through the radially-arranged ports 282 formed in the sleeve 274. The valve is normally pressed downwardly in the chamber 275 by the leaf-springs 276 which pass through an opening in the valve stem and engage pins 277 secured in the ears 278 formed on the cover plate 191 of the valve-block 188. The valve 272 is raised to the postion shown in Figs. 4 and 15 when the solenoid 270 is energized as above described, for the stem of the valve is connected by the pin 279 to the core 280 of the solenoid.

When the valve 272 is in its lowermost position, the pressure fluid will flow from the ports 282 through the ports 283 in the sleeve 274 into the duct 284 (Figs. 15, 16 and 19), which communicates with a duct 285. The duct 285 leads into a vertical duct 286 which extends downwardly into the bore 288. Thence the pressure fluid flows through the pipe 289, which telescopes into the bore 288, (Fig. 18). A suitable packing 290 prevents leakage of the fluid along the pipe 289.

The pipe 289 threads into a hole 292 drilled in the index housing 138 (Fig. 26). The outer end of the hole 292 is closed by the plug 293. From the hole 292, the pressure fluid flows through the duct 294 into the vertical duct 295 (Fig. 26). There are two parallel horizontal ducts 296 and 297 leading from the duct 295 (Figs. 20 and 26). These ducts 296 and 297 lead, respectively, into ducts 298 and 299. Ducts 300 and 301 lead from the ducts 298 and 299, respectively, into the cylinder 302.

The outer end of the duct 294 is closed by a plug 305 and the upper and lower ends of the duct 295 are closed, respectively, by the plugs 306 and 307.

The cylinder 302 is bored in the index housing 138. One end of this cylinder is closed by the cover-plate 310 which is secured to the index housing 138 by screws 311 (Fig. 21). The other end of this cylinder is closed by the closure member 312 which is secured in position by the screws 313.

At the time that the ducts 301 and 300 are on pressure, the motive fluid is exhausted from the cylinder 302 through the duct 315 (Fig. 21), the duct 316 (Figs. 21 and 26), the vertical duct 317, the horizontal duct 318 (Fig. 26), to the vertical duct 320.

The duct 320 has another connection with the cylinder 302, namely, through the duct 322 (Fig. 21) but when the duct 320 is on exhaust, the duct 322 is closed by the ball-check valve 323 which is normally held closed by the coil spring 324. Both the check-valve and the spring are housed in the cover-plate 310.

The duct 320 leads into a duct 326 (Figs. 4 and 26) which communicates with a vertical duct 327 that leads into a hole 328 drilled in the index housing 138. One end of this hole is closed by the plug 329. The pipe 330 (Fig. 18) threads into the other end of this hole. This pipe telescopes in a bore 332 drilled in the work head 52. A vertical duct 333 (Fig. 19) leads from the bore 332 into a duct 334 which extends parallel to the bore 332 and has its outer end closed by a plug 335. A transverse duct 336 leads from the duct 334 to the vertical duct 337 (Figs. 15 and 19) that leads into the duct 338 which communicates through the ports 340 of the sleeve 274 with the chamber 275 of the index valve 272.

The motive fluid is exhausted from the chamber 275 of the valve 272 through either the ports 342 or the port 343, depending upon the position of the valve in the chamber 275.

The ports 342 lead into a duct 344 (Figs. 4 and 19) which leads into the duct 217 (Figs. 14 and 16). The ports 343 communicate with a duct 345 parallel to the duct 344 and leading into the duct 219. As already described, the two ducts 217 and 219 lead through the ducts 220, 221 and 222 into the bore 223 (Fig. 14) whence the motive fluid is returned to the sump through the pipe 224.

A piston 350 which actuates the index-mechanism, reciprocates in the cylinder 302. This piston is secured to a piston-rod 352 (Figs. 20, 21 and 26), being held against a shoulder formed on the piston rod by the nut 353. The piston rod 352 extends through an opening in the closure plate 312, a suitable packing 355 being provided to prevent leakage of the motive fluid along the rod.

The piston rod 352 is secured to a block 356 (Figs. 4, 20, 21 and 26) which slides in suitable ways 354 formed in the index housing 138. This block is held in its ways by gibs 357 and 358. The gib 357 is held in position by screws 359 while the gib 358 is held in position by screws 360 (Fig. 4). The block 356 is held against movement relative to the rod 352 by the nut 360 and the washer 361 (Fig. 21), the latter being interposed between the inner end of the block 356 and a shoulder formed on the rod 352.

Threaded into the block 356 is a stud 363 and on this stud there is pivotally mounted a pawl 364. This pawl is formed with a tooth or lug 366 (Fig. 23) which is adapted to engage in a notch of the index plate 167 and rotate the index plate when the piston 350 is moved to the left as shown in Figures 20 and 21. The pawl 364 is also formed with a lug 367 (Fig. 23) which is engaged by the index lock lever, as will hereinafter be described, when the index lock lever returns to locking engagement with the index plate, thereby rocking the pawl 364 about the stud 363 to disengage the pawl from the index-plate.

The work spindle is locked against rotation, during cutting, by the index lock-lever 370 (Figs. 20, 22 and 25) which is pivotally mounted on a stud 371 that is secured in the index housing 138. A hardened tooth 372 is secured to the lock-lever 370 by screws 373 and this tooth is adapted to engage successively in successive notches 375 of the index plate 167 to lock the index-plate and through it, the work spindle, against rotation during cutting of successive tooth spaces of the blank.

The lock-lever 370 is normally urged into released position by the coil spring 376 (Fig. 20). This spring is housed in a bore 377 drilled in the index housing and it is mounted upon a plunger 378 that reciprocates in this bore. The spring is interposed between one end wall of the bore and the head 379 of the plunger. This head is adjustable on the plunger to adjust the tension of the spring 377, nuts 380, which thread on the plunger, being provided for this purpose.

The plunger is furcated at one end, as indicated at 382. The furcations straddle the lower end of the index lock-lever 370 and are pivotally connected thereto by the pin 383. An arm 384 is formed integral with one of the furcations 382 (Fig. 25). This arm 384 is adapted to engage the plunger 385 of a standard automatic stop 386 so that each time the index lock-lever 370 is disengaged from the index plate, the plunger of the automatic stop is given a push to advance the stop. The automatic stop may be of any suitable construction. It may be, for instance, of the type described in the patent to M. H. Hill, No. 1,577,121 of March 16, 1926 and it will be set to trip after the predetermined desired number of teeth have been cut in the blank.

The lock-lever 370 is moved into and held in engagement with the index-plate against the resistance of the spring 376 by hydraulic pressure. There is a stud 390 adjustably threaded into one arm of the lock-lever. 391 designates a piston which reciprocates in the chamber 392 bored in the index housing 138 (Fig. 20). The motive fluid can be admitted to and exhausted from the chamber 392 through the port 393. When this port is on supply, the piston 391 is forced, as shown, to the left in the cylinder 392, engaging the pin or stud 390 and rocking the lock-lever 370 about its pivot 371 to force this lever into locking position with reference to the index-plate 167. When the port 393 is on exhaust, however, the index lock-lever is swung out of engagement with the index plate by action of the coil-spring 376.

To prevent backward rotation of the index plate and work spindle at the time the index lock-lever is unlocked, as will be described more particularly hereinafter, a stop-dog 395 is provided (Figs. 20 and 24). This dog is pivotally mounted on a pin 396 secured in the index housing 138. It is resiliently held in engagement with the index plate by the spring 397, one end of which engages a pin 398 held in a notch 399 of the dog. The other end of the spring seats in a recess formed in the index housing 138 and closed by the cap-screw 403. The tooth-shaped end of the dog 395 engages in the notches of the index plate, preventing backward rotation of the same but will ratchet out of these notches when the plate is rotated by the pawl 364 at the time of indexing.

*Means for clamping the work spindle during cutting*

Since, in the present machine, the work spindle is stationary during cutting and since the teeth of the gear blank are cut solely by a depthwise feed of the cutter, the work spindle is subjected during cutting to a greater torsional strain than is the case with the work spindle of a generating machine. To hold the work spindle rigidily during cutting so as to insure accuracy of tooth spacing in the gear which is to be cut, means is provided for clamping the work spindle itself against rotation during cutting. This means is in addition to the index lock-lever and is in the form of a pair of clamps which operate directly upon the work spindle.

The clamps are designated at 400 and 401 (Figs. 4, 14 and 18). They are in the form of a pair of blocks which slide in a cylindrical opening 402 formed transversely in the work head. The blocks have their lower faces turned at their adjoining ends on arcs of a circle to provide arcuate surfaces 404 and 405, respectively, which are of the same curvature as the periphery of the work spindle 112. Thus when the two blocks 400 and 401 are forced toward one another, they exert a clamping action on the work spindle to hold the work spindle rigidly against rotation and, in fact, against axial movement also.

The blocks are normally urged into released position by the coil-spring 406 which is interposed between the two blocks, being seated at its opposite ends in the recesses 408 and 409 formed in the adjoining ends of the two blocks. The blocks are forced together to apply a clamping pressure to the spindle by application of the hydraulic pressure, as will more particularly be described hereinafter. The outer ends of the bore 402 are closed by cap-members 410 so as to form hydraulic cylinders in which the blocks slide. The cap-members are held in position by screws 411 which thread into the work head. To prevent leakage of the motive fluid along the blocks, the cup-washers 412 are provided, one for each block. These are held in position by washers 413 and nuts 414, the nuts threading on stems 415 formed integral with the blocks 400 and 401, respectively.

*Control for work spindle clamps and index lock-lever*

The movements of the clamping blocks 400 and 401 and of the index lock-lever 370 are controlled by a valve 420 (Figs. 20, 21 and 26). This valve reciprocates in a sleeve 421 which is secured in the opening 422 drilled in the index housing 138. The outer end of this opening is closed by a cap-member 423 which is secured in position by screws 424.

The valve 420 is normally pressed to the right in Figures 20 and 21 by the spring 425. It is moved to the left against the resistance of the spring by the guide-block 356 for, when the block 356 is moved far enough to the left by the movement of the piston 350, it engages the head of the valve 420 and carries this value on to the left with it.

When the valve 420 is in its furthest position to the right, the cylinder 392 containing the piston 391 and the cylinder 402 containing the clamping blocks 400 and 401 will be on exhaust. Thus the index lock-lever will be withdrawn from engagement with the index-plate 167 by the spring 376 (Fig. 20) while the clamping blocks 400 and 401 will be released by the action of the spring 406 (Figs. 14 and 18). Hence the work spindle will be released.

The cylinders 392 and 402 are connected together so that the two will be on exhaust simultaneously or on supply simultaneously, depending upon the position of the valve 420. Ducts 430 and 431 (Figs. 14, 16 and 19) lead, respectively, from opposite ends of the cylinder 402 into a horizontal duct 432. This communicates with a vertical duct 433 that leads into the bore 434 drilled in the work head parallel to the bores 206 and 225 (Figs. 18 and 19). The pipe 435 telescopes in the bore 434, extending through the packing 436 and threading into the hole 438 (Fig. 26) in the index housing 138. The outer end of the hole 438 is closed by a plug 439.

There is a vertical duct 440 drilled in the index housing 138 and leading from the duct 438. The lower end of this duct 440 is closed by the plug 441. A duct 442 (Figs. 4 and 26) leads from the duct 440. This duct communicates with a duct 444 from which extends two right angular leads 445 and 446. The lead 445 communicates with the port 393 which leads into the cylinder 392 (Fig. 20).

The other lead 446 communicates with a vertical duct 448. This communicates with the ports 449 (Fig. 21) formed in the sleeve 421 of the valve 420. The other ends of the ducts 445, 446, 448 are closed by plugs 449, 450 and 451, respectively, (Fig. 26).

When the valve 420 is at the right under action of the spring 425, the lines just described are on exhaust while when the valve is moved to the left by the block 356, these lines are put on supply.

The pressure fluid is supplied to the valve-chamber 422 from the pipe 205 (Figs. 14 and 18). The pressure fluid flows from the pipe 205 into the bore 206 and thence into the pipe 455 which telescopes into this bore and which threads into the hole 456 (Fig. 26) in the index housing 138. Leakage of the pressure fluid from the bore 206 along the pipe 455 is prevented by the packing 457. The outer end of the hole 356 is closed by the plug 458.

A transverse duct 460 leads from the hole 456 at a point rearward of the rearmost end of the hole 328 so as not to interfere with the latter. A vertical duct 461 leads from the duct 460 into a transverse duct 462 whence the pressure fluid flows through the ducts 463 and 464 (Figs. 21 and 26) and ports 465 into the chamber 422 of the valve 420. The upper end of the duct 463 is closed by the plug 467 while the outer end of the duct 462 is closed by the plug 468.

The motive-fluid is exhausted from the chamber 422 of the valve 420 through the ports 470 in the sleeve 421. It flows thence through the duct 471 into a transverse duct 472 parallel to the duct 442 (Fig. 26), whence it flows into a vertical duct 473. The ends of the ducts 470 and 472 are closed by the plugs 474 and 475. The duct 473 communicates with the hole 477 into which is threaded the pipe 478. This pipe telescopes into bore 223 (Figs. 4, 14 and 18), in the work head 52 and from the bore 223, the exhaust fluid flows back through the pipe 224 into the sump. Leakage along the pipe 478 is prevented by the packing 479.

When the cylinder 392 is on exhaust, the piston 391 will be to the right of the cylinder (Fig. 20) and the index lock-lever 370 will be held out of engagement with the index-plate 167 by the action of the coil-spring 376. When the cylinder 392 is on supply, however, the piston 391 is moved to the left to the position shown in Figure 20, engaging the stud or pin 390 and forcing the index lock-lever 370 about its pivot 371 against the resistance of the spring 376 to engage the tooth 372 of the lock-lever with a notch 375 of the index-plate 167.

*Means for tripping the reverse valve after indexing has been completed*

There is a headed-pin 480 (Fig. 20) threaded into the free end of the plunger 378 and adjustably locked thereto by the lock-nut 481. When the tooth 372 of the index lock-lever 370 is in locking engagement with the index plate 167, the head 482 of the pin 480 engages a lever 484 which is pivotally mounted at 485 upon an ear 486 formed integral with a plate 487 that is secured to the index housing 138 at one side thereof.

There is a switch-arm 490 pivotally connected at 491 to the lever 484. A coil-spring 492 is interposed between the switch arm 490 and the lever 484, serving as a resilient connection between the two to cause the switch arm to move when the lever is moved. The switch-arm 490 carries a bar 495 that is adapted to make contact with the terminals 496.

The switch-arm 490 is normally held open by gravity, but when the index lever 370 is moved into engagement with the index plate 167 by the piston 391, the head 482 of the pin 480 is forced into engagement with the lever 484, rocking this lever about its pivot 485 and forcing the switch-arm 490 upwardly to bring the bar 495 into engagement with the terminals 496 to close an electrical circuit to a solenoid 500 (Fig. 2), as will hereinafter be more particularly described.

*The reverse and throttle valves and the controls therefor*

The solenoid 500 controls the movement of the feed reverse valve 502 (Figs. 2, 5, 8 and 9). This valve slides in a sleeve 503 housed in a bore 501 of the valve casing 504 which is secured to the tool support 75.

The reverse valve 502 is normally pressed to the right (Figs. 2, 8 and 9) by the coil-spring 505 which is interposed between the right end of the sleeve 503 and a collar or shoulder 506 formed on the valve stem. The cover-plate 99 of the tool support acts also as an end-plate for the valve casing 504 and it is formed to provide a pocket in which the spring 505 is contained. The movement of the valve 502 to the right is limited by the engagement of the collar or shoulder 506 with the cover-plate 99. The stem of the valve passes through an opening in the cover-plate 99 and is formed exteriorly of the cover-plate with a knob 507 so that the valve can be manually moved to the left against the resistance of the spring 505.

The valve is automatically moved to the left when the solenoid 500 is energized as above described, the valve stem being connected by the pin 508 with the core 509 of the solenoid.

Besides the reverse valve 502, there are a throttle-valve, a by-pass valve, a safety by-pass valve, and a safety valve mounted in the tool head 75.

The throttle-valve is designated at 510 (Figs. 7 and 8). It slides in a sleeve 511 mounted in a bore 513 in the valve-casing 504 and provided with diametrically opposed port-openings 512. The valve 510 is constantly urged to the right (Figures 7 and 8) by the coil-spring 514 to close these port-openings. The movement of the valve 510 is controlled from the movement of the sleeve 64 (Fig. 2) in which the cutter spindle is journaled. The two port openings 512 are of different length. This tends to make the throttle-valve operate uniformly for a given rate of feed despite heating up of the motive fluid in the use of the machine.

There is a cap-member 515 secured to the sleeve 64 so as to move therewith. This cap-member (Figs. 2 and 7) is provided with a flange 516 which is secured between a shoulder on the sleeve 64 and the inner face of the piston 95. A sleeve 518 threads into this cap-member. The sleeve 518 is threaded at its outer end and the nut 519 is adjustably threaded thereon. The sleeve is formed with a shoulder 520 at a point intermediate its ends and it passes through guide-openings formed in the cover-plate 99. To prevent leakage of the motive-fluid along the sleeve 518, a packing is provided, as indicated at 521. This is secured in the cover-plate 99 by the cap 522 which is secured in position by the screws 523. The length of stroke of the piston 95 and of the sleeve 64 is governed by the distance between the shoulder 520 and the nut 519, the shoulder 520 contacting against the cap 522 at one limit of movement of the piston and the nut 519 contacting the outside of the cover-plate 99 at the other limit of movement of the piston.

As stated, the nut 519 is adjustably threaded on the sleeve 518 and it may be secured in any adjusted position by the lock-nut 525. To make the adjustment of length of stroke of the piston easy, the nut 519 might be provided with peripheral graduations to read against a zero mark which might be scribed on the outer face of a guard 526 which is secured by screws 527 (Fig. 3) to the cover-plate 99.

After a cutter is sharpened, the height of its blades will be decreased and the cutter must be fed further in toward the blank to produce tooth spaces in the blank of the desired depth. The same length of stroke of the piston 95 is used as when the cutter is new, but the position of the stroke is changed. This is done by adjusting the sleeve 518 in the cap-member 515 and may be accomplished by applying a wrench to the hexagonal-shaped outer end 527 of the sleeve 518. To lock the sleeve 518 against movement after it has been adjusted in the manner just described, a rod 528 is provided. This rod slides in a central bore in the sleeve 518 and is adjusted by threading the pin 529 in the sleeve 518. The pin 529 contacts at its inner end with the outer end of the rod 528 and by threading up on the pin, the inner end of the rod 528 can be forced into contact with the flat surface 530 formed on the bottom inside wall of the cap 515, to thereby jam the threads of the sleeve 518 into locking engagement with the mating threaded portion of the cap 515. To prevent leakage of the motive fluid along the rod 528, the washer 532 is provided. This is held in place by the cap 533 which threads into the inner end of the sleeve 518.

The sleeve 518 is formed with a peripheral groove 535 at a point intermediate its ends. 536 designates a lever which is held between the shoulders formed by the groove 535 in the sleeve 518 (Figs. 5 and 7) and which is, therefore, rocked with the movement of the piston 95. There is a pin 537 secured to the lever 536 and having an enlarged outer end that is adapted to slide in a slot 538 of the side-plate 539 to guide the lever in its movement. The side-plate 539 is secured to the cover-plate 99 by screws (not shown). The lower end of the lever 536 engages a pin 540 which is secured in the side of a sleeve 541 that slides in a hole 543 drilled in the cover-plate 99 in alignment with the bore 513 in which the throttle-valve 510 slides (Figs. 5, 7 and 8).

There is a pin 542 adjustably mounted in the sleeve 541. The pin 542 threads into a nipple 545. This nipple 545 is formed with a head 546 at its inner end and is secured in a socket in the sleeve 541 by a hollow nut 547 which threads into the sleeve 541 and abuts at its inner end against the flange or collar 546 of the nipple 545. The pin 542 at its inner end engages the outer face of the throttle-valve 510.

The pin 540 engages in a hole in one side of the sleeve 541.

Two fulcrums are provided for the lever 536. These are usable selectively, one being used when gears are being roughed on the machine and the other being employed only when gears are being finish cut. The plunger 550 constitutes one of these fulcrums. This plunger slides through an opening 549 in the cover-plate 99 and is housed in a cap 551 which is secured to the cover-plate 99. The fulcrum-plunger 550, when in use, is resiliently held in position by the coil-spring 552 which surrounds the plunger and is enclosed in the cap 551. This spring seats at one end against the flange 553 formed on the plunger. The tension of the spring 552 can be adjusted by adjusting the nuts 554 which thread on the stem of the plunger 550 and the plunger can be completely retracted from operative position, also, by adjusting these nuts 554.

The fulcrum 550 is only used during finishing. For roughing, the adjustable pin 557 is used as the fulcrum of the lever 536.

The side-plate 539 is formed with communicating slots 555 and 556 (Figs. 5 and 7) and the pin 557 passes through these slots, projecting inwardly far enough so that it lies in the path of movement of the lever 536. This pin is formed with an integral squared collar 558 that engages in the guide groove or slot 555. There is a block 559 mounted on the pin 557 and shaped to slide in the slot 556. The pin 557 is adjustable vertically in the slots 555 and 556.

During a roughing operation, the plunger 550 is retracted entirely out of the path of movement of the lever 536 by properly adjusting the nuts 554. At this time the pin 557 serves as the fulcrum for the lever, the lever rocking on the pin 557, as the piston 95 feeds the cutter C into depth, and allowing the sleeve 541, pin 542 and throttle-valve 510 to be moved gradually to the right (Figs. 7 and 8) under actuation of the spring 514. Thus as the cutter feeds into depth, the area of the port openings 512 is gradually reduced by the movement of the throttle-valve. This gradually slows up the feed of the cutter as will hereinafter appear and as is desirable because the deeper the cutter feeds into the blank, the heavier is the cut which it must take.

The rate of the roughing feed can be determined accurately for different sizes of gears by adjustment of the pin 557 in the slots 555 and 556.

The pin 557 is secured in any adjusted position by tightening up on the nut 561 to pull the squared portion 558 of the pin up against the shoulder formed at the junction of the slots 555 and 556 and to jam the guide-block 559 into clamping engagement with the slot 556.

When gears have already been roughed out and require only to be finish cut, the pin 557 is dropped down out of the way and the nuts 554 are unthreaded far enough to allow the plunger 550 to project through the aperture 549 in the cover-plate 99 to serve as the fulcrum for the lever 536. When this plunger is used as the fulcrum, a more rapid movement of the throttle valve 510 takes place. This is as is desirable. There is very little stock to be removed from the tooth slot in a finishing operation and hence, for the purpose of saving in production time, it is desirable that the cutter be moved into full depth position as quickly as possible. The position of the fulcrum 550 allows of a quick movement of the cutter into depth with a quick shutting off of the port openings 512 by the throttle-valve when the cutter has reached approximately full depth position and the feed requires to be slowed up.

*The by-pass valve*

The by-pass valve is of the tappet type and is shown at 560 in Figure 6. This valve fits in a sleeve 562 which is secured in the bore 563 of the valve block 504. The sleeve is provided with ports 566 and 567 and these are connected by a peripheral groove 568 turned in the sleeve.

The stem of the tappet-valve 560 slides in the bore 569 of the valve-sleeve 562 and the valve serves to close the outer end of this bore. The valve is held to its seat on the sleeve by the coil-spring 570 which fits at one end over the lug 571 formed on the valve and which seats at its other end in a recess 572 formed in the rear cover-plate 573 of the valve-block 504.

*Safety and safety by-pass valves*

The safety by-pass valve is designated at 575 and is shown in Figures 7 and 9. It slides in a sleeve 576 which is secured in the bore 577 of the valve-block 504. The valve 575 is normally urged to the right in the sleeve 576 by a coil-spring 578 which is interposed between the inner end of the valve and the cover-plate 573 of the valve-block. The sleeve is formed with three sets of radially-arranged ports designated at 580, 581 and 582, respectively. The ports 581 and 582 are connected by a peripheral groove 583 turned in the valve-sleeve 576.

The safety-valve comprises a plunger 585 (Fig. 9) which is housed in a bore 587 formed in the valve-block 504. The stem of this plunger extends through an opening in the cover-plate 573, but the plunger is normally pressed inwardly into the bore 587 of the valve-block by the coil-spring 588 which is interposed between the cover-plate 573 of the block and the washer 589 that is slidable on the plunger and is normally pressed against the head 590 of the plunger. 592 designates a thimble which fits over the head of the plunger 585, serving to guide the plunger in its movement in the bore 587. There is a spring 586 interposed between the head of the plunger and the thimble 592. The sleeve 591 which is housed in the bore 587 and in which the head of the plunger and the cap 592 which is secured thereto slides, is formed with a helical groove 593 which serves to convey the motive-fluid from the duct 594 to the ports 598 in the sleeve whence it flows into the bore 587.

595 designates an electrical switch of standard construction. This is a normally open switch. When the plunger 585 is in its right-hand position shown in Figure 9, the switch is allowed to open, but when the pressure of the motive fluid in the system is great enough, as will be referred to more particularly hereinafter, the thimble 592 will first be forced to the left compressing the spring 586. Then the plunger 585 will be forced to the left, the spring 588 being compressed by the engagement of the thimble with the washer 589.

This causes the plunger 585 to close the switch arm 587 by its engagement with the roller 596 carried by the switch arm and an electrical circuit is made for a purpose which will be described more particularly hereinafter.

*Four-way contactor and its operating mechanism*

600 (Fig. 6) designates a four-way contactor having two pairs of terminals 601 and 602, respectively. 603 designates the plunger forming part of this contactor and provided with bars 604 and 605 adapted, respectively, to make contact with the terminals 601 or 602 depending upon the position of the plunger 603. When the machine is in operation, this contactor controls its operation as will be described more particularly hereinafter.

The contactor is operated from the movement of the feed piston 95. There is a cap-member 610 (Figs. 6 and 7) secured to the cover-plate 92 and surrounding the sleeve 518. 611 designates a key which is secured in the cap and is slidable in a slot 609 formed both in the cap 610 and the cover-plate 99.

612 designates a lever (Figs. 5 and 6) which is pivotally mounted upon a stud 613 that threads into the valve-block 504. One end of this lever engages in a peripheral slot 614 milled in a plunger 615 that is secured to the head of the plunger 603 of the contactor 600. The other end of this lever is shaped to move between the key 611 and the upper end of the lever 536 so that when the piston 95 moves in one direction, the key 611 strikes and shifts the lever 612 while when the piston 95 moves in the opposite direction, the lever 612 is struck and shifted by the upper end of the lever 536. As the lever 612 is thus shifted in opposite directions, the contactor 603 is shifted in opposite directions to cause contact to be made alternately at the terminals 601 and 602 for a purpose which will hereinafter appear.

To quickly shift the lever 612 at opposite ends of the stroke of the piston 95, a load and fire mechanism is provided. 620 designates a rock-shaft which is journaled in the cover-plate 99. There is an arm 621 secured to the upper end of this shaft, one end of this arm being split to form a split-clamp which is forced together by the bolt 623 to clamp the arm to the shaft 620. The free end of this arm carries a pin 625. The pin 625 enters a hole 626 formed in the arm 612. Adjustable set screws 627 and 629 are threaded through the arm 612 into opposite sides of the hole 626 and are locked in adjusted position by the lock nuts 628.

There is an arm 630 clamped to the lower end of the shaft 620, one end of this arm being split and clamped to the shaft by the bolt 631. The sides of this arm converge to a point at its free end as clearly shown in Figure 6.

633 designates a plunger which slides in a bore 634 in the cover-plate 99. This plunger is urged outwardly of the bore by a spring 635 which seats in a socket in the plunger at one end and has its other end abutting the cover-plate 636, which is secured to the cover-plate 99 by screws 637.

The free end of the arm 630 contacts the outer end of the plunger 633 which is of V-shape, the lever 630 and plunger 633 constituting a load and fire mechanism for quickly reversing the position of the lever 612 and shifting the contactor plunger 603.

To allow a dwell at the end of the cutting stroke, a dash-pot is provided, however, to slow up the action of the load and fire mechanism in one direction of its operation. This dash-pot comprises a plunger 640 which slides in a bore 641 of the cover-plate 99.

There are two small air and leak returns leading from the cylinder 97 (Fig. 2) at opposite sides of the piston 95. These two leads are designated at 645 and 646, respectively. They are drilled into the tool head 75 and merge into a single lead 647. The lead 647 runs into a duct 648 (Fig. 5) which runs alongside the rock-shaft 620, conveying the oil leaking from the cylinder 97 over the rock-shaft 620 to lubricate the same. From the duct 648, the lubricant flows into the pocket 649 in the cover-plate 99. This pocket communicates with the bore 641 in which the plunger 640 reciprocates. A duct 650 leads from the pocket 649 parallel to the bore 641. This duct 650 is normally closed by the ball-check valve 652 which is resiliently held in position by the coil spring 653. A second duct 655 is drilled in the cover 99 parallel to the bore 641 and the duct 650. This duct also communicates with the pocket 649. A transverse duct 656 leads from the duct 655 into the bore 641. Its outer end is closed by the plug 657. The ends of the ducts 650 and 655 and of the bore 641 are closed by a cover-plate 658 which is secured to the cover 99 by screws (not shown). There is a transverse groove or duct 659 formed on the inside face of this cover plate. It communicates with the bore 641 and with both of the ducts 650 and 655. There is a screw 660 threaded into the cover-plate 658. This screw is provided with an enlarged head 662 so that it can be adjusted manually to adjust the area of the opening between the groove 659 and the duct 655. A duct 664 (Fig. 5) leads from the bottom of the pocket 649 into a drain pipe 665 which leads back to the sump.

The lever 612 is, as above stated, tripped by the key 611 and the lever 536, respectively, at opposite ends of the stroke of the piston 95. When the key or the lever 636, as the case may be, strikes the lever 612, the lever 612 is rocked about its pivot stud 613; one or other of the set screws 627 or 629 is brought into contact with the pin 625, rocking the rock-shaft 620. When the end of the arm 620 secured to the rock-shaft rides over the tip of the plunger 633, the load and fire mechanism, of which the plunger is a part, throws the arm over quickly, transmitting this quick motion back through the pin 625 and opening 626 to quickly shift the lever 612 in one direction or the other, thereby shifting the contactor bar 603. The dash-pot mechanism operates only in one direction, namely, on the feed stroke and serves to cause sufficient dwell to allow the cutter to clean up at the bottom of the cut. Thus, when the lever 612 is shifted by the key 611 on the feed stroke of the cutter piston 95, the lever 612 moves the rock-shaft just beyond neutral position through the pin and slot connection 625—626 and the rock-shaft is carried the rest of the way by the load and fire mechanism including the plunger 633. However, the dash-pot mechanism prevents rapid movement, for the arm 630 lies in a recess 667 in the plunger 640 and as the plunger moves downwardly in Figure 6, the ball-check valve 652 is seated and the duct 656 is closed by the plunger 640 so that oil can escape from the bore 641 only through the groove 659 and duct 655. The rapidity of escape is determined by the adjustment of the screw 660. The rock-shaft arm 630 moves under actuation of the plunger 633, then, only as fast as the oil escaping from the bore 641 allows it. The adjustment of the two set screws 627 and 629 governs the amount of play which is allowed between the rock-shaft 620 and the lever 612 to allow of the dash-potting of the movement of the shaft so that the movement of the shaft 620 is not transmitted immediately to the lever 612. Thus, there is a slight pause or dwell before the lever 612 is moved to shift the plunger 615 of the contactor 600. This pause or dwell allows of the cleaning up of the bottom of the tooth space cut, as already described.

*Connections between the various valves on the tool end of the machine*

When the reverse valve 503 is in the position shown in Figs. 2, 8 and 9 of the drawings, the pressure fluid flows from the pipe 670, which is a branch of the pipe 203 (Fig. 1), into the bore 501 of the reverse valve. Thence it flows through the ports 672 and 672 of the valve sleeve 503 into the duct 675, the lower end of which is closed by the plug 676 (Figs. 8, 10, 11 and 12). The duct 675 leads into a duct 677 which communicates with the peripheral groove 678 turned in the sleeve 511 (Fig. 8) of the throttle-valve 510. The ports 512 in the sleeve 511 communicate with this peripheral groove 678.

The amount of the pressure fluid flowing through the ports 512 from the groove 678 depends upon the position of the throttle-valve 510, which, as above described, is controlled from the movement of the piston 95 itself. From the chamber 513 of the throttle-valve, the pressure fluid flows through the ports 512 into the line 679 which is really a continuation of the bore 677. The duct 679 leads into a vertical duct 680 (Figs. 10, 11 and 12). The duct 681 leads from the duct 679. The outer ends of the ducts 678, 680 and 681 are closed by plugs 682, 683 and 684, respectively. A duct 685 leads from the duct 681 and from this duct, the duct 686 leads into the port 104 (Fig. 2) in the cylinder 97. The outer end of the duct 685 is closed by the plug 688.

The duct 677 leads not only into the chamber 513 of the throttle valve but also into the chamber 563 of the bypass valve (Figures 6, 10, 11 and 12). The pressure fluid flows around the groove 568 in the sleeve 562 in the chamber, through the ports 566 and 567, forcing the valve 560 open against the resistance of the spring 570. The pressure fluid flows then through the open valve into the duct 690 that communicates with the port 103 in the cylinder 97, this port being on the same side of the piston as the port 104 (Fig. 2).

A line 692, which is really a continuation of the bore 690, leads from the chamber 563 of the bypass valve (Figs. 6 and 10) into the chamber 577 of the safety by-pass valve. This duct 692 leads into the grooves 583 formed in the sleeve 576 (Figs. 7 and 9) and from these grooves leads into the port 582, assisting the spring 578 in forcing the valve 575 to the right to close the ports 581 and prevent communication between these ports and the ports 580.

At this time, the motive fluid exhausts from the cylinder 97 (Fig. 2) through the port 102 which leads into the duct 695 (Figs. 10, 11 and 12). The duct 695 leads into a duct 696, the outer end of which is closed by the plug 697. A duct 698 leads downwardly from the duct 696 into the ports 699 of the sleeve 503 of the reverse valve (Figs. 8 and 9). From the ports 699, the fluid exhausts through the port 700 into the duct 701 (Fig. 12) which is connected by the pipe 702 with the sump.

At this time, also, the motive fluid exhausts from the front end of the safety by-pass valve 575 (Figs. 7 and 9) through the ports 580, the duct 705 (Figs. 10, 11 and 12), the duct 706, the duct 707, and the duct 708 which leads into the duct 696 above referred to. The outer ends of the ducts 705, 706, 707 and 708 are closed by plugs 710, 711, 712, and 713, respectively.

When the reverse valve is shifted by the energizing of the solenoid 500 (Figure 2), the pressure fluid flows from the pipe 670 through the ports 672 and 699 (Figs. 7 and 9), the ducts 698, 696 and 695 and the port 102 (Fig. 2) into the cylinder 97 forcing the piston 95 forward in that cylinder and feeding the cutter into the blank.

The spring 578 of the safety by-pass valve (Figs. 7 and 9) is strong enough to keep this valve closed under normal operating conditions, but should the cutter strike a hard place in the blank, which would set up a greater resistance to its feed, then the pressure built up in the line would be great enough to open the safety by-pass valve 575 against the resistance of the spring 578 and cause the pressure fluid to by-pass through the ducts 708, 707, 706 and 705 through the ports 580 and 581 of the by-pass valve, the grooves 583 and the port 582 of this valve into the line 692, which, at this time, as will now be described, is on exhaust. Thus the building up of excessive pressure is prevented and the cutter will not be forced forward, to its own damage, into the blank. The operator will have to stop the machine and eliminate the condition which has caused the building up of the excessive pressure.

As the cutter feeds into the blank, the motive-fluid exhausts from the front end of the piston 95 through the port 104. The by-pass valve 560 is closed by the spring 570 (Figures 6, 10, 11 and 12) as soon as the port 103 is put on exhaust so that the line 690 leading from the port 103 (Fig. 2) is closed off. The fluid flowing through the port 104 is conducted through the ducts 686, 685, 681, 680 and 679, the ports 512 of the throttle-valve, the duct 677, the duct 675 and the ports 673 and 715 of the sleeve 503 of the reverse valve 502 (Figs. 8 and 9) into the duct 717. The outer end of the duct 717 is closed by a plug 718 and this duct leads into a duct 719 which communicates with the duct 701 that is connected by the pipe 702 with the sump. The outer end of the duct 719 is closed by the plug 720.

The speed or rate of the feed movement is controlled, as above described, by the movement of the throttle-valve 510 from the lever 536.

*Chip-conveyor and actuating means therefor*

The chips cut from the blank and the cutting oil or coolant fall from the blank into a chute (not shown) which conveys them into the receptacle 725 (Fig. 27) through the opening 726 in the cover 728 of this receptacle. The bottom wall 729 of this receptacle is inclined to the horizontal with the result that the cutting oil tends to settle out at one end of the receptacle. It may be pumped out of the receptacle by a pump 730 of any suitable type and re-used.

The chips are picked up and carried out of the receptacle by the inclined screw conveyor 732. This screw conveyor may be formed of sheet metal twisted around a hollow hub 733 which may by fixedly secured in any desired manner to the shaft 734. The shaft 734 is journaled at its opposite ends in suitable bearings provided therefor in the receptacle 725.

There is a discharge opening 736 formed in the lower wall 729 of the receptacle. As the conveyor 732 is rotated, it will carry the chips from the bottom of the receptacle upwardly and discharge them through the opening 736 whence they may drop into a box or other suitable receptacle for removal.

The conveyor 732 may be rotated by any suitable means. I have disclosed a self-contained hydraulically-operated unit for imparting a step-by-step rotational movement to the conveyor.

This unit is housed in the housing 740 which may be secured in any suitable manner to the receptacle 725 at one side thereof. This housing is generally cylindrical in shape and is hollow. Its two ends are closed by the cap-members 742 and 743. Fitted in the bore of the housing is a sleeve member 744. The ends of this sleeve member abut against the inner faces of the cap-members 742 and 743 and consequently the sleeve member is held against longitudinal movement in the housing. A hollow sleeve or valve 745 slides in the bore of the sleeve member 744.

746 and 747 designate, respectively, two pistons that slide in the bore of the sleeve member 744. These pistons are connected so as to travel together, being secured by nuts 749 and lock-washers 750 against spaced shoulders 751 formed on the piston rod 752. The rod is threaded to receive the nuts 749. It extends through the central opening formed in the valve-sleeve 745 and projects outwardly of the housing 740 through a guide-opening formed in the cover-plate 743.

There is a sleeve 755 secured by the set-screw 756 to the outer end of the piston rod 752. A pawl 757 is pivotally mounted on this sleeve 755. It engages a ratchet wheel 758 that is secured to the shaft 734 on which the worm-conveyor is mounted. It will be evident that on each reciprocation of the piston rod 752, the ratchet wheel 758 will be advanced a step to impart a step-by-step movement to the conveyor.

Coil springs 760 and 761, respectively, are interposed between the pistons 746 and 747, respectively, and the adjacent end faces of the valve sleeve 745.

The valve sleeve 745 is formed with four spaced guide or collar portions 762, 763, 764 and 765. It is also provided with a V-shaped peripheral ridge 766 between the collar portions 763 and 764 and lying substantially midway its length. A pair of balls 767 disposed at diametrically opposite points with relation to the valve-sleeve 745, cooperate with the ridge 766 to form a load and fire mechanism for shifting the valve sleeve 745 as will hereinafter be more particularly described. These balls 767 are constantly urged inwardly into engagement with the valve sleeve 745 by coil springs 768 which are housed in the bores of nipples 769 that are secured at diametrically opposite points in the housing 740. The springs abut at one end against the balls 766 and at the other end against plugs 770 that thread into the bores of the nipples 769 and close the outer ends of these bores.

Fluid under pressure is conducted from the pipe 775 (Fig. 1), which is a branch of the pipe 203, into the casing 740 through the port opening 776 (Fig. 28). In the position shown in the drawings, the pressure fluid flows through the port opening 780 in the valve sleeve 744 into a duct 781 in the housing 740. Ducts 782 and 783 lead from the duct 781. The first of these leads directly into the bore of the sleeve member 744. The other is normally closed by a ball-check-valve 784 which is normally held in position by a coil spring 785. The spring 785 is seated in a socket 786 formed in the cover-plate 742. When the duct 781 is on pressure, however, the check-valve 784 is opened and the pressure fluid may flow, also, through the duct 783 into the pocket 788 whence it flows through the port 789 into the bore of the sleeve-member 744.

The pressure fluid acting against the piston 746 moves the pistons 746 and 747 and the piston rod 752 which connects the same, to the right as viewed in Figure 28. At this time, the fluid exhausts from the right end of the bore of the sleeve member 744 through the ports 790 in the sleeve member 744, the duct 791 in the housing 740, the port 792 in the sleeve member 744, and the ports 793 in the valve sleeve 745 into the hollow bore of this valve-sleeve. Thence the exhausting fluid flows through the bore of the valve-sleeve 745 and the ports 795 of the valve-sleeve, the ports 796 of the sleeve-member 744 and a duct 797 in the housing 740 into the exhaust pipe 798 which threads into this housing. The pipe 798 leads back to the sump of the machine.

As the pistons 746 and 747 thus move to the right in Figure 28, the coil spring 760 is compressed for the valve-sleeve 745 is held against movement with the piston by the action of the ball-detents 767 which are in engagement with the V-shaped ridge 766 of the valve-sleeve 745.

As the pistons 746 and 747 move to the right, the pawl 757 is disengaged from that tooth of the ratchet wheel with which it has been in engagement and drops into engagement with a succeeding tooth.

The spring 760 is strong enough so that when the pistons 746 and 747 have moved far enough to the right to fully compress this spring, it will overcome the resistance of the ball-detents 767 backed up by the spring 768 and will force the valve-sleeve 745 to the right against the resistance of the springs 768. At this time, the balls 767 will ride up on the ridge 766 of the valve-sleeve 745 and as soon as they have passed over the tip of this ridge, the springs 768 will again come into action acting as a load and fine mechanism and cooperating now with the spring 760 to quickly shift the valve-sleeve 745 to the right.

This reverses the movement of the pistons 746 and 747 for the pressure fluid now flows from the port 776 through the port 792 in the sleeve-member 744, the duct 791 and the port 790 in the sleeve-member 744 to the right end of the piston 747. The check-valve 800 is also forced open against the resistance of the spring 801 so that the pressure fluid may also flow through the port 802, the pocket 803 and the ports 804 in the sleeve-member 744 into the right end of the bore of the sleeve-member 744. At the same time, the fluid exhausts from the left end of the piston 746 through the ports 782, the duct 781, the ports 130, and the ports 795 of the valve-sleeve 745 into the bore of this sleeve. Thence the exhaust fluid flows either through the ports 795 of the valve sleeve 745 and the port 796 of the sleeve member 744 into the duct 797 or through the ports 793 of the valve-sleeve 745 and the ports 805 of the sleeve-member 744 into the duct 797. From the duct 797, the exhaust fluid flows through the pipe 798 back to the sump. At this time, the check-valve 784 is closed by the spring 785.

As the pistons 746 and 747 move to the left, the piston rod 752 is carried to the left also and the pawl 757 rotates the ratchets wheel 758 to impart movement to the chip conveyor. As the pistons move to the left, the coil spring 761 is compressed and when it has been compressed far enough, the valve-sleeve 745 is forced past center against the resistance of the ball-detents 767 and the spring 768 and the valve sleeve is shifted back to reverse the direction of movement of the pistons. Thus the hydraulic mechanism for actuating the pawl 757 and ratchet wheel 758 is self-contained and self-reversing.

The check-valves 784 and 800 are provided to dampen or dash-pot the last parts of the movement of the pistons 746 and 747 to the left or right, respectively. Thus, when the piston 747 has moved far enough to the right, the port 790 will be shut off and the exhaust fluid will be entrapped between the right end of the piston 747 and the check-valve 800. It will act as a cushion at the moment of reversal of the direction of movement of the pistons. In the same way, when the pistons have moved far enough to the left, the port 782 will be shut off by the piston 746 and fluid will be entrapped between the left end of the piston 746 and the check-valve 784, acting as a cushion just before reversal.

*Electrical starting circuit of the machine*

To put the machine into operation, the operator first starts the feed motor 202 (Fig. 1) which drives the pump 200. The feed motor is started by pressing a start button 810 (Fig. 29). This is a normally open button of standard nonstruction and may be mounted at any convenient point on the machine.

When the start button 810 is pushed in, a circuit is closed from the main line 812 through the terminal 813 of a magnetic starter 814 which may be of any suitable construction. The circuit includes the line 812, the terminal 813, the line 815, the terminal 816 of the controller, the line 817, the terminal 818 of the start button, the terminal 819 common to the start button and a stop button 820, the terminal 821 of the stop button, the line 822, the terminal 823 of the controller, thence through the winding 824 of an electro-magnet mounted in the controller 814, the line 825, the terminal 826 of an emergency stop button or switch 827, the terminal 828 of this button, the line 829, the line 830 and the terminal 831 of the controller and the main line 834. The third main line is designated at 832. It is connected to the controller 814 by the terminal 835.

The feed motor is connected to the controller 814 by the lines 837, 838 and 839.

With the pressing in of the start button 810, therefore, the feed motor 202 is started through the connection of this motor to the controller 814. Simultaneously, the electro-magnet 824 is energized, causing the switch arms 840, 841, 842 and 843, which are connected together, to make contact, respectively, with the terminals 831, 835, 813 and 844 of the controller. As soon as the operator releases the starter button 810 it springs open but the circuit to the feed motor 202 is now maintained from the main line 834 through the terminal 831 of the controller, the line 830, the line 829, the terminals 828 and 826 of the emergency stop button, the line 825, the coil 824, the terminal 823, the line 822, the terminals 821 and 819 of the stop-button 820, the line 845, the terminal 844, the switch arm 843, the line 846, the line 815 and the terminal 813 to the main line 812.

As soon as the feed motor 202 is started, the chip-conveyor actuating mechanism (Fig. 28) begins operation and the pressure fluid is supplied at the same time to the various other hydraulically operated parts of the machine.

When the feed motor is running and the pressure in the hydraulic system is high enough, as will hereinafter be referred to, the operator starts the cutter motor. He does this by pushing in the start button 850 (Fig. 29) which may be located at any suitable point on the machine, handy to the operator.

This closes a circuit from the main line 852 through the terminal 853 of the magnetic controller 854, which may be similar in construction to the controller 814 or may be of any other suitable construction. The circuit extends from the terminal 853 through the line 858, the terminal 855 of the controller, the line 856, the terminal 857 of the start button 850, the common terminal 859 of the start and stop button, the terminal 861 of the stop button 851, the line 862, the line 863, the coil 868 of an electromagnet mounted in the controller 854, the line 825, the terminals 826 and 828 and the emergency button 827, the line 829, the terminal 869 of the controller back to the main line 870. The third main line is designated at 874.

The cutter drive motor 80 is connected to the controller 854 through the lines 871, 872 and 873. When the start button 850 is pushed in, therefore, the cutter motor 80 will be started through the connection of this motor with the controller 854.

The start button 850 is a normally open button, but when it is pushed in, the electro-magnet 868 is energized to close the push arms 875, 876, 877 and 878 to cause these arms to make contact, respectively, with the terminals 880, 869, 853 and 881 of the controller 854. The circuit is maintained, therefore, after the start button 850 is released, from the main line 852 through the terminal 853, the line 858, the line 882, the switch arm 878, the terminal 881 and the line 884 to one terminal 885 of the switch 595 (Fig. 9). Thence the circuit extends through the bar 886 carried by the arm 597 of this switch to the terminal 887 and thence through the line 888, the terminals of the automatic stop 386 (Fig. 20), the line 890, the terminals 859 and 861 of the stop button 851, the line 862, the line 863, the electro-magnet 868, the line 825, the terminals 826 and 828 of the emergency stop button 827, the line 829, and the terminals 869 to the main line 870.

It will be noted that when the push button 850 is released, the just described operating circuit to the cutter motor can only be made and can only be maintained if the switch 595 (Fig. 9) is closed, that is, if the bar 886 (Fig. 29) of this switch connects the terminals 885 and 887. In other words, the operating circuit to the cutter motor 80 cannot be made until the pump 200 driven by the feed motor 202 has raised the pressure in the hydraulic system of the machine to the operating minimum, that is, to a point where it will be sufficient to force the safety valve 590 (Figs. 9 and 29) to the left to close the switch 595 against the resistance of the spring 588. If the pressure in the hydraulic system is not sufficient, then the switch 595 will not be closed. Moreover, if the pressure should at any time fall below the operating minimum, then the switch 595 will be opened by operation of the spring 588 and the cutter motor will be stopped. As the reverse valve 502 is shifted back and forth momentary fluctuations in the pressure of the fluid flowing through the duct 594 into the valve chamber 587 are bound to occur, for when parts which have previously been on exhaust are suddenly put on supply it takes an instant to build up the pressure on them to the pressure of the system and during this instant until the pressure is built up, naturally a slight drop of pressure will occur in the whole system. The spring 586 is provided and is made heavier than the spring of the switch 595 so as to maintain the switch arm 597 closed through the periods of slight drop in pressure. However, should the pressure in the system drop below the working minimum for any cause, then the springs 588 and 586 would move the plunger to the position shown in Figure 9 and allow the switch 595 to open. The safety valve 590 insures, therefore, against operation of the machine should the hydraulic pressure in the system be insufficient. This prevents operation of the machine at too slow a feed rate with its consequent loss in production and its poor quality of work, the latter, the inevitable result of the vibration and chatter which would be set up were an attempt made to operate without there being sufficient pressure in the hydraulic system.

It will be noted, also, that the operating circuit to the cutter motor 80 is maintained through the automatic stop 386 with the result that when this stop functions, the circuit to the cutter motor is broken and the cutter motor is stopped. This is an automatic operation and occurs only after the required number of teeth have been cut in the gear blank. To stop the cutter motor at any time, the stop button 851 can be pressed in. To stop the feed motor 202 at any time, the stop button 820 may be pushed in. To stop both the cutter and feed motors before the machine has completed its operation, the emergency button 827 may be pushed in. As long as the machine is in use, the feed motor runs continuously and it is only the cutter motor which is stopped by the automatic stop after a gear blank has been completed.

The automatic stop 386 may be of the construction described in the patent to Maxwell H. Hill No. 1,577,121 of March 16, 1926 or of the construction described in the pending application of George E. Ford, Serial No. 441,694, filed April 4, 1930 or of any other usual or suitable construction. It is adjusted before the machine is started, functioning after the required number of teeth have been cut in the blank and then breaking the circuit to the cutter motor.

Operation of the machine

Before starting to cut a particular gear blank, the cutter support and work head will be adjusted in accordance with the spiral angle, cone distance and cone angle of the gear to be cut. These adjustments are usual in gear cutting machines and form no part of the present invention. They may be the same as in the machine of the prior application No. 519,327 above mentioned. It is to be noted, also that an index plate 167 will be selected having a number of notches 375 corresponding to the number of teeth in the gear blank to be cut.

The stroke of the cutter and the position of this stroke will, also, be adjusted before the machine is started. The nut 519 (Fig. 2) is adjusted on the sleeve 518 to determine the length of stroke and the sleeve 518 is adjusted in the cap-member 515 to determine the position of the cutter stroke as determined by the height of the cutter blades. The rate of feed of the cutter into depth for roughing may be determined by adjusting the pin 557 (Figs. 5 and 7) in the slots 555 and 556 as above described. This determines the position of the fulcrum of the lever 536 and thereby determines the rate of movement of the throttle valve 510. If a gear is to be finish cut, the plunger 550 is adjusted into position to serve as a fulcrum for the lever 536.

When the various adjustments have been made, the operator starts the feed motor 202 by pressing in the start button 810 of this motor, as above described. The parts at this time are all in the position shown in Figure 29 with both the cutter and work in their full withdrawn position. The starting of the feed motor supplies the hydraulic power for the machine.

The operator first chucks the gear blank to be cut. To do this, he rotates the three-way valve 250 (Figs. 19 and 29) from the position shown in Figure 19 to that shown in Figure 29 to put the cylinder 136 on supply (Fig. 4). The pressure fluid then flows from the pump 200 through the lines 203 and 205 (Figs. 1 and 14) through the bore 206 (Figs. 14, 18 and 19), the ducts 207, 208, 209, 210 and 211 and the ports 212 into the chamber 187 of the withdraw-valve 185 (Figs. 4, 14 and 29). Thence the pressure fluid flows through the port 225, the ducts 227 (Figs. 14, 16 and 19), 228 and 229, 230, 231 (Figs. 17 and 19) and the ducts 253 and 252 through the port 145 (Fig. 4) into the chamber 135.

The cylinder 136 having been thus placed on supply, the piston 135 (Figs. 4 and 29) is moved to the left, causing the rod 134 to rock the lever 127 about its pivot 126 to force the rod 129 and draw-bar 118 forward in the bore of the work spindle 112 against the resistance of the spring 122, thereby to release the chucking mechanism. The operator then places a gear blank in position, puts the clamping disc 116 back in place and rotates the handle 256 of the three-way valve 250 to return the valve to the position shown in Figure 19. This places the cylinder 136 on exhaust, allowing the gear to be chucked by operation of the spring 122. When the three-way valve 250 is rotated back to the position shown in Figure 19, the pressure fluid exhausts from the cylinder 136 through the port 145, the pipe 252, the three-way valve 250 and the duct 255 (Fig. 19) into the bore 223, whence it returns by the duct 224 (Figs. 4, 14, 18 and 19) to the sump.

Having chucked the gear blank, the operator then starts the cutter motor 80 by pressing in the push button 859 as above described. The cutter motor drives the cutter C through the bevel gears 82 and 84 (Figs. 3 and 13), the shaft 85, the spur gears 88 and 89, the shaft 90, the spur pinion 94 and the internal gear 73 (Fig. 2), the latter gear being secured to the cutter spindle as above described.

When the circuit to the cutter motor 80 has been closed, as above described, and the pressure in the hydraulic system has risen high enough to cause the safety valve 585 (Figs. 9 and 29) to close the switch 595, the solenoid 197 (Figs. 4, 14 and 29) will be energized. This occurs because this solenoid is connected on one side with the main line 870 (Fig. 29) through the line 899, line 825, terminals 826 and 828 and emergency button 827, line 829 and terminal 869, while it is connected on the other side, after the coil 868 is energized, with the main line 852 through the line 858, the line 882, the switch arm 878, the terminal 881, the line 884, terminals 885 and bar 886, line 888, automatic stop 386, line 890, terminals 859 and 861 and stop button 851, line 862, line 883 and line 895.

When the solenoid 197 is energized, the core 196 (Figs. 4, 14 and 29) is pulled inwardly and the valve 185 is moved from the position shown in Figure 29 to the position shown in Figures 4 and 14. In this position of the valve 185, the pressure fluid will flow from the pipe 205 (Figs. 14, 18 and 19) through the bore 206, the ducts 207, 208, 209 (Figs. 14, 16 and 19), 210 and 211, the ports 212 and 226 of the valve sleeve 186 (Figs. 4 and 14), the ducts 235, 236, 238 and 240 and the port 170 (Fig. 17) into the cylinder 150. This forces the piston 152 forward in the cylinder 150, as shown in Figure 17. At this time, the motive fluid exhausts from the other end of the cylinder 150 through the port 172, the ducts 231, 230, 229, 228 and 227, the ports 225 and 216 of the valve sleeve 186, the ducts 219, 220, 221, 222, 223 and the pipe 224 back to the sump (Figs. 4, 14, 16, 18, 19 and 29).

As the piston 152 moves forward in the cylinder 150, it carries the work spindle 112 forward in the work head 52 to operative position, for the piston rod 158 (Fig. 17), which is secured to the piston 152, is connected to the index guard 138 and the index guard 138 is in turn secured to the work spindle 112 (Fig. 4), being held between the shoulder 165 of the work spindle and the index plate 167.

When the work spindle has reached operative position and the blank G is in position to be cut, the nut 260 (Figs. 17 and 29) which is adjustably threaded on the piston rod 158 strikes the pivoted arm 262, causing the switch arm 263 to be swung into operative position through the resilient connection between the arm 262 and the switch arm 263 formed by the leaf-spring 268. The bar 266 carried by the switch arm 263 makes contact, then, with the terminals 267. When this happens, a circuit is completed to the solenoid 270 (Figs. 4, 15 and 29) which operates the index valve 272.

The manner in which the circuit to the solenoid 270 is made will now be described. The cutter spindle is in its withdrawn position. Hence, the contact bar 604 (Figs. 6 and 29) of the four-point contactor 600 is in engagement with the terminals 601. As a result a circuit is closed from the line 899 (Fig. 29) through the line 900, the line 901, the terminals 601 and the bar 604, the line 903, a solenoid 904 forming part of a contact box mounted on the column 51 at any convenient point, the line 906 of this box, the coil 907 of the box and the line 909 which is connected to the line 863. Thus, when the cutter is in withdrawn position, the solenoid 904 is energized and as long as the cutter is in withdrawn position, the plunger 910 of this solenoid closes a circuit between the line 912 and the line 913. At the same time, this plunger closes the normally open switch 915, bridging the gap between the lines 916 and 900. Hence, when the bar 266 (Figs. 17 and 29) makes contact with the terminals 267, a circuit is closed from the line 863 through the terminals 267 and the bar 266, the line 918, the solenoid 270, the line 912, the bar 911 carried by the plunger 910 of the solenoid 904, the line 913 and the line 900 to the line 899.

When the solenoid 270 is energized, as just described, the valve 272 is shifted against the resistance of the springs 276, from the position shown in Figure 29 to the position shown in Figures 4 and 15. In this latter position, the pressure fluid flows from the pipe 205 (Figures 4, 14, 15, 18, 19 and 29) through the bore 206, the ducts 207, 208, 209, 210 and 211, the ports 282 and 340 in the sleeve 274 of the index valve, the ducts 335, 337, 336 and 334, the bore 332, the pipe 330 which telescopes in the bore 332, the hole 328 (Fig. 26), the ducts 327, 326, 320 and 322 into the cylinder 302 (Figs. 20, 21 and 29) that contains the piston 350, the ball-check-valve 323 being opened against the resistance of the spring 324 by the pressure of the motive fluid.

The pressure fluid flowing into the cylinder 302 forces the piston 350 to the left from the position shown in Figure 29 to the position shown in Figures 20 and 21. As the piston moves to the left, fluid exhausts from the left-hand end of the cylinder 302 through the ducts 300 and 301, the ducts 298 and 299, the ducts 296 and 297, the duct 295 (Figs. 20, 21 and 26), the duct 294, the hole 292, the pipe 289 (Figs. 18 and 26), the bore 288, the ducts 286, 285 and 284 (Figs. 15, 16 and 19), the ports 283 and 343 in the sleeve 274 of the valve 272, the duct 345 (Figs. 4, 14 and 16), the ducts 219 and the ducts 220, 221 and 222 into the bore 223 whence the motive fluid is returned to the sump through the pipe 224.

At this time, the index lock-lever 370 (Figs. 20 and 29) is in released position, as shown in Figure 29, that is, out of engagement with the index plate 167. At the same time, also, the work spindle clamps 400 and 401 (Figs. 14, 18 and 29) are released. This is because the valve 420 (Figs. 20, 21, 26 and 29) is in the position shown in Figure 29 and the cylinders 392 and 402 housing, respectively, the piston 391 and the clamping blocks 400 and 401 are on exhaust. The fluid flows out of the cylinder 402 through the ducts 430 and 431 (Figs. 14, 16 and 19), the ducts 432 and 433, the bore 434 (Figs. 14, 18 and 19), the pipe 435, the hole 438 (Fig. 26), the ducts 440, 442, 444, 446, and the port 449 into the chamber of the valve 420. The fluid flowing from the cylinder 392 exhausts through the port 393 into the line 445 which leads into the duct 444 and from thence it flows, with the fluid flowing from the cylinder 402 through the ducts 446 and 448 and the ports 449 into the chamber of the valve 420. The fluid exhausts from the chamber of the valve 420 (Figs. 21, 26 and 29) through the ports 470, the ducts 471, 472, and 473, the hole 477, the pipe 478 (Figures 4, 18 and 26), the bore 223, and the pipe 224 back to the sump.

Because the cylinder 402 is on exhaust the clamping blocks 400 and 401 are forced apart by the spring 406 (Figures 14, 18 and 29) to release the work spindle, and because the cylinder 392 is on exhaust, the spring 397 (Figs. 20 and 29) is free to force the plunger 378 to the right and rock the index lock-lever 370 about its pivot-stud 371, thus releasing the index plate 167 as above mentioned. The index plate 167 is held against backward movement, however, by the stop-dog 395 (Figs. 20 and 29) which is always held resiliently in engagement with the index plate by the spring 397.

As piston 350 moves to the left, as above described, it forces the block 356 (Figs. 4, 20, 26 and 29) to the left for this block is connected to the piston 350 by the piston rod 352. Since the index lock-lever 370 is in released position, the spring plunger 925 (Fig. 20) forces the pawl 364 into engagement with a notch of the index plate 167. The plunger 925 is mounted in a hole drilled in the index housing 138, the outer end of which is closed by the plug 926 and the plunger is actuated into engagement with the tail portion 928 of the pawl 364 (Fig. 23) by the coil spring 929.

The pawl 364 is mounted upon the block 356. Thus, as the block moves to the left, the pawl engaging the index plate 167 rotates the index plate and indexes the work spindle. This first indexing movement is, of course, not necessary as regards the production of the gear to be cut, but takes place because of the order in which the various operations of the machine proceed.

The angle through which the index plate is rotated for the indexing movement may be varied for various jobs by adjustment of the nipple 930 which threads into the index guard 138 (Fig. 20). The stud 931 which threads into the block 356 and is secured by the lock-nut 360 passes through an opening in the inner end of this nipple. The nipple engages the head of the stud 931 to limit movement of the block 356 to the right and engages the lock nut 360 to limit movement of the same to the left.

As the block 356 moves to the left, also, it strikes the head of the valve 420 (Figures 20, 21, 26 and 29), shifting this valve to the left against the resistance of the spring 425. During the latter part of the movement of the piston 350 to the left, its movement is slowed down through a dash-pot arrangement. This prevents the block 356 from striking the valve 420 with any great force. The dash-potting is effected because during the latter part of the movement of the piston 350 to the left, it closes off the ports 300 and 301 (Fig. 20) and the exhaust fluid can only escape through an opening whose area is very much restricted. Thus, the exhaust fluid can only escape through the ducts 935 and 936, and the area of the opening between them is restricted by the adjustable screw plug 938 which threads into the closure member 312. These ducts are formed in the closure member 312 (Fig. 20), and the lower end of the duct 935 is closed by the plug 937. The duct 936 leads into the exhaust duct 299.

The exhaust fluid cannot escape through the ducts 940 and 941 (Fig. 20) into the duct 299 because the duct 941 is closed at this time by the ball-check-valve 942 which is held in position by the pressure of the exhaust fluid and by the spring 943. The outer end of the duct 940 is closed by a plug 944 which threads into the closure member 312.

Thus, the oil exhausting from the left-hand of the cylinder 302, during the latter part of the movement in that cylinder of the piston 350 to the left, must pass through a very restricted opening, the area of which can be defined by the adjustment of the plug 938.

When the valve 420 has been shifted to the left by the block 356, the cylinders 402 and 392 are put on supply. The pressure fluid flows from the pipe 205 (Figs. 14 and 18) into the bore 206 and thence through the pipe 455, the hole 456 (Fig. 26), the ducts 460, 461, 462, 464 and the ports 465 and 449 of the sleeve 421 of the valve 420 (Figs. 21, 26 and 29), the ducts 448, 446 and 445 and port 393 into the chamber 392 of the piston 391. It also flows from the duct 446 through the ducts 444, 442, 440 and 438, the pipe 435 (Figs. 14 and 18), the bore 434, the ducts 433, 432 and 431, respectively, into opposite ends of the cylinder 402. The pressure fluid flowing into the cylinder 402 forces the work spindle clamps 400 and 401 together against the resistance of the spring 406 and clamps the work spindle while the pressure fluid flowing into the cylinder 392 (Fig. 20) forces the piston 391 to the left and rocks the index lock lever 370 about its pivot 371 back into engagement with a notch of the index plate 167, the piston 391 contacting the stud 390 carried by the index lock lever. Thus the work spindle is again clamped against rotation.

As the index lock lever returns to locking position, the head of the bolt 480 (Figs. 20 and 29) engages the lever 484, rocking this lever about its pivot 485 and forcing the switch arm 490 into contact with the terminals 496 through the spring connection 492 between the lever 484 and the switch arm 490. The bar 495 carried by the switch arm thus bridges the terminals 496.

The circuit is, therefore, completed from the line 863 through the line 950 (Fig. 29), the terminals 496 and bar 495, the line 951, the line 952, the terminals 953 and bar 954 of a double throw switch 955 which normally occupies the position shown in Figure 29, and the line 956 to the solenoid 500. The solenoid is already connected to the line 899 through the line 958, the terminals 959 and the bar 960 of the double throw switch 955, the line 962, the line 912, the terminals 908 and the bar 911 of the contact box, the line 913 and the line 900.

Through the circuit just described, the solenoid 500 is energized to shift the reverse valve 502 (Figs. 2, 8, 9 and 29) from the position shown in these figures against the resistance of the spring 505. This causes the pressure fluid to flow from the pipe 670 (Figs. 1, 8 and 29) through the ports 672 and 699 (Figs. 7 and 9), the ducts 698, 696 and 695 (Figures 10, 11 and 12) and the port 102 (Fig. 2) into the cylinder 97 to force the piston 95 forward in this cylinder and feed the cutter C into the gear blank G.

As the piston 95 moves forward in the cylinder 97, the motive fluid exhausts from the front end of the piston through the port 104 and the ducts 686, 685, 680, 679 and 678 (Figures 10, 11 and 12), the port 512 of the throttle-valve 510 (Figs. 7 and 8), the ducts 677 and 675, the ports 673 and 715 in the sleeve 503 of the reverse valve 502 (Figures 8, 9 and 29), the ducts 717 and 719 into the duct 701 which is connected by the pipe 702 with the sump. It will be noted that the exhaust fluid passes through the ports 512 of the throttle-valve 510. The rate of feed of the cutter into the blank is determined, therefore, by the opening of these ports 512, that is, will be determined by the throttling of the exhaust.

The area of the openings 512 is controlled throughout the feed movement of the piston 95 by the movement of the piston itself, for as the piston 95 moves inwardly, the lever 536 which is held between shoulders 543 and 544 (Figs. 2, 5, 7, 8 and 29) on the sleeve 518, which is connected to the piston 95, is rocked on the fulcrum 557, allowing the sleeve 541 and pin 542 and throttle-valve 510 to be moved under actuation of the spring 514 to close off the openings 512. The further the cutter feeds into depth, the more the area of the ports 512 is restricted and, therefore, the slower the rate of feed.

It is to be noted, as above mentioned, that when the gear being cut has already been roughed out and the finishing operation only is required, the plunger 550 can be adjusted into position where it will engage the lever 536 and serve as a fulcrum therefor, thereby permitting a more rapid feed movement into depth of the cutter with a sharp and quick shutting off of the feed when the cutter has reached approximately full depth cutting position.

It is to be noted that in the normal cutting operation, the safety by-pass valve 575 (Figs. 7, 9 and 29) will remain closed through operation of the spring 578. It is only in case the cutter strikes some hard spot which would cause it damage that the pressure will rise high enough in the line 698 to by-pass through the ducts 708, 707, 706 and 705 (Figs. 10, 11 and 12), the ports 580 and 581 of the by-pass valve, the grooves 583 and the ports 582 of this valve into the line 692 which, at this time, as just described, is on exhaust.

As the cutter feeds into depth, it cuts a tooth slot in the gear blank. When the cutter has reached full depth position, that is, when the tooth slot has been cut to the desired depth, the nut 519 (Fig. 7) will strike the key 611, which in turn will strike the lever 612 (Figs. 5 and 6). This will cause the lever 612 to be rocked about its pivot 613 to move the plunger 615 rearwardly to disengage the bar 604 of the four-point contactor 600 from the terminal 601. The key carries the screw 627 threaded in the lever 612 into engagement with the pin 625, rocking the shaft 620. As the arm 630 carried by the shaft passes over the center of the V-shaped plunger 633, the spring 635 forces the plunger forward, carrying the arm 630 past the center and continuing the rocking movement of the shaft 620. This movement is dampened, however, by the dash-pot formed for the plunger 640 with which the arm 630 is connected. The speed of movement of the arm 630 past center depends upon the rate at which fluid can flow from the chamber 649 through the ducts 656 and 659, and finally through the duct 659 alone, into the duct 656 which drains into the pocket 649. At this time, the duct 650 is closed by the ball check-valve 652 while the area of the duct 659 is restricted by the adjustable plug 660.

When the rock-shaft 620 has rotated far enough, the motion of the rock-shaft is transmitted to the lever 612 to carry the plunger 615 on and cause the bar 605 of the four-point contactor 600 to make contact with the terminals 602.

When the bar 605 makes contact with the terminals 602, the solenoid 904 is de-energized for the current then flows from the line 863 through the line 909, coil 907 and line 906 around the solenoid 904 by way of the terminals 602 and bar 605, the line 903, the line 916, the terminals 918 and bar 915, and line 900 to the line 899.

When the solenoid 904 is thus de-energized, the circuits to the solenoids 500 and 270 are broken. Thus the reverse valve 502 and the index valve 372 are shifted by the springs 505 and 201, respectively. The shifting of the reverse valve 502 causes the cutter to be withdrawn from the work while the shifting of the index valve 272 causes the index mechanism to be reset.

The time between the moment at which contact is broken between the bar 604 and the terminals 601 and the moment when contact is made between the bar 605 and the terminals 602, determines the time of dwell of the cutter in full depth position. This dwell is for the purpose of enabling the cutter to clean up the bottom of the tooth slot and smooth up the side surfaces of the slot.

When the reverse valve is shifted by the spring 505, the pressure fluid flows from the pipe 670 (Figs. 1 and 29) through the ports 672 and 673 of the valve, (Figs. 2, 8, 9 and 29), the ducts 675, 677 and 678 (Figs. 10, 11 and 12), the ports 512 of the throttle-valve 510, the ducts 679, 680, 681, 685 and 686 into the port 104 (Fig. 2) of the cylinder 97. It is to be noted, also, that the pressure fluid flows from the duct 677 into the chamber 563 of the by-pass valve 560 (Figs. 6 and 29) around the groove 568 through the ports 566 and 567, opening this valve against the resistance of the spring 570, permitting the pressure fluid to flow through the duct 690 and port 103 into the cylinder 97 on the same side of the piston 95 as the port 687. At this time, the motive fluid exhausts from the rear end of the cylinder 97 through the port 102, the ducts 695 and 696 (Figs. 10, 11 and 12), and duct 698, the ports 699 of the sleeve 503 of the reverse valve 502 (Figs. 8 and 9) the port 700 and the duct 701 into the pipe 702 which leads back to the sump. Thus the cutter is withdrawn from the work.

During the withdrawal movement of the cutter, the index mechanism is reset as above mentioned, the pressure fluid flowing from the pipe 205 (Figs. 14, 18 and 19), through the bore 206, the ducts 207, 208, 209, 210 and 211, the ports 282 and 283 in the index valve sleeve 274 (Figs. 15, 16, 19 and 29), the ducts 284, 285, 286, the bore 288, the pipe 289, the hole 292 (Figs. 20 and 26), the ducts 294, 295, 296 and 297, 298 and 299 (Figs. 20 and 26), into the ducts 937 and 941, respectively, which lead from the ducts 298 and 299 respectively. The pressure fluid forces the check-valve 942 (Fig. 20) open against the resistance of the spring 943 and the pressure fluid enters the chamber 302 of the piston 350, then, through the duct 940 and, also, through the restricted opening between the ducts 936 and 935, permitted by the setting of the plug 938. This forces the piston 350 to the right (Figs. 20 and 21), the motive-fluid being exhausted from the right end of the cylinder 302, at this time, through the duct 315, the duct 322 being closed, at this time, by the ball check-valve 323. From the duct 315, (Figs. 21 and 26), the ducts 316, 317, 318, 320, 326 and 327, the hole 328, the pipe 330, the bore 332 (Figs. 18 and 19), the ducts 333, 334, 336, 337, 338 (Figs. 15, 16 and 19), the ports 340 and 342, the ducts 344, 217 (Figs. 4, 14, 16 and 19), the ducts 220, 221 and 222, the bore 223 and the pipe 224 the exhaust fluid flows back to the sump.

As the piston 350 (Figs. 20, 21 and 29) moves to the right, as just described, the ports 300 and 301 are uncovered, permitting more rapid flow of the pressure fluid into the left end of the chamber 302 and thereby forcing the piston more rapidly to the right.

As the piston 350 moves to the right also, the block 356 moves with it. This allows the valve 420 to be shifted to the right, also, under actuation of the spring 425. The valve 420 is thus shifted back to the position shown in Figure 29, thus putting the cylinders 392 (Figs. 20 and 29) and 402 (Figs. 14, 18 and 29) on exhaust. This allows the index lock lever 370 (Figs. 20 and 29) to be swung out of engagement with the index plate 167 by action of the spring 397. It also causes the work spindle to be unclamped by action of the spring 406 forcing the clamping blocks 400 and 401 apart (Figs. 14, 18 and 29). As the index lock lever 370 rocks out of engagement with the index plate, the end of this lever is disengaged from the lug 367 on the index pawl 364 (Figs. 20, 23 and 29). This allows the pawl 364 to drop into engagement with a notch of the index plate under actuation of the spring-pressed plunger 925. Thus the work spindle is unclamped and unlocked and the index mechanism is in position ready to index this spindle.

During the time that the index mechanism is being reset, the cutter is being withdrawn from the work, as above described. In the last part of this movement, the lever 536 (Figs. 5 and 7), which moves with the sleeve 518 that is secured to the piston 95 (Figs. 2 and 29), strikes the lever 612 (Figs. 5, 6 and 7). This causes the lever 612 to be swung about its pivot stud 613. In the first part of this movement, the screw 629 on the lever 612 strikes the pin 625, rocking the shaft 620. As soon as the arm 630 passes center, the load and fire mechanism comprised in the plunger 633 and spring 635 comes into action and shifts the lever 612, through the intermediation of the shaft 620 and pin 625, rapidly to the position shown in Figure 6. There is no dash-potting arrangement restraining movement of the lever in this direction. The return of the lever 612 to the position shown in Figure 6 causes the four-point controller plunger 603 to be shifted back to the position shown in Figure 6, bringing the bar 604 into engagement with the terminals 601.

This remakes the circuit to the solenoid 904 in the contact box (Fig. 29). The newly energized solenoid 904 pulls the bar 911 into engagement with the terminals 908 and forces the bar 915 into engagement with the terminals 918. Thus the circuit is re-made to the solenoid 270 controlling the index valve 272 and this valve is shifted against the resistance of the spring 276. This starts the machine cycle anew. Pressure fluid is pumped again into the right end of the cylinder 302, the piston 350 is forced to the left and the work spindle is indexed. In the last part of its movement, the block 356 again strikes the valve 420 and the cylinders 392 and 402 are put on supply. Thus, the index lock lever 370 is forced back into engagement with the index plate 167 and the clamping blocks 400 and 401 are forced back into clamping engagement with the work spindle.

As the index lock lever 370 returns into engagement with the index plate 167, the switch arm 378 is tripped by the head 482 of the bolt 480 and the bar 495 again makes contact with the terminals 496. This again closes the circuit to the solenoid 500 which is, therefore, again shifted against the resistance of the spring 505. The pressure fluid is, therefore, again supplied to the rear end of the piston 95 and the cutter is, therefore, again fed into the blank to cut a new tooth space in the blank. At the end of the feed movement, the solenoid 904 is again shorted out of the circuit through shifting of the four-point contactor plunger 603, the solenoids 270 and 500 are de-energized and the valves 272 and 502 return to normal position under actuation of the springs 276 and 505, respectively. This again causes the cutter to be withdrawn from the blank and the index mechanism to be reset.

Each time the index lock lever is swung about its pivot stud 371 (Figs. 20 and 29), the arm 384 (Fig. 25) carried by the plunger 378 strikes the plunger 385 of the automatic stop 386, ratcheting the stop mechanism forward. The stop mechanism is initially adjusted in accordance with the number of teeth to be cut in the blank. The alternate feeding and withdrawal of the cutter and indexing of the blank proceeds until after the last tooth space has been cut in the blank. Then the automatic stop mechanism is tripped and the circuit of which this stop mechanism is a part, is broken.

This breaks the circuit to the cutter motor 80 and the cutter stops rotating. It also breaks the circuit to the solenoid 197, allowing the withdraw valve 185 to be returned to the position shown in Figure 29 under actuation of the spring 199. The pressure fluid now flows from the pipe 205 through the bore 206 (Figs. 14, 18 and 19), the ducts 207, 208, 209 and 210 and 211, the ports 212 and 225 (Figs. 4, 14 and 29), the ducts 227, 228, 229, 230 and 231 (Figs. 17 and 29) and the port 172 into the cylinder 150, forcing the piston 152 rearwardly in this cylinder to withdraw the work spindle from operative position. At this time, the motive fluid exhausts from the other end of the cylinder 150 through the port 170, the ducts 240, 238, 236 and 235, the ports 226 and 215, the ducts 217, 220, 221, 222, 223 and the pipe 224 back to the sump.

The completed gear is thus withdrawn from operative position. The operator can now rotate the three-way valve 250 to put the line 252 on supply from the lines 231 and 253 (Figs. 19 and 29), allowing the pressure fluid to flow into the cylinder 136 (Fig. 4) to force the piston 135 rearwardly in this cylinder to de-chuck the completed gear. The operator can then remove the completed gear from the work spindle and put a new blank in position. The new blank can be chucked, the work spindle returned to operative position and the cutter motor restarted as already described, thereby re-starting the machine to cut a new blank.

*Hand controls*

To allow the work spindle to be moved to and from operative position at will, the core 196 of the solenoid 197 is elongated and a handle 970 is secured thereto to permit the valve 185 to be moved by hand against the resistance of the spring 199. To allow the index mechanism to be operated without reference to the operation of the rest of the machine, a similar handle 972 (Fig. 4) is secured to the stem of the valve 272. This handle projects through a slot 973 in the valve guard 974 so that it can be readily manipulated by the operator.

The cutter can also be moved to and from cutting position at will by the operator, the knob 507 (Figs. 8 and 9) on the reverse valve 502 allowing the operator to shove the valve in against the resistance of the spring 505 to manipulate the valve. There is provided, also, a manually operable electrical control for moving the cutter to and from cutting position. This is the double-throw switch 955 already referred to. One terminal 975 of this switch is connected by the line 976 with the line 817 (Fig. 29). The other terminal 975 is connected by the line 983 with the line 958 that leads to the solenoid 500. One terminal 980 of this switch is connected by the line 981 with the line 829. The other terminal 988 is connected by the line 985 with the line 956 that is connected to the solenoid 500.

Normally the button 955 will be in the position shown in Figure 39 so that the feed can take place automatically, but by pushing the button in so that its bars 960 and 954, respectively, make contact with the terminals 975 and 980, respectively, a circuit can be made to the solenoid 500 from the controller 814. Thus the cutter can be fed into operative position as, for instance, for gauging, while the rest of the machine is inoperative. The spring 500 will return the valve 502 to position when the button 955 is released, thereby causing the cutter to be withdrawn to inoperative position again.

*Chamfering mechanism*

In both the application of Maxwell H. Hill, Serial No. 522,538, filed March 14, 1931 and in application No. 519,327 above mentioned, filed jointly by the present applicant and A. P. Schauseil, mechanisms have been illustrated for chamfering spiral bevel or hypoid gears at the same time that they are cut. Such mechanisms have very distinct advantages. They eliminate the necessity for a separate chamfering operation and speed up the gear production. For these reasons, it has been considered desirable to make provision in the machine of the present invention for chamfering in the same operation and with the same set-up in which the teeth are actually cut. The improvement of the present invention, so far as chamfering is concerned, consists in the provision of simplified electro-hydraulically operated mechanism for actuating the chamfering tool or tools.

The chamfering mechanism is in the form of an attachment which ordinarily will be provided with the machine but which can readily be disconnected therefrom.

The chamfering attachment may be secured when in use in any suitable manner (not shown) to the work head of the gear cutting machine. It comprises a housing 1000 (Figs. 30, 31 and 32), which is bored to provide a central cylinder 1001. There is a piston 1002 mounted in the cylinder 1001 and reciprocable therein.

There is a piston-rod 1003 secured to the piston 1002, the piston 1002 being secured by the nut 1007 and lock washer 1008 against a washer 1004, which seats against a shoulder 1005 formed on the piston-rod. The piston rod passes through a packing 1010 secured in the cover-plate 1011 that closes one end of the cylinder 1001 and one side of the casing 1000.

The piston 1002 is reciprocated by fluid-pressure. Its movement is controlled by a valve 1012 which slides in the bore of a sleeve 1014. This sleeve is secured in a bore 1015 drilled in the casing 1000 parallel to the cylinder 1001.

The valve 1012 is normally urged in one direction by the coil-spring 1020 which is mounted in the bore 1015 at one end thereof and which surrounds the valve 1012. There is a rod 1021 mounted in the bore of the valve 1012. A coil-spring 1022 which is mounted on this rod and which seats at one end against the inside face of the cover-plate 1011 and at its opposite end against a shoulder formed within the bore of the valve 1012, serves to hold the valve in contact with the shoulder 1024 formed on the rod 1021 and, also, cooperates with the spring 1022 in normally holding the valve in one direction.

A headed pin 1025 (Figs. 30 and 31) threads into the end of the rod 1021. This pin 1025 passes through a fibre washer 1026 on which the contact disc 1027 slides. There is a coil-spring 1028 mounted on the washer 1026 and normally urging the contact disc 1027 in one direction. This spring seats against the fibre washer 1029. A washer 1030 is interposed between the head of the pin 1025 and the contact disc 1027.

A pair of spring terminals 1032 are secured to the rear cover-plate 1031 of the casing 1000 by screws 1033. When the contact disc 1027 is in engagement with the terminals 1032, the terminals and contact disc form part of an electrical circuit, the purpose of which will hereinafter be described. The lead wires of this circuit are secured to the spring clips 1032 by screws 1034.

The rod 1021 extends through an opening in the cover-plate 1011 and an eared-head 1035 is secured to this rod exteriorly of the cover-plate 1011. There is an arm 1037 (Figs. 30 and 32) pivotally mounted on the pin 1038 between the ears or furcations of the head 1035. This arm is oscillatably mounted upon the stud 1040 which is secured in a flange 1041 of the cover-plate 1011, a bushing 1042 being secured in the arm and serving as a bearing for the arm in its movement on the stud 1040.

The bushing 1042 is also secured in an arm 1045 that is also oscillatably mounted upon the stud 1040.

There is a headed stud 1047 journaled in the arm 1037. The head 1048 of this stud lies on one side of the arm 1037 and is milled off to a half-round. There is an arm 1050 mounted on the other side of the arm 1037 and secured to the stud 1045 by the pin 1052. A spring keeper or catch 1054 is mounted in the arm 1045. A coil-spring 1055 housed in the arm 1045 serves to urge this catch 1054 constantly into engagement with the head 1048 of the stud 1047. When the catch 1054 is in engagement with the rounded portion of the head 1048 of the stud 1047, the arms 1045 and 1037 can operate and move together, as though one lever, about the axis of the stud 1040.

The free end of the arm 1050 fits in an elongated recess or groove 1057 milled in one side of the piston rod 1003. The free end of the arm 1045 is furcated and connected by the pin 1058 with the core-bar 1059 of a solenoid 1060 that is mounted upon the casing 1000.

A rod 1062 and a cap-member 1063 are secured to the rear end of the core-bar 1059 by the pin 1064. A coil-spring 1065 surrounds the rod 1062 and is interposed between the rear cover-plate 1031 of the casing 1000 and the head of the cap-member 1063. The rod 1062 passes through an opening in the rear cover-plate 1031. It has a headed pin 1068 threaded into it. This pin passes through a fibre washer 1069 on which the contact disc 1070 slides. A coil-spring 1071 surrounding the washer 1069 serves to urge the contact disc 1070 constantly in one direction. The spring is interposed between the washer 1072 mounted on the rod 1062 and the contact disc 1070. A fibre washer 1074 is interposed between the headed-pin 1068 and the contact-disc 1070.

The contact-disc 1070 is adapted to make contact with the spring clips or terminals 1075 that are secured to the rear cover-plate 1031 (Figs. 20 and 31) by screws 1076. When the contact-disc 1070 is in engagement with the clips 1075, an electrical circuit is formed, the purpose of which will hereinafter be described, the wires of this circuit being secured to the clips 1075 by screws 1078.

There is an irregularly shaped arm 1080 pivotally mounted upon a stud 1081 (Fig. 32) that threads into a flange 1082 formed on one side of the cover plate 1011 of the casing 1000. The finger 1083, which is formed integral with this arm engages in a recess or groove 1084 cut into the piston rod 1003 at a point diametrically opposite the groove 1057 which receives the free end of the arm 1050. Thus the arms 1080 and 1050 are moved by the piston rod 1003. There is a rod 1085 pivotally connected to the arm 1080 by the stud 1087. This arm slides in aligned openings formed in the cover-plates 1011 and 1031 and the casing 1000. At its rear end, this rod 1085 (Fig. 30) is grooved as indicated at 1088, to receive the free end of an arm 1090 that is pivotally connected at 1091 with a double-armed switch 1092. The arm 1090 is resiliently connected with the switch arm 1092 by the coil-springs 1093. The arm 1092 carries at opposite ends (Figs. 30 and 31) contact bars 1094 and 1095. These are adapted to make contact, respectively, with terminals 1096 and 1097 secured in the cover-plate 1031.

The movement of the piston 1002 is used to actuate the chamfering mechanism. The chamfering mechanism itself may be of any suitable character. In the drawings of the present application, I have shown a double-end chamfering mechanism of the type described in the co-pending application of Maxwell H. Hill, Serial No. 584,190, filed December 31, 1931, but the movement of the piston 1002 might be used instead to actuate a single end chamfering mechanism such as shown in application No. 519,327 above mentioned.

The double-end chamfering mechanism comprises a pair of arms 1100 and 1101 that are pivotally mounted upon a stud 1102 which is secured in a bracket 1103 that is suitably mounted upon the work head of the machine. The arms carry tools 1105 and 1106, respectively, adapted to chamfer opposite ends of the teeth of the curved tooth tapered gear blank at opposite sides of the same.

The arm 1101 is pivotally connected at 1110 to a link 1111, the other end of which is connected by the pin 1112 with a rocker member 1113. This rocker member 1113 is oscillatably mounted upon a stud 1114 secured in a bracket 1115 that is connected to the support 1103 in any suitable manner, as by means of the bolt 1116. The arm 1100 is connected by the pin 1117 with a link 1118 which is also connected to the oscillating member 1113 as by means of the pin 1119. The oscillating member 1113 is connected by the pin 1120 to the piston rod 1003.

It will be seen that when the piston 1002 is moved to the right in Figure 30, the arms 1100 and 1101 will be swung toward one another to cause the chamfering tools 1105 and 1006 to chamfer the opposite ends of teeth of the gear blank G being cut upon the machine. When the piston 1002 moves to the left, however, the chamfering tools will be retracted to inoperative position.

When the chamfering attachment is employed upon the machine of my invention, it is so connected hydraulically and electrically with the other hydraulic and electrical operating circuits of the machine that it operates in timed relation with the other machine operations. The preferred arrangement, illustrated diagrammatically in Figure 34, is to so connect the chamfering mechanism in circuit that chamfering takes place before the blank is indexed and to interlock the chamfering and index mechanisms so that indexing cannot begin until chamfering is completed.

During the actual cutting of each tooth space of the blank, the chamfering mechanism is in inoperative position, the parts being in the position shown in Figure 30. When the cutter has reached full depth position, the four-point contactor and plunger 603 is shifted, as in the ordinary operation of the machine, causing contact to be made by the bar 605 with the terminals 602 (Figs. 29 and 34). This shorts the solenoid 904 out of circuit, as in the operation of the machine without the chamfering attachment. The shorting of the circuit around this solenoid causes the solenoids 270 and 500 to be de-energized, as in the operation of the machine without the chamfering attachment. The reverse valve is, therefore, shifted by the spring 505 to cause the cutter to be withdrawn from engagement with the blank and simultaneously the index valve is shifted by the spring 276 to cause the piston 350 to be moved to the right to reset the indexing mechanism. In the operation of the machine without the chamfering attachment, the valve 420 follows the block 356 in its movement to the right with the piston 350, thus putting the cylinders 392 and 402 on exhaust, releasing the work spindle. When the chamfering attachment is used, however, it is desirable to keep the work spindle locked against rotation until the chamfering has been completed so that the gear blank may be held stationary when the chamfering tools take their cuts.

When the chamfering attachment is used, therefore, means is provided to prevent the valve 420 from following the block 356 immediately on movement of the block to the right. This means may comprise a latch member 1125 (Fig. 34), which may be suitably located in the index housing 138 of the machine. This latch or plunger 1125 is constantly urged into locking position by the coil-spring 1126. It is withdrawn from locking position by the solenoid 1127.

When the valve 420 is moved to the left by the block 356, at the end of the indexing operation, to put the cylinders 392 and 402 on supply to lock up the work spindle, the latch 1125 drops in front of the head of the valve 420, locking the valve 420 in its position to the left. Therefore, when the block 356 moves to the right during the resetting of the index mechanism, the valve 420 is prevented from following this block and the work spindle is kept locked up.

When the cutter has been fully withdrawn from the blank, the four-point contactor is shifted back to the position shown in Figure 34 as in the operation of the machine without the chamfering attachment. This causes the bar 604 to make contact with the terminal 601, again energizing the solenoid 904 and causing the bars 911 and 915 to make contact, respectively, with the terminals 906 and 918.

When the chamfering attachment is used, a slight change in the wiring of the machine is made from that employed when the chamfering attachment is not in use. Instead of arranging the electrical circuit so that when contact is made by the bar 911 with the terminals 908, a circuit is made to the solenoid 270 which controls the index valve, the machine is re-wired so that when the bar 911 makes contact with the terminals 908, the solenoid 1060 (Figs. 30 and 34) is energized. The circuit to this solenoid is from the line 899 through the line 900, the terminals 908 and bar 911, the line 912 and the line 1130 and back to the line 863 through the lines 1131, 1132 and 895.

When the solenoid 1060 is energized, as just described, the core-bar 1059 of the solenoid is pulled to the right from the position shown in Figure 30 against the resistance of the spring 1065. This causes contact to be made by the disc 1070 with the terminals 1075. It also causes the arm 1045 to be swung about the stud 1040 from the position shown in Figure 30. As the arm 1045 moves in the described direction, the arm 1037 is carried with it because the latch 1054 is in engagement with the rounded portion of the head 1048 of the stud 1047 and because the free end of the arm 1050 is held against movement by its engagement in the notch 1057 of the piston rod 1003. The arm 1037 is, therefore, rocked about the stud 1046, also. This causes the rod 1021 and with it the valve 1012 to be shifted to the left from the position shown in Figure 30 against the resistance of the springs 1022 and 1020. As the arm 1037 is swung to the left, it carries with it the rod 1085, causing the switch arm 1092 to be swung about its pivot 1091 to bring the bar 1094 into contact with the terminals 1096.

After the valve 1012 has been shifted to the left, as just described, the pressure fluid flows from the line 1135 (Fig. 30) through the ports 1136 and 1137 in the valve sleeve 1014 into the duct 1138 and the left end of the cylinder 1001. This causes the piston 1002 to be moved to the right from the position shown in Figure 30, the motive fluid exhausting from the right-hand end of the cylinder 1001 through the duct 1140, the duct 1141, the ports 1142 and 1143 of the valve sleeve 1014 and the duct 1144 back to the sump. The pressure line 1135 can be connected to the pressure line 203 (Fig. 1) in any suitable manner.

As the piston 1002 moves to the right, the actuating arm 1120 is swung about its pivot stud 1114 and the two arms 1100 and 1101 carrying the chamfering tools 1105 and 1106 are forced together by the toggle-linkage 1118—1111, causing the tools to chamfer opposite ends of the sides of the tooth space cut by the face-mill cutter C on the preceding feed movement.

As the piston rod 1003 moves to the right from the position shown in Figure 30, the shoulder formed on the rod by the forward end wall of the groove 1057 rocks the arm 1050 with reference to the arm 1037 since the stud 1047 is journaled in the arm 1037. This causes the latch 1054 to ride off of the rounded portion of the head 1048 of the stud 1047 and onto the flatted portion of the head of the stud. Thus, the lever arms 1037 and 1045 become disconnected. The arm 1045 remains in the position to which it has been pulled by the solenoid 1060 because the solenoid is still energized, but the arm 1037 is rocked about the stud 1040 through the action of the springs 1020 and 1022. Thus the valve 1012 is shifted back to the right to the position shown in Figure 30.

In the movement of the piston 1002 to the right, the rod 1085 is also carried to the right, the arm 1080 being swung about its pivot stud 1081 through engagement of the finger 1083 in the groove 1081 of the piston rod 1003. This causes the arm 1090 to be again swung about its pivot 1091, causing the bar 1094 to break contact with the terminals 1096 but bringing the bar 1095 into contact with the terminals 1097. This causes the solenoid 1127 (Fig. 34) to be energized to withdraw the latch 1125 from engagement with the valve 420.

The solenoid 1127 is connected with the line 863 by the line 1150 and it is connected with one of the terminals 1097 by the line 1151, while the other terminal 1097 is connected to the line 899 by the line 1152. Thus when the bar 1095 makes contact with the terminals 1097, the solenoid 1127 is energized as described. This withdraws the catch 1125 from operative position as described and releases the valve 420. This valve is, then, immediately shifted to the right by the spring 425, putting the cylinders 392 and 402 on exhaust. The springs 376 and 406 now disengage the index lock lever 370 and the work spindle clamps 400 and 401, respectively. The work spindle is now unlocked ready to be indexed.

As previously stated, the chamfering attachment is so wired to the index mechanism that the indexing operation cannot take place until chamfering has been completed. To this end, the terminals 1075, 1096 and 1032 wired in series so that all of the contacts 1070, 1094 and 1027 must be closed before a circuit can be made to the solenoid 270 to shift the index valve 272 to the position in which the index mechanism will be actuated. At the time that the solenoid 1127 is energized, as just described, the disc 1070 is in contact with the terminals 1075 because the solenoid 1060 is still energized; the rod 1021 moving to the right under impetus of the spring 1022 brings the disc 1027 into contact with the terminals 1032; but as the switch arm 1092 is in a position where the bar 1095 makes contact with the terminals 1097, the bar 1094 is out of contact with the terminals 1096. However, when the rod 1021 and valve 1012 move to the right, the port 1040 is put on supply, the pressure fluid flowing from the duct 1135 through the ports 1136 and 1143 of the sleeve 1014 and the line 1041 into the right end of the cylinder 1001. Thus the piston 1002 is again moved to the left. In this movement, the motive fluid exhausts from the left end of the cylinder 1001 through the duct 1138, the ports 1137 and 1155 of the sleeve 1014, the duct 1156 and the duct 1157 into the duct 1144 whence it returns to the sump.

In this movement of the piston 1002 to the left, the arm 1050 is rocked back to the position shown in Figure 30 and the catch 1054 again engages the rounded part of the head 1048 of the stud 1047. The arm 1037 does not partake of this movement, the stud 1047 simply rotating in this arm 1037. As the piston 1002 moves to the left, also, it carries the rod 1085 with it because the finger 1083 is in engagement with the slot 1084 in the piston rod 1003. This causes the switch arm 1092 to be rocked about its pivot 1091, disengaging the bar 1095 from the terminals 1097 and bringing the bar 1094 into engagement with the terminals 1096.

In the movement of the piston 1002 back to the left, the arms 1100 and 1101 are rocked apart moving the chamfering tools to inoperative position clear of the gear blank and of the face-mill cutter C. When the contact is made across the terminals 1096 by the bar 1094, the circuit to the solenoid 270 is completed, this circuit extending from the line 899 through the line 900, the terminals 908 and bar 911, the line 912, the terminals 1075 and the disc 1070, the line 1160, the terminals 1096 and bar 1094, the line 1161, the terminals 1032 and disc 1027, the line 1162, the line 1163, the solenoid 270, the line 918, the terminals 267 and bar 266 of the feed start switch to the line 863.

When the solenoid 270 is energized as just described, the index valve is shifted against the resistance of the spring 276 to put the right end of the cylinder 302 on supply, as is the case with the machine in which the chamfering attachment is not employed. This causes the work spindle to be indexed. Then, as in the case of the machine without the chamfering attachment, the valve 420 is shifted to the left by the block 356 and the work spindle is locked up again. When the lock lever 370 engages the index plate 167, the switch arm 484 is engaged by the head 482 to complete the circuit to the solenoid 500 to shift the reverse valve 502 and cause the cutter to be fed into the blank to cut a new tooth space in the blank.

The alternate feeding of the cutter into the blank, withdrawing of the cutter from the blank and resetting of the index mechanism, chamfering of the sides of the tooth space cut in the preceding feed operating, releasing of the work spindle, indexing of the work spindle, locking up of the work spindle again and new feed of the face mill cutter into the blank proceeds until all of the tooth spaces of the blank have been cut and the sides of these spaces chamfered. Then, as is the case in the machine without the chamfering mechanism, the automatic stop operates, the solenoid 197 is de-energized and the work spindle is withdrawn to inoperative position to allow removal of the completed gear and chucking of a new blank. The automatic stop mechanism may be positioned so as to be operated after each indexing operation, as indicated in Figs. 29 and 34, but when the chamfering mechanism is used it will preferably be secured to the chamfering attachment as shown in Figure 32, to be actuated in time with the chamfering mechanism. In this figure, the automatic stop 386 is shown mounted upon a bracket 1165 which is secured to the casing 1000 at one side thereof. The arm 1080 is formed with a lug 1167 that is adapted to engage the plunger 385 of the stop mechanism. Each time the chamfering mechanism operates, then, the lug 1167 strikes the plunger 385 and thus advances the stop mechanism. The advantage of actuating the stop mechanism directly from the chamfering mechanism is that the stop mechanism will be tripped as soon as the sides of the last tooth space have been chamfered. This results in a few seconds saving in time as over tripping the stop from the index mechanism and in the course of a day the time saving may be material especially on a high production gear cutting job.

In the diagram of Figure 30, the parts are shown in the position which they occupy when the work spindle is in inoperative or loading position. When the cutter motor is started, the first operation that takes place is a chamfering operation, but the chamfering tools do not actually cut into the blank for, at this time, the work spindle is moving into operative position and the gear blank has not yet reached operative position. The chamfering mechanism simply goes through its motions as a part of the necessary sequence of operations of the machine. When the work spindle reaches operative position, the switch 265 is closed to energize the solenoid 270 and an idle indexing operation takes place, also, as is the case in the machine without the chamfering attachment. The solenoid 1060 which controls the chamfering mechanism is wired around the feed switch 265 through the lines 895, 1132 and 1131 so that the chamfering mechanism can operate, as required at the start of the machine; independently of the closing of the feed start switch 265, as described.

While the invention has been described in connection with a machine for cutting spiral bevel and hypoid gears, it will be understood that the features of the invention are applicable to machines for cutting many other types of gears, also. It is to be understood, also, that the invention is not confined to use with machines of the forming or non-generating type but that the features of the invention may be used, also, on generating machines. The features of the interlock between the indexing and feed motions, moreover, have broad application and are not restricted to use on gear cutting machines. They may be applied, for instance, to machines for sharpening multiple-bladed cutters where the cutter requires to be indexed in order to sharpen all of its blades.

In general, it may be said that while a particular embodiment of the invention has been described and illustrated, it will be understood the invention is capable of various further modifications and uses and that this application is intended to cover any variations, uses, or adaptations of the invention, following, in general, the principles of the invention and including such departures from the present disclosure as come within known or customary practice in the machine tool art and as may be applied to the essential features hereinbefore set forth and as fall within the scope of the invention or the limits of the appended claims.

Having thus described my invention, what I claim is:

1. In a machine for producing gears, tool mechanism, a work head, a work spindle journaled in the work head, means for actuating the tool mechanism, fluid pressure operated means for producing alternate relative movements of feed and withdrawal between the tool mechanism and the work support, a movable valve controlling said fluid pressure operated means, means normally urging said valve into position to cause the tool mechanism and the work support to be separated, an electro-magnet energizable to shift said valve to effect the relative feed movement, means for indexing the work spindle during the periods of withdrawal, means for locking the work spindle against rotation after it has been indexed, and means operable by the locking means on movement thereof to locking position, for energizing said electro-magnet.

2. In a machine for producing gears, tool mechanism and a work support, one of which is reciprocable to alternately feed the tool mechanism into the work and withdraw it from engagement therewith, means for indexing the work support during the periods of withdrawal comprising a cylinder and a piston reciprocable therein, means for locking the work support against rotation during the feed movement, means for normally moving said locking means to disengaged position, fluid pressure operated means for moving the locking means into engaged position, and means operable by the indexing mechanism for controlling the operation of said fluid pressure operated means.

3. In a machine for producing gears, a work spindle, a notched plate secured to the work spindle, a locking dog adapted to engage the notched plate for securing the work spindle against rotation during cutting, means for rotating the plate, when the dog is disengaged therefrom, to effect indexing of the work spindle, fluid pressure operated means controlling the movement of said dog, fluid pressure operated means controlling the rotation of said plate, and means operable by the second fluid pressure operated means for controlling the movement of the first.

4. In a machine for producing gears, a work spindle, a notched plate secured to the work spindle, a locking dog adapted to engage the notched plate for securing the work spindle against rotation during cutting, a cylinder and a piston reciprocable therein, one of which is operatively connected to the dog, a valve controlling the application of fluid pressure alternately to opposite sides of said piston, a second cylinder, a second piston reciprocable therein, a pawl carried by the second piston and adapted to engage the notched plate, when the dog is disengaged therefrom, means for reciprocating the second piston, and means operatively connecting said valve with the second piston whereby the valve is shifted alternately in opposite directions on movement of the second piston to release the dog before indexing rotation begins and move the dog back into locking position after indexing is completed.

5. In a machine for producing gears, a tool support, a work support, a sleeve mounted in the tool support for reciprocation therein, a cutter spindle journaled in the sleeve, a cylinder and a piston reciprocable therein, one of which is connected to the sleeve and the other to the tool support, means for applying fluid pressure alternately to opposite ends of the piston, a movable valve for controlling the direction of application of fluid pressure to the piston, means normally urging the valve in one direction, a solenoid for moving it in the opposite direction, and means operable by the sleeve in its movement for controlling said solenoid.

6. In a machine for producing gears, tool mechanism, a work support, means for actuating the tool mechanism, means for producing relative movements of feed and withdrawal between the tool mechanism and the work support, the tooth surfaces of the blank being cut during the relative movements of feed, means operable to chamfer the blank during the periodic separations of the tool mechanism and work support, means for indexing the blank during said periodic separations, and means for electrically interlocking the feed, chamfering and indexing mechanisms so that indexing cannot take place until chamfering has been completed and feed cannot commence until the indexing has been completed.

7. In a machine for producing gears, tool mechanism and a work support, means for actuating the tool mechanism to effect cutting of the blank, means for separating the tool mechanism and the work support periodically after each cutting operation, means for chamfering the teeth of the blank during the periodic separations, means for indexing the blank during the periodic separations, fluid pressure operated means for effecting the feed, chamfering, and indexing operations of the machine so that chamfering does not occur until the tool mechanism is clear of the work and indexing does not occur until both cutting and chamfering have been completed.

8. In a machine for producing gears, a tool support, tool mechanism mounted on the tool support, a work support, fluid pressure operated means for reciprocating one of said supports to effect alternate movements of feed and withdrawal between the tool mechanism and the work, fluid pressure operated means for indexing the work support during the periods of withdrawal, separate valves controlling the two fluid pressure operated mechanisms, means normally urging each valve in one direction, a solenoid for moving each valve in the opposite direction, and means controlled by the movement of the movable support for controlling the operation of said solenoids whereby tooth spaces of the blank are cut, the tool mechanism and blank are separated, the blank indexed and the tool mechanism and blank again fed into engagement.

9. In a machine for producing gears, a work support, a work spindle journaled in the work support, a tool support, tool mechanism mounted on the tool support, fluid pressure operated mechanism including a cylinder and a piston reciprocable therein for reciprocating one of said supports to effect alternate feed of the tool mechanism into the work and withdrawal of the tool mechanism from engagement therewith, a movable valve for controlling the direction of application of fluid pressure to said piston, fluid pressure operated mechanism including a cylinder and a piston reciprocable therein for indexing the work spindle during the periods of withdrawal, a movable valve controlling the direction of application of fluid pressure to the second piston, electrical control means operated by movement of the reciprocable part for controlling the movement of the two valves and means whereby movement of the first valve for instituting the feed movement is prevented periodically until the indexing operation has been completed.

10. In a machine for producing gears, tool mechanism, a work support, a work spindle journaled in the work support, means for actuating the tool mechanism, means for producing alternately a relative movement of feed and withdrawal between the tool mechanism and the work support, such that the tool mechanism cuts surfaces of the blank during the feed movements, a notched plate secured to the work spindle, a locking member adapted to be engaged successively with the notches of said plate to hold the work spindle against rotation during cutting, means operative to release and index the work spindle during the movements of withdrawal and to thereafter return the locking member into engagement with the index plate, and means operatively connecting the locking member to the means controlling the feed and withdrawal movements so that the feeding movement cannot commence until the locking member is in engagement with the index plate.

11. In a machine for producing gears, tool mechanism, a work support, a work spindle journaled in the work support, means for actuating the tool mechanism, means comprising a cylinder and a piston reciprocable therein for producing alternate relative movements of feed and withdrawal between the tool mechanism and the work support, a valve controlling the direction of application of fluid pressure to said piston to control said movements, means for indexing the work spindle during the periods of withdrawal, means for locking the work spindle against rotation during the feed movements, and means operatively connecting said locking means to said control valve whereby to prevent feed movement until the work spindle is locked up.

12. In a machine for producing gears, tool mechanism, a work support, a work spindle journaled in the work support, means for actuating the tool mechanism, means comprising a cylinder and a piston reciprocable therein for producing alternate relative movements of feed and withdrawal between the tool mechanism and the work support, a valve controlling the direction of application of fluid pressure to said piston to control said movement, electrically operated means for shifting said valve in one direction and means for moving it in the opposite direction, means for indexing the work spindle during the periods of withdrawal, means for locking the work spindle against rotation during the feed movement, and means operatively connecting said locking means with the electrically operated means so that the feed movement cannot begin until the locking means is in locking position.

13. In a machine for producing gears, a tool mechanism and a work support, one of which is movable alternately in opposite directions to alternately feed the tool mechanism into the blank and withdraw it from engagement therewith, and means for reciprocating the movable part comprising a cylinder and a piston movable therein, a movable valve controlling the direction of application of fluid pressure to said piston, electrically operated means controlling the direction of movement of said valve, a double-throw switch controlling said electrically operated means, means operable by the movable part first mentioned for operating said switch, and means connecting the last named means to the switch so that in one direction of movement of the switch a predetermined length of time must elapse between breakage of contact at one terminal and making of contact at the other, whereby to permit dwell of the tool mechanism in full depth engagement with the blank at the end of each feed movement before reversal.

14. In a machine for producing gears, a tool support and a work support, a sleeve reciprocable in the tool support, a cutter spindle journaled in the sleeve, means for rotating the cutter spindle, means for reciprocating said sleeve in a direction axial of the cutter spindle to alternately feed the cutter into and withdraw it from engagement with the blank, said means comprising a cylinder and a piston reciprocable therein, a movable valve controlling the direction of application of fluid pressure to said piston, electrically operated means for controlling the direction of movement of said valve, a double-throw switch controlling said electrically operated means, a rocker-arm pivotally connected to the sleeve, means carried by the tool support for rocking said rocker arm in opposite directions at opposite limits of movement of the sleeve, and an adjustable dash-pot mechanism connecting the rocker arm to the switch so that in one direction of movement of the switch, a predetermined length of time must elapse between breakage of contact at one terminal and making of contact at the other, whereby to permit dwell of the cutter in full depth engagement with the blank at the end of each feed movement before reversal.

15. In a machine for producing gears, a tool support, a work support, tool mechanism mounted on the tool support, means for actuating the tool mechanism, fluid pressure operated means for producing relative movements of feed and withdrawal between said supports alternately comprising a cylinder and a piston movable therein, a movable valve controlling the direction of application of fluid pressure to said piston, a solenoid for moving said valve in one direction, means for moving the valve in the opposite direction, fluid pressure operated mechanism for indexing the work support comprising a piston and a cylinder, one of which is connectable to the work support to rotate the same on movement in one direction, a movable valve controlling the direction of application of fluid pressure to said piston, a solenoid for shifting said valve in one direction, separate means for moving the valve in the opposite direction, means for locking the work spindle against rotation during the feed movement of the movable support, means connecting said locking means electrically with the solenoid controlling the first valve, and means connecting the movable support electrically with the solenoid controlling the second valve whereby indexing of the work spindle is prevented until the tool mechanism and the work have relatively separated and feed of the movable support is prevented until indexing has been completed and the work spindle re-locked.

16. In a machine for producing gears, a tool support, a work support, a work spindle journaled in the work support, means for reciprocating one of said supports relative to the other for alternate relative movements of feed and withdrawal between the tool mechanism and the work, a clamping member adapted to engage the periphery of the work spindle to hold the spindle against rotation during the feed movement, hydraulically operated mechanism comprising a cylinder and a piston reciprocable therein for rotating said work spindle during the periods of withdrawal to index the work spindle, hydraulically operated means for operating said clamping member, a valve controlling the operation of the last-named hydraulically operated means, and means for operating said valve from the movements of said piston whereby the work spindle may be unclamped before indexing and clamped after indexing.

17. In a machine for producing gears, a tool support and a work support, a work spindle journaled in the work support, hydraulically operated means comprising a cylinder and a piston movable therein for operating the reciprocable support, means for locking the work spindle against rotation during the periodic feed movements, an auxiliary clamping member adapted to engage the periphery of the work spindle to assist in holding the work spindle against rotation during the feed movements, hydraulically operated mechanism comprising a cylinder and a piston reciprocable therein for rotating said work spindle during the periods of withdrawal to index the work spindle, separate hydraulically operated means for operating said locking means and said clamping member, a valve controlling the operation of both of the last-named hydraulically operated means, means for operating said valve from the movement of said second piston whereby the work spindle may be released before indexing and held after indexing, and electrically operated means for controlling the movements of the first-named piston operable from said locking means whereby the successive feed movements cannot commence until after each of the alternate periodic indexing operations has been completed.

18. In a gear cutting machine, a tool mechanism, a work support, means for producing an alternate relative movement of feed and withdrawal between the tool mechanism and the work support comprising a cylinder and a piston reciprocable therein, a reciprocable valve controlling the direction of application of fluid-pressure to said piston, means constantly urging said valve in one direction, electrically operated means for shifting the valve in the opposite direction, a switch controlling said last named means and means operable by movement of the piston in one direction for shifting said switch in one direction, means for locking the work spindle against rotation during the feed movement, means for releasing the locking means during the periods of withdrawal to permit indexing of the work spindle, means for returning the locking means to operative position, after indexing, and means operable by the locking means, when it has returned to locking position, to shift the switch in the direction opposite to that above mentioned.

19. In a gear cutting machine, a tool mechanism, a work support, means for producing an alternate relative movement of feed and withdrawal between the tool mechanism and the work support comprising a cylinder and a piston reciprocable therein, a reciprocable valve controlling the direction of application of fluid pressure to said piston, means normally urging said valve in one direction, a solenoid for moving the valve in the opposite direction, an electrical switch controlling the operation of said solenoid, means operable by movement of the piston in one direction for moving the switch in one direction, means for locking the work spindle against rotation during the feed movement, means for releasing the locking means during the periods of withdrawal to permit indexing of the work spindle, means for returning the locking means to operative position after indexing, electrically controlled means for governing the movement of said locking means to and from operative position, said last named electrically controlled means being connected with said switch and operable thereby, and means operable by the locking means, when it has returned to locking position, to move said switch in the direction opposite to that above mentioned.

20. In a gear cutting machine, a tool support, a tool mechanism mounted on the tool support, a work support, means for reciprocating one of said supports to produce an alternate relative movement of feed and withdrawal between the tool mechanism and the work, electrically operated means including a movable switch for governing the direction of said movement, means operable by the movable support in its movement in one direction to move the switch in one direction, means for locking the work support against rotation during the feed movement, electrically operated mechanism for releasing the work support and indexing the same and again returning the locking means to locking position during the periods of withdrawal, said last named mechanism being operatively connected with said switch to be operated by the same, and means operable by return of the locking means to operative position, after each index, to shift said switch in the direction opposite to that first mentioned.

21. In a gear cutting machine, a tool support, a tool mechanism mounted on the tool support, a work support, a work spindle journaled in the work support, fluid pressure operated means for reciprocating one of said supports to produce an alternate relative movement of feed and withdrawal between the tool mechanism and the work comprising a cylinder and a piston reciprocable therein, a valve controlling the direction of application of fluid pressure to said piston, a spring normally urging said valve in one direction, a solenoid for moving the valve in the opposite direction, an electrical switch controlling the operation of the solenoid, means operable by movement of the piston in one direction for moving the switch in one direction, means for locking the work spindle against rotation during the feed movement, mechanisms for releasing the work spindle, indexing the same and again returning the locking means to locking position during the period of withdrawal, said mechanisms being fluid pressure operated, a valve controlling the operation of the last named mechanisms, a spring normally urging the valve in one direction, a solenoid for moving the valve in the opposite direction, said solenoid being connected with said switch to be operated thereby, and means operable by return of the locking means to operative position, after each index, to shift said switch in the direction opposite to that first mentioned.

22. In a gear cutting machine, a tool support, a tool mechanism mounted on the tool support, a work support, a work spindle journaled in the work support, fluid pressure operated means for reciprocating one of said supports to produce an alternate relative movement of feed and withdrawal between the tool mechanism and the work comprising a cylinder and a piston reciprocable therein, a valve controlling the direction of application of fluid pressure to said piston, means operable by the piston in its movement in one direction for shifting the valve in one direction to cause withdrawal of the tool mechanism from the work, locking means for securing the work spindle against rotation during the feed, means for releasing the locking means and indexing the work spindle during the periods of withdrawal, means for returning the locking means to operative position after each indexing operation, and means operable on return of the locking means to position to shift the valve in the direction opposite to that first mentioned to cause feed of the tool mechanism into the work.

23. In a machine for producing gears, a tool support, a tool mechanism mounted on the tool support, a work support, fluid-pressure operated means for reciprocating one of said supports to produce an alternate relative movement of feed and withdrawal between the tool mechanism and the work comprising a cylinder and a piston reciprocable therein, a movable valve controlling the direction of application of fluid pressure to opposite sides of said piston, means constantly urging the valve in one direction, a solenoid for shifting the valve in the opposite direction, a switch controlling the operation of said solenoid and movable in one direction to energize said solenoid and in the opposite direction to deenergize the same, and means operable by the piston at the end of each feed movement for shifting said switch from one position to another, and means adjustable to control the time of the shifting movement of the switch to cause a dwell of the tool mechanism at full depth position before withdrawal.

24. In a gear cutting machine, a tool mechanism, a work support, means for producing an alternate relative movement of feed and withdrawal between the tool mechanism and the work support comprising a cylinder and a piston reciprocable therein, a reciprocable valve controlling the direction of application of fluid pressure to said piston, means constantly urging said valve in one direction, and electrically operated means, operable by movement of the piston for shifting the valve in the opposite direction.

25. In a gear cutting machine, a tool mechanism, a work support, means for producing an alternate relative movement of feed and withdrawal between the tool mechanism and the work support comprising a cylinder and a piston reciprocable therein, a reciprocable valve controlling the direction of application of fluid pressure to said piston, means normally urging said valve in one direction, a solenoid for moving the valve in the opposite direction, an electrical switch controlling the operation of said solenoid, and means operable by the piston in its movement to control said switch.

26. In a machine for producing gears, a tool support, a tool mechanism mounted thereon, a work support, a work spindle journaled therein, means for reciprocating one of said supports to produce alternate relative movements of feed and withdrawal between the tool mechanism and the work, means for locking the work spindle against rotation, a reciprocable member operable on movement in one direction to rotate the work spindle to index the same, means operable at the end of the indexing movement of said reciprocable member to move the locking means into operative position, means normally operable, when the reciprocable member has returned to initial position, to release said locking means, a detent preventing the last described operation, means for chamfering the teeth of the blank, means operable on the periodic withdrawals of the work support to actuate said chamfering mechanism, means operable, when the chamfering mechanism has completed its operation, to release said detent, means operable thereafter to effect the indexing movement of the reciprocable member, and means operable by the locking member, when it returns to operative position, to cause a feed movement of the movable support.

27. In a machine for producing gears, a tool support, a tool mechanism mounted thereon, a work support, a work spindle journaled therein, means for reciprocating one of said supports to produce alternate relative movements of feed and withdrawal between the tool mechanism and the work, fluid pressure operated means for locking the work spindle against rotation, a reciprocable valve controlling the movement of the locking means to and from operative position, a reciprocable member operable on movement in one direction to rotate the work spindle to index the same, means operable to shift said valve at the end of the indexing movement of the reciprocable member to cause the spindle to be locked, means normally operable to shift the valve when the reciprocable member is at the limit of its return movement to cause the spindle to be released, means operable on the withdrawal movement of the movable support to return said reciprocable member to initial position, a detent preventing shifting of the valve to releasing position on the last named movement of the reciprocable member, means for chamfering the teeth of the blank, means operable on the withdrawal movement of the movable support to actuate the chamfering mechanism, means operable when the chamfering mechanism has completed an operation to release the detent, means operable thereafter to effect indexing movement of the reciprocable member, and means operable when the work spindle has been relocked to cause movement of the movable support.

28. In a gear-cutting machine, a tool support, tool mechanism mounted on said tool support, a work support, a work spindle journaled in the work support, means for moving one of said supports in opposite directions to produce alternately movements of feed and withdrawal between the tool mechanism and the work, electrical control means for controlling the movements of said movable support, means operable by the movable support at the end of its feed movement to trip said electrical control means to cause withdrawal of said support from operative position, means for locking the work spindle against rotation, means for imparting indexing rotation to said spindle when released, electrical control means for controlling the means for rotating and locking the work spindle, means operable at the end of the withdrawal movement of the movable support for tripping said last named control means to cause indexing of the work spindle and subsequent relocking of the same, and means operable by the return of the locking means to engaging position to trip the first named electrical control means to cause feed movement of said movable support.

ROBERT S. CONDON.